United States Patent
Suzuki et al.

(10) Patent No.: US 10,313,694 B2
(45) Date of Patent: Jun. 4, 2019

(54) IMAGE PROCESSING DEVICE AND METHOD

(71) Applicant: SONY CORPORATION, Tokyo (JP)

(72) Inventors: Teruhiko Suzuki, Kanagawa (JP); Mitsuhiro Hirabayashi, Tokyo (JP); Takehiko Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 258 days.

(21) Appl. No.: 14/432,786

(22) PCT Filed: Sep. 30, 2013

(86) PCT No.: PCT/JP2013/076486
§ 371 (c)(1),
(2) Date: Apr. 1, 2015

(87) PCT Pub. No.: WO2014/057832
PCT Pub. Date: Apr. 17, 2014

(65) Prior Publication Data
US 2015/0281713 A1    Oct. 1, 2015

(30) Foreign Application Priority Data

Oct. 9, 2012  (JP) ................................. 2012-224597
Oct. 10, 2012 (JP) ................................. 2012-225159
(Continued)

(51) Int. Cl.
*H04N 19/423* (2014.01)
*H04N 19/426* (2014.01)
(Continued)

(52) U.S. Cl.
CPC .......... *H04N 19/427* (2014.11); *H04N 19/423* (2014.11); *H04N 19/44* (2014.11); *H04N 19/70* (2014.11); *H04N 21/85406* (2013.01)

(58) Field of Classification Search
CPC ...... H04N 19/70; H04N 19/44; H04N 19/102; H04N 19/427; H04N 19/423
(Continued)

(56) References Cited

U.S. PATENT DOCUMENTS

2005/0175098 A1*  8/2005  Narasimhan ....... H04N 21/2368
                                          375/240.12
2011/0122939 A1   5/2011  Ganesan et al.
(Continued)

OTHER PUBLICATIONS

Aug. 19, 2016, EP communication issued for related EP application No. 13845300.6.
(Continued)

*Primary Examiner* — Nguyen T Truong
(74) *Attorney, Agent, or Firm* — Paratus Law Group, PLLC

(57) ABSTRACT

The present disclosure relates to an image processing device and an image processing method capable of reducing a processing burden required at the time of generating a stream. A file generating unit sets a startcode and filler data for a file including a bitstream acquired by coding an image and performs control of the setting of the startcode and the filler data such that the startcode and the filler data that are set configure a file with a characteristic of a parameter managing a decoder buffer being maintained in media data of the file. The present disclosure, for example, can be applied to an image processing device.

16 Claims, 46 Drawing Sheets

(30) Foreign Application Priority Data

| Nov. 30, 2012 | (JP) | ................... | 2012-262803 |
|---|---|---|---|
| Jan. 15, 2013 | (JP) | ................... | 2013-004988 |
| Jan. 23, 2013 | (JP) | ................... | 2013-010585 |
| Mar. 22, 2013 | (JP) | ................... | 2013-060438 |

(51) Int. Cl.
  *H04N 19/70* (2014.01)
  *H04N 19/44* (2014.01)
  *H04N 21/854* (2011.01)

(58) Field of Classification Search
  USPC ............................................. 382/233
  See application file for complete search history.

(56) References Cited

U.S. PATENT DOCUMENTS

| 2011/0206138 | A1* | 8/2011 | Yang ............ | H04N 19/159 |
|---|---|---|---|---|
|  |  |  |  | 375/240.26 |
| 2013/0195205 | A1* | 8/2013 | Wang ............ | H04N 19/70 |
|  |  |  |  | 375/240.26 |
| 2013/0235152 | A1* | 9/2013 | Hannuksela ..... | H04N 19/00769 |
|  |  |  |  | 348/43 |

OTHER PUBLICATIONS

Gary Sullivan, Filer Data and SEI for User Data, Joint Video Team (JVT) of ISO/IEC MPEG & ITU-T VCEG (ISO/IEC JTC1/SC29/WG11 and ITU-T SG16 Q.6), Jul. 22-26, 2002, pp. 1-5, 4$^{th}$ meeting, Klagenfurt, Austria.

Teruhiko Suzuki, et al., Text of ISO/IEC 14496-10:2012/DAM 2 MVC extensions for inclusion of depth maps, Jul. 2012, pp. i-67, International Organaization for Standardization, Stockholm, SE.

Ye-Kui Wang, On NAL unit header, Joint Collaborative Team on Video Coding (JCT-VC) of ITU-T SG16 WP3 and ISO/IEC JTC1/SC29/WG11, Jul. 14-22, 2011, pp. 1-6, 6$^{th}$ Meeting: Torino, IT.

Stephan Wenger, et al., Adaption Parameter Set (APS), Joint Collaborative Team on Video Coding (JCT-VC) of ITU-T SG16 WP3 and ISO/IEC JTC1/SC29/WG11, Jul. 14-22, 2011, pp. 1-10, 6$^{th}$ Meeting: Torino, IT.

Benjamin Bross, et al., High efficiency coding (HEVC) text specification draft 6, Joint Collaborative Team on Video Coding (JCT-VC) of ITU-T SG16 WP3 and ISO/IEC JTC1/SC29/WG11, Nov. 21-30, 2011, pp. 1-275, 7$^{th}$ Meeting: Geneva, CH.

Jun. 2, 2017, CN communication issued for related CN application No. 201380051814.1.

Suzuki, et al., Text of ISO/IEC 14496-10:2012/DAM 2 MVC extensions for inclusion of depth maps, International Organization for Standardization, ISO/IEC JTC1/SC29/WG11, Coding of Moving Pictures and Audio, MPEG2012, Jul. 2012, pp. i-67, Stockholm, SE.

Dec. 7, 2017, Japanese Office Action issued for related JP application No. 2014-540806.

Jun. 4, 2018, European Communication issued for related EP Application No. 13845300.6.

Jul. 3, 2018, Japanese Office Action issued for related JP Application No. 2014-540806.

Stream Conditioning for Switching of Addressable Content in Digital Television Receivers, American National Standard ANSI/SCTE 138 2009, 2009, pp. 1-20, Society of Cable Telecommunications Engineers, Exton, PA.

\* cited by examiner

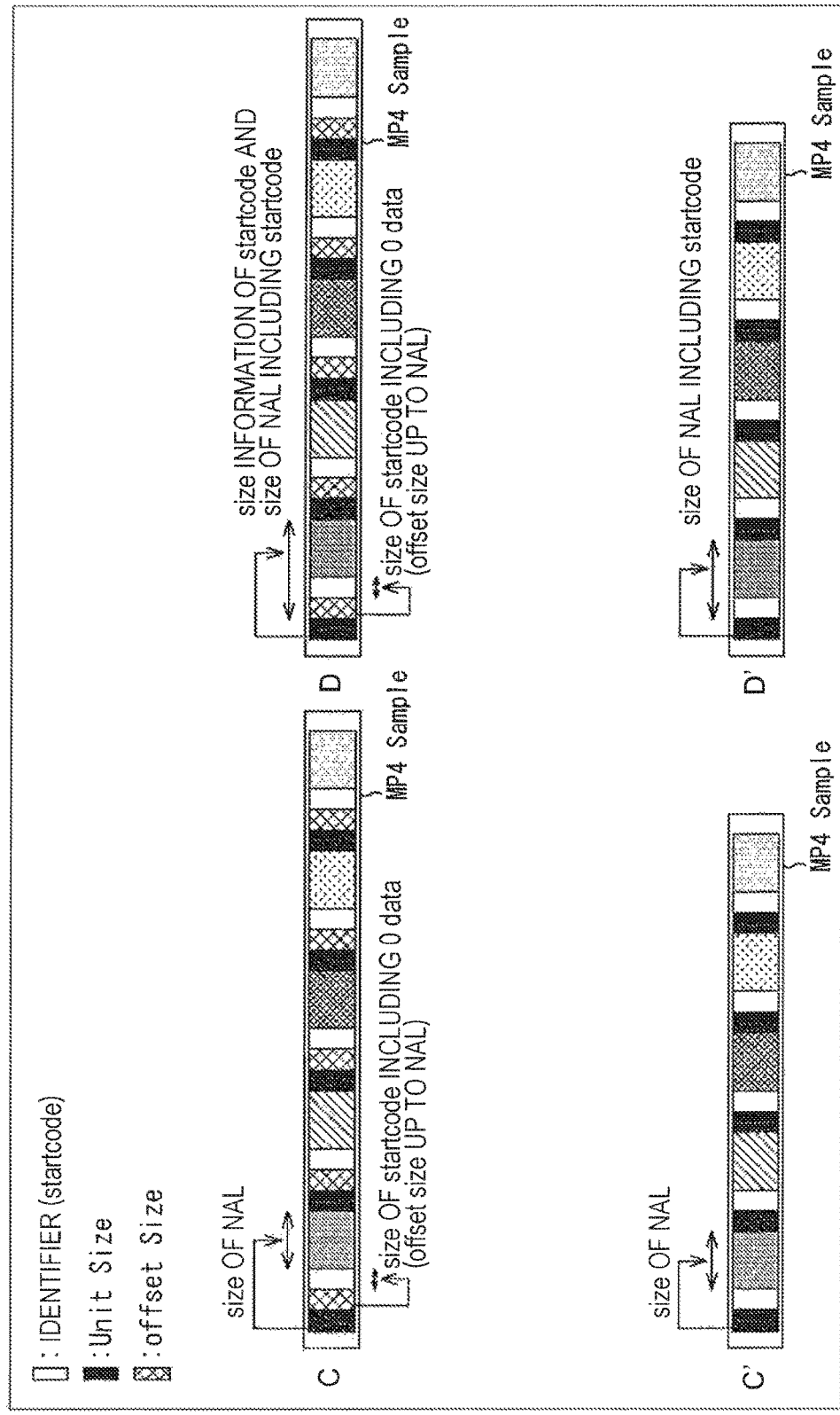

FIG. 19

```
AVCSampleEntry() extends VisualSampleEntry('type') {     //type is 'avc1' or 'avc3'
AVCConfigurationBox config;
MPEG4BitRateBox();  //Optional
MPEG4ExtensionDescriptorsBox();  //Optional
HRDConformanceBox();  //Optional
}

HRDConformanceBox can be defined as follows.

class HRDConformanceBox extends Box('hrdc') {
HRDConformanceData() HRDConformance;
} aligned(8) class HRDConformanceData {
unsigned int(6) reserved =0;
unsigned int(1) FixedStartCodeSizeFlag;
unsigned int(1) HRDConformanceFlag;
unsigned int(24) reserved;
Box[] any_box;//Optional
}
```

FixedStartCodeSizeFlag is the idetifier when Start Code in each NAL is fixed size of 4 bytes. When FixedStartCodeSizeFlag is equal to 1, no offset field is for each NAL in sample data to indicate the size of Start Code.

HRDConformanceFlag is the identifier if HRD characteristics was changed by removing startcode,filler data. etc from the elementary stream. When HRDConformanceFlag is equal to1,the HRD parameters,e.g.buffering period SEI,picture timing SEI,was changed by removing startcode,filler data,etc from the elementary stream.

FIG. 21

```
aligned(8) class NALunitOffsetBox
extends FullBox( 'nalo' , version=0, 0) {
    unsigned int(32) sample_count;
    for (i=1; i <= sample_count; i++) {
        unsigned int(32) offset_count;
        for (j=1; j <= offset_count; j++) {
            unsigned int(32) offset;
        }
    }
} sample_count is an integer that gives the number of entries in the following table
offset_count is an integer that gives the number of entries in the following subtable
offset is an integer that gives the offset of the start of a NAL unit into its containing sample.
```

FIG. 24

```
aligned(8) class NalsizeSampleAuxiliaryDataFormat
}
    unsigned int(2) StartcodeSizeMinusOne;
    unsigned int(2) NALunitSizeMinusOne;
    unsigned int(4) reserved;
    unsigned int(32) subsample_count;
    for (i=1; i <= sabsample_count; i++) {
        switch (StartcodeSizeMinusOne) {
            case 0:
            unsigned int(8) Startcode Size;
            break;
            case 1:
            unsigned int(16) Startcode Size;
            break;
            case 3:
            unsigned int(32) Startcode Size;
            break;

} switch (NALUnitSizeMinusOne) {
        case 0:
        unsigned int(8) NALUnit Size;
        break;
        case 1:
        unsigned int(16) NALUnit Size;
        break;
        case 3:
        unsigned int(32) NALUnit Size;
        break;

```
aligned(8) class NalsizeSampleAuxiliaryDataFormat
}
    unsigned int(1) FixedStartCodeSizeFlag;
    unsigned int(2) StartcodeSizeMinusOne;
    unsigned int(2) NALunitSizeMinusOne;
    unsigned int(3) reserved;
    unsigned int(32) subsample_count;
    for (i=1; i <= sabsample_count; i++) {
        if (FixedStartCodesSizeFlag == 0) {
            switch (StartcodeSizeMinusOne) {
                case 0:
                    unsigned int(8) Startcode Size;
                    break;
                case 1:
                    unsigned int(16) Startcode Size;
                    break;
                case 3:
                    unsigned int(32) Startcode Size;
                    break;
            }
        }
        switch (NALUnitSizeMinusOne) {
            case 0:
                unsigned int(8) NALUnit Size;
                break;
            case 1:
                unsigned int(16) NALUnit Size;
                break;
            case 3:
                unsigned int(32) NALUnit Size;
                break;

| | ADVANTAGE |
|---|---|
| B OF FIG. 17 | Similar to the current structure of size and data. |
| C OF FIG. 18 OR C' OF FIG. 18 | Similar to the current structure of size and data. The semantics of unit size is not changed. If startcode size is fixed, the data structure is the same as current file format design. |
| D OF FIG. 18 OR D' OF FIG. 18 | Similar to the current structure of size and data. |
| E OF FIG. 20 OR E' OF FIG. 22 | Simple way to store elementary stream. (No need to remove startcode, or adding unit size nor startcode size.) |

FIG. 28

- The Byte Stream Format Information Box may be stored in 'avc3', 'avc4', 'mvc3', 'mvc4' or 'hev1' Sample Entry(in Sample entry box of media track). This box SHALL be stored when sample data is structured by Byte Stream Format as defined in ISO/IEC 14496-10.
- The Sub-Sample Information Box may be used to store one or more contiguous Byte stream NAL unit size
- a sub-sample is defined as one or more contiguous Byte stream NAL units as defined in ISO/IEC 14496-10.

- Box Type:    'bsfi'
  Container:   Sample Entry('avc3', 'avc4', 'mvc3', 'mvc4' or 'hev1')
  Mandatory:   No
  Quantity:    Zero or one

- Class ByteStreamFormatInformationBox extends Box('bsfi'){
  ByteStreamFormatInformation() ByteStreamInformation;
  }

FIG. 29

- The Byte Stream Format Information Box <u>SHALL</u> be stored in 'avc5', 'avc6', 'mvc5', 'mvc6' or 'hev2' Sample Entry(in Sample entry box of media track).
- This box SHALL be stored when sample data is structured by Byte Stream Format as defined in ISO/IEC 14496-10.
- The Sub-Sample Information Box may be used to store one or more contiguous Byte stream NAL unit size
- a sub-sample is defined as one or more contiguous Byte stream NAL units as defined in ISO/IEC 14496-10.

- Box Type: 'bsfi'
  Container: Sample Entry ('avc5', 'avc6', 'mvc5', 'mvc6' or 'hev2')
  Mandatory: No
  Quantity: Zero or one

- Class ByteStreamFormatInformationBox extends Box('bsfi'){
  ByteStreamFormatInformation() ByteStreamInformation;
  }

FIG. 30

```
aligned(8) class ByteStreamFormatInformation{
    unsigned int(1) StartcodePresentFlag;
    unsigned int(1) ZeroBytePresentFlag;
    unsigned int(1) LeadingZeroBytesPresentFlag;
    unsigned int(1) TrailingZeroBytesPresentFlag;
    unsigned int(4) reserved =0;
    unsigned int(24) reserved;
    Box[] any_box; //Optional
}
```

Startcode OF three bytes IS INCLUDED BEFORE NAL Unit IN EACH OF ALL subsamples INCLUDED IN StartcodePresentFlag sample
ZERO DATA OF 1 byte IS INCLUDED BEFORE ZeroBytePresentFlag Startcode.

PLURALITY OF 0x00 of 1 byte MAY BE INCLUDED BEFORE Startcode OF 3 bytes OR 4 bytes OF AT LEAST ONE sub-sample AMONG subsamples INCLUDED IN LeadingZeroBytesPresentFlag sample.

PLURALITY OF 0x00 of 1 byte MAY BE INCLUDED AFTER NAL unit OF AT LEAST ONE sub-sample AMONG subsamples INCLUDED IN TrailingZeroBytesPresentFlag sample

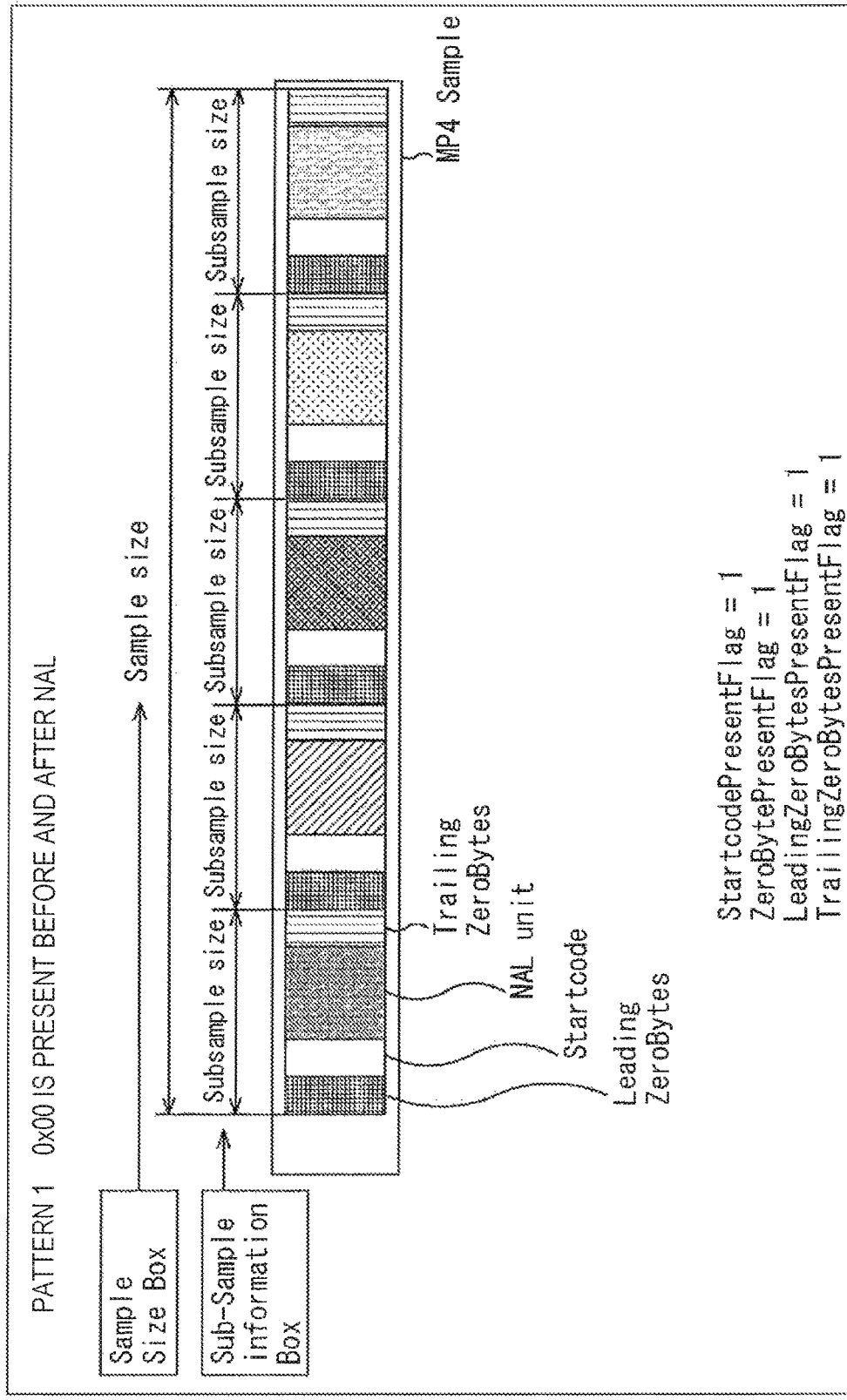

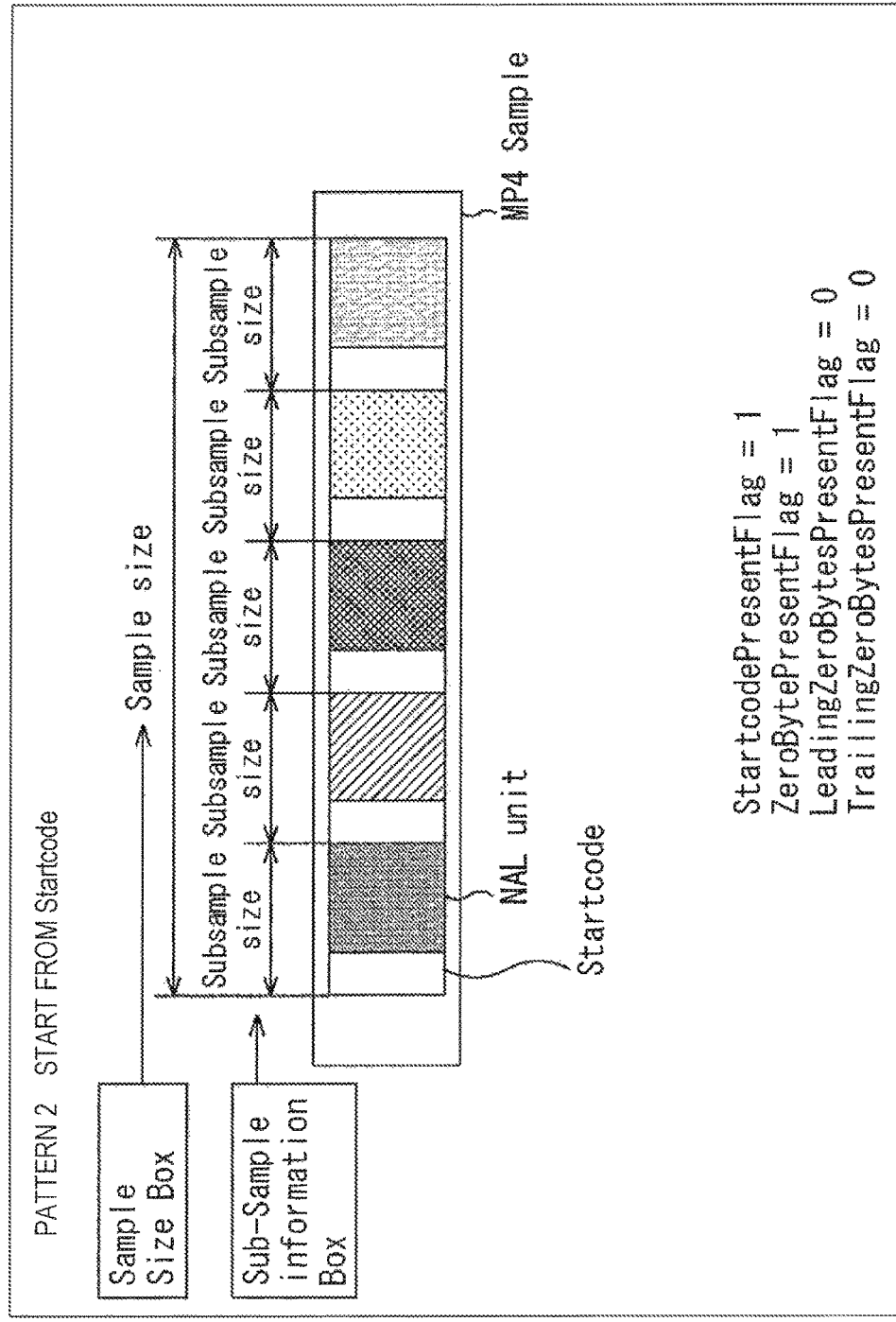

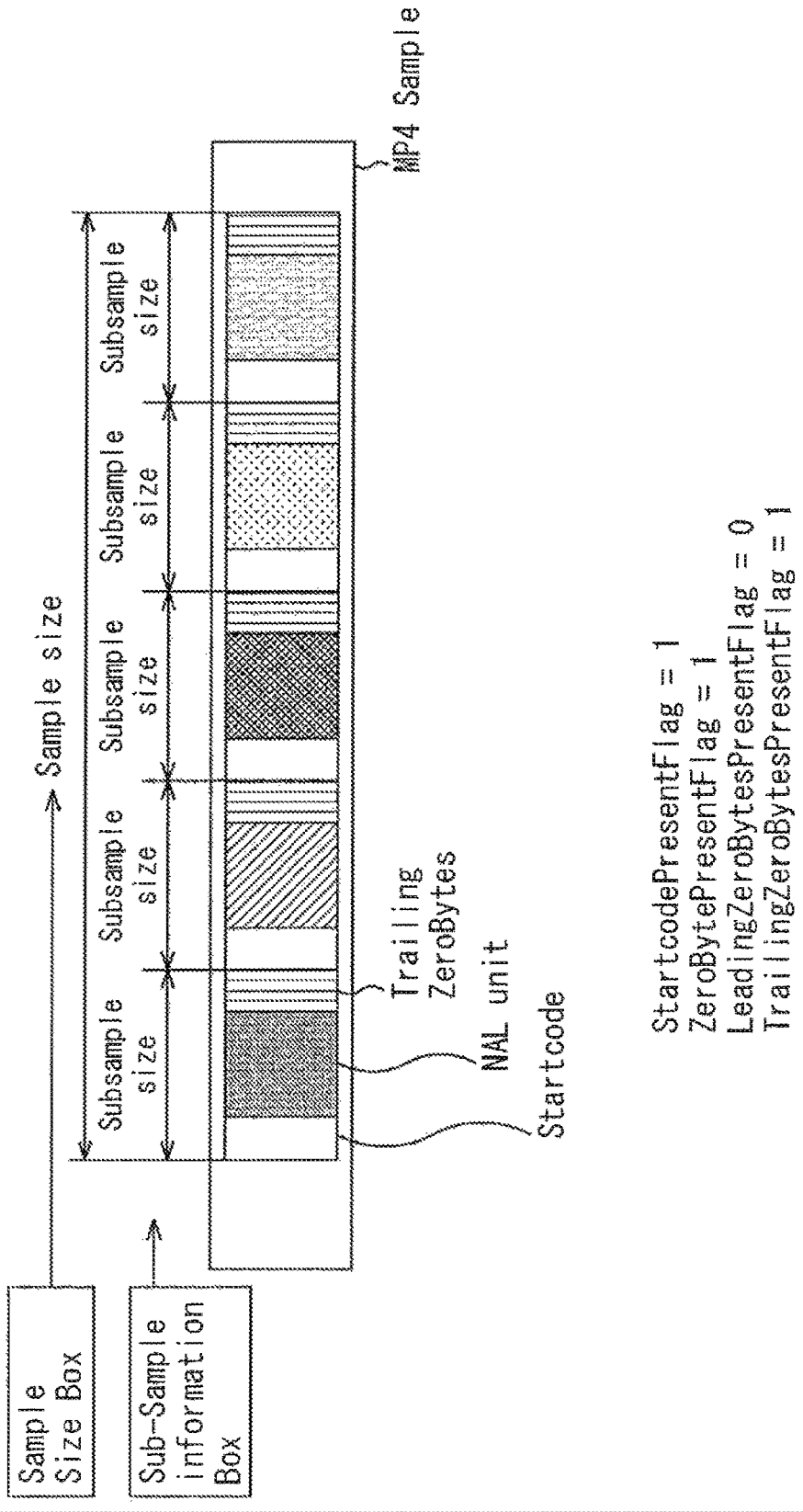

FIG. 34

```
aligned(8) class ByteStreamFormatInformation {
    unsigned int(2) StartcodePresentFlag;
    unsigned int(1) LeadingZeroBytesPresentFlag;
    unsigned int(1) TrailingZeroBytesPresentFlag;
    unsigned int(4) reserved =0;
    unsigned int(24) reserved;
    Box[] any_box;   //Optional
}
```

FLAG OF 2 bits REPRESENTING STRUCTURE OF Startcode OF EACH OF ALL subsamples OF StartcodePresentFlag
StartcodePresentFlag = 00b reserved
StartcodePresentFlag = 01b Startcode OF 3 bytes IS INCLUDED BEFORE NAL Unit IN EACH OF ALL subsamples INCLUDED IN sample
StartcodePresentFlag = 10b Startcode OF 3 bytes AND ZeroByte DATA OF 1 byte ARE INCLUDED BEFORE NAL Unit IN EACH OF ALL subsamples INCLUDED IN sample (CONFIGURED BY 4 bytes)
StartcodePresentFlag = 11b BEFORE NAL Unit IN EACH OF ALL subsamples INCLUDED IN sample, startcode OF 3 bytes IS INCLUDED, AND ZeroByte DATA OF 1 byte MAY BE INCLUDED (THERE IS POSSIBILITY THAT startcodes OF 3 bytes/4 bytes ARE MIXED => 01b/10b IS NOT ASSURED)

LeadingZeroBytesPresentFlag PLURALITY OF 0x00 of 1 byte MAY BE INCLUDED BEFORE Startcode OF 3 bytes OR 4 bytes IN AT LEAST ONE subsample AMONG subsamples INCLUDED IN sample.
TrailingZeroBytesPresentFlag PLURALITY OF 0x00 of 1 byte MAY BE INCLUDED AFTER NAL unit IN AT LEAST ONE subsample AMONG subsamples INCLUDED IN sample.

IMAGE PROCESSING DEVICE AND METHOD

CROSS REFERENCE TO PRIOR APPLICATION

This application is a National Stage Patent Application of PCT International Patent Application No. PCT/JP2013/076486 (filed on Sep. 30, 2013) under 35 U.S.C. § 371, which claims priority to Japanese Patent Application Nos. 2013-060438 (filed on Mar. 22, 2013), 2013-010585 (filed on Jan. 23, 2013), 2013-004988 (filed on Jan. 15, 2013), 2012-262803 (filed on Nov. 30, 2012), 2012-225159 (filed on Oct. 10, 2012), and 2012-224597 (filed on Oct. 9, 2012) which are all hereby incorporates by reference in their entirety.

TECHNICAL FIELD

The present disclosure relates to an image processing device and an image processing method, and more specifically, to an image processing device and an image processing method capable of reducing a processing burden required when a stream used at the time of transmission or a stream used at the time of storing data in a file is generated.

BACKGROUND ART

In H.264/AVC that is one of standard specifications of image coding system, two kinds of parameter sets called a sequence parameter set (SPS) and a picture parameter set (PPS) that are used for storing parameters for coding and decoding an image are defined. The image data of each slice is classified into VCL (Video Coding Layer) NAL (Network Abstraction Layer) units, and these parameter sets are classified into non-VCL NAL units. Generally, in a case where a coded stream that is coded using the H.264/AVC system is stored in a file including a header region and a data region, the SPS and the PPS are inserted into the header region, and image data is inserted into the data region.

In a standardization operation of HEVC (High Efficiency Video Coding) that is a next-generation image coding system subsequent to H.264/AVC, introduction of an adaptation parameter set (APS) that is a new parameter set other than the SPS and the PPS has been proposed (see Non-Patent Documents 1 and 2 described below).

The APS is also one kind of parameter sets. Thus, according to an existing technique, similarly to the SPS and the PPS, the APS is also inserted into the header region of a file. Examples of a file format including a header region and a data region include an MPEG-4 Part 14 (ISO/IEC 14496-14: 2003, hereinafter, referred to as MP4) format and an MPEG-4 Part 15 (ISO/IEC 14496-15: 2004, AVC file) format.

CITATION LIST

Non-Patent Document

Non-Patent Document 1: Stephan Wenger, Jill Boyce, Yu-Wen Huang, Chia-Yang Tsai, Ping Wu, Ming Li, "Adaptation Parameter Set (APS)", JCTVC-F747r3, July 2011
Non-Patent Document 2: Benjamin Bross, Woo-Jin Han, Jens-Rainer Ohm, Gary J. Sullivan, Thomas Wiegand, "High efficiency video coding (HEVC) text specification draft 6", JCTVC-H1003 ver20, February 2012

SUMMARY OF THE INVENTION

Problems to be Solved by the Invention

However, in a case where a stream used for transmission or a stream used for storing data in a file is generated, there is a format in which data such as a startcode and a filler data is not allowed to be included in the stream. Thus, when the data of a stream is read, it causes the processing load to be increased.

The present disclosure is configured in consideration of such situations and reduces the processing burden required when a stream used at the time of transmission or a stream used at the time of storing data in a file is generated.

Solutions to Problems

According to a first aspect of the present disclosure, there is provided an image processing device including: a setting unit that sets a startcode and filler data for a file including a bitstream acquired by coding an image; and a control unit that performs control of the setting unit such that the startcode and the filler data set by the setting unit configure a file with a characteristic of a parameter managing a decoder buffer being maintained in media data of the file.

The parameter managing the decoder buffer is a parameter included in VUI (Video Usability Information), a parameter included in buffering period SEI (Supplemental Enhancement Information), or a parameter included in picture timing SEI.

The setting unit may set the filler data as VCL data.

According to the first aspect of the present disclosure, there is provided an image processing method using an image processing device. The image processing method includes: setting a startcode and filler data for a file including a bitstream acquired by coding an image; and performing control of the setting of the startcode and the filler data such that the startcode and the filler data that are set configure a file with a characteristic of a parameter managing a decoder buffer being maintained in media data of the file.

According to a second aspect of the present disclosure, there is provided an image processing device including: a reception unit that receives a file including a bitstream acquired by coding an image and being controlled and set such that a startcode and filler data configure the file with a characteristic of a parameter managing a decoder buffer being maintained in media data of the file; and a decoding unit that reads the startcode and the filler data from the file received by the reception unit and decodes the bitstream by using the parameter managing the decoder buffer.

The parameter managing the decoder buffer is a parameter included in VUI (Video Usability Information), a parameter included in buffering period SEI (Supplemental Enhancement Information), or a parameter included in picture timing SEI.

The filler data is set as VCL data.

According to the second aspect of the present disclosure, there is provided an image processing method using an image processing device. The image processing method includes: receiving a file including a bitstream acquired by coding an image and being controlled and set such that a startcode and filler data configure the file with a characteristic of a parameter managing a decoder buffer being maintained in media data of the file; and reading the startcode and the filler data from the received file and decoding the bitstream by using the parameter managing the decoder buffer.

According to a third aspect of the present disclosure, there is provided an image processing device including: a setting unit that sets a characteristic of a parameter managing a decoder buffer in a case where a startcode and filler data are removed from a bitstream in media data of a file including the bitstream acquired by coding an image; and a generation unit that generates the file by using the characteristic set by the setting unit.

The setting unit may set an identification parameter identifying that the characteristic of the parameter managing the decoder buffer is changed.

The setting unit may set the identification parameter as an optional box in a sample entry of the file.

According to the third aspect of the present disclosure, there is provided an image processing method using an image processing device. The image processing method includes: setting a characteristic of a parameter managing a decoder buffer in a case where a startcode and filler data are removed from a bitstream in media data of a file including the bitstream acquired by coding an image; and generating the file by using the set characteristic.

According to a fourth aspect of the present disclosure, there is provided an image processing device including: a reception unit that receives a file generated using a set characteristic of a parameter managing a decoder buffer that is set in a case where a startcode and filler data are removed from media data of a file including a bitstream acquired by coding an image; and a decoding unit that reads the parameter managing the decoder buffer from the file received by the reception unit and decodes the bitstream by using the read parameter.

In the file, an identification parameter identifying that the characteristic of the parameter managing the decoder buffer is changed is set.

According to the fourth aspect of the present disclosure, there is provided an image processing method using an image processing device. The image processing method includes: receiving a file generated using a set characteristic of a parameter managing a decoder buffer that is set in a case where a startcode and filler data are removed from media data of a file including a bitstream acquired by coding an image; and reading the parameter managing the decoder buffer from the received file and decoding the bitstream by using the read parameter.

According to the first aspect of the present disclosure, a startcode and filler data are set for a file including a bitstream acquired by coding an image. Then, the setting of the startcode and the filler data are controlled such that the startcode and the filler data that are set configure a file with a characteristic of a parameter managing a decoder buffer being maintained in media data of the file.

According to the second aspect of the present disclosure, a file including a bitstream acquired by coding an image and being controlled and set such that a startcode and filler data configure the file with a characteristic of a parameter managing a decoder buffer being maintained in media data of the file is received. Then, the startcode and the filler data are read from the received file, and the bitstream is decoded by using the parameter managing the decoder buffer.

According to the third aspect of the present disclosure, a characteristic of a parameter managing a decoder buffer is set in a case where a startcode and filler data are removed from a bitstream in media data of a file including the bitstream acquired by coding an image. Then, the file is generated by using the set characteristic.

According to the fourth aspect of the present disclosure, a file generated using a set characteristic of a parameter managing a decoder buffer that is set in a case where a startcode and filler data are removed from media data of a file including a bitstream acquired by coding an image is received. Then, the parameter managing the decoder buffer is read from the received file, and the bitstream is decoded by using the read parameter.

Here, the above-described image processing device may be an independent device or an internal block that configures an image coding apparatus or an image decoding apparatus.

Effects of the Invention

According to first and third aspects of the present disclosure, an image can be coded. Particularly, the processing burden can be reduced when a stream used at the time of transmission of a bitstream or a stream used at the time of storing data in a file is generated.

In addition, according to second and fourth aspects of the present disclosure, an image can be decoded. Particularly, the processing burden can be reduced when a stream used at the time of transmission or a stream used at the time of storing data in a file is decoded.

BRIEF DESCRIPTION OF DRAWINGS

FIG. 18 is a diagram that illustrates another example of an MP4 video sample structure according to the present technology.

FIG. 19 is a diagram that illustrates an example of an HRD Conformance Box extension.

FIG. 21 is a diagram that illustrates an example of a box added to a sample table.

FIG. 24 is a diagram that illustrates an example of a format of a sample auxiliary information function.

FIG. 25 is a diagram that illustrates another example of a format of the sample auxiliary information function.

FIG. 26 is a diagram for comparing examples of the MP4 video sample structure according to the present technology.

FIG. 28 is a diagram that illustrates an example of a byte stream format information box.

FIG. 29 is a diagram that illustrates another example of the byte stream format information box.

FIG. 30 is a diagram that illustrates an example of the data structure of byte stream format information stored in each sample entry.

FIG. 31 is a diagram that illustrates an example of the MP4 video sample structure in the case of Pattern 1.

FIG. 32 is a diagram that illustrates an example of the MP4 video sample structure in the case of Pattern 2.

FIG. 33 is a diagram that illustrates an example of the MP4 video sample structure in the case of Pattern 3.

FIG. 34 is a diagram that illustrates another example of the data structure of byte stream format information stored in each sample entry.

MODE FOR CARRYING OUT THE INVENTION

Hereinafter, embodiments for performing the present disclosure (hereinafter, referred to as embodiments) will be described. The description will be presented in the following order.

1. First Embodiment (Coding Apparatus and Decoding Apparatus of HEVC System)
2. Second Embodiment (Image Coding Apparatus and Image Decoding Apparatus)
3. Third Embodiment (MP4 Video Sample Structure)
4. Fourth Embodiment (Byte Stream Format Information Box)
5. Fifth Embodiment (File Converting Apparatus)
6. Sixth Embodiment (Coding Apparatus and Decoding Apparatus of AVC System)
7. Application Example
8. Seventh Embodiment (Set/Unit/Module/Processor)

<1. First Embodiment>

[Configuration Example of Coding Apparatus According to First Embodiment]

Figure 1:
FIG. 1 is a block diagram that illustrates an example of the configuration of a coding apparatus, to which the present technology is applied, according to a first embodiment.

FIG. 1 is a block diagram that illustrates an example of the configuration of a coding apparatus according to a first embodiment as an image processing device to which the present technology is applied.

The coding apparatus illustrated in FIG. 1 is configured by an encoder 1 and a file generating unit 2 and generates a file in which a coded stream is stored by coding an image such as a captured image using an HEVC system.

More specifically, an image such as a captured image configured in units of frames is input to the encoder 1 of the coding apparatus as an input signal. In addition, an SPS (Sequence Parameter Set) and a PPS (Picture Parameter Set) set on a previous stage of the encoder 1 not illustrated in the figure, VUI (Video Usability Information) that represents a characteristic (usability) of an image corresponding to coded data for each sequence, SEI (Supplemental Enhancement Information), and the like are input thereto.

The encoder 1 codes the input signal, using parameters included in the SPS, the PPS, the VUI, and the SEI by using the HEVC system. Then, the encoder 1 generates a coded stream such as an MPEG-2 TS (Transport Stream) based on the SPS, the PPS, the VUI, and the SEI and coded data acquired as a result of the coding process and supplies the generated coded stream to the file generating unit 2. The encoder 1 will be described later in detail with reference to FIG. 2.

The file generating unit 2 generates a file (for example, a file of MPEG-4 Part 14 (ISO/IEC14496-14:2003, hereinafter, referred to as MP4) storing the coded stream (a series of coded image data) supplied from the encoder 1. The file generating unit 2 will be described later in detail with reference to FIG. 3.

[Configuration Example of Encoder]

Figure 2:
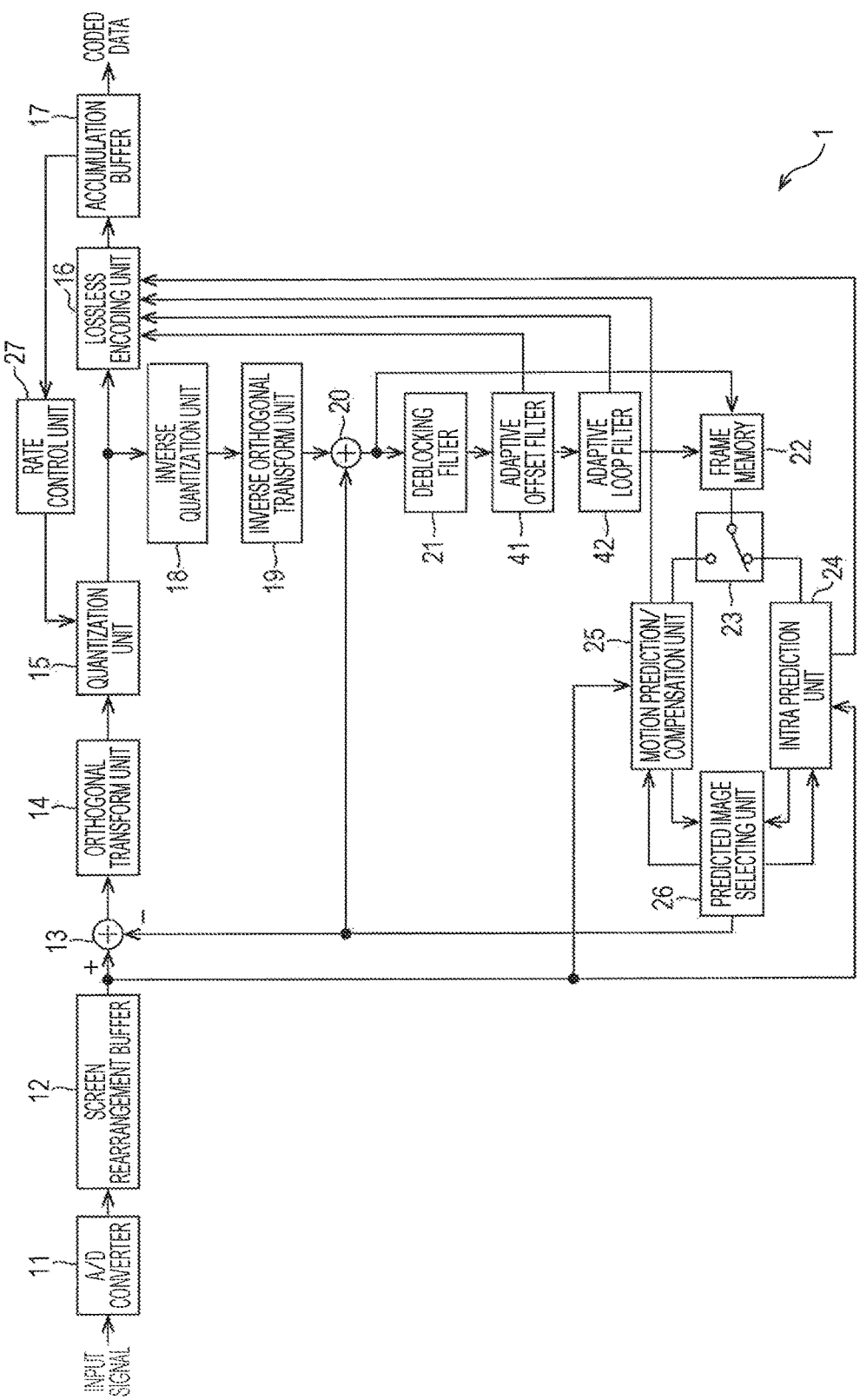
FIG. 2 is a block diagram that illustrates an example of the configuration of an encoder.

FIG. 2 is a block diagram that illustrates an example of the configuration of the encoder 1 illustrated in FIG. 1. Each unit of the encoder 1 codes an image that is an input signal by using parameters included in the SPS, the PPS, the VUI, and SEI supplied from the previous stage not illustrated in the figure, thereby generating a coded stream.

The encoder 1 illustrated in FIG. 2 is configured to include: an A/D converter 11; a screen rearrangement buffer 12; a calculation unit 13; an orthogonal transform unit 14; a quantization unit 15; a lossless encoding unit 16; an accumulation buffer 17; an inverse quantization unit 18; an inverse orthogonal transform unit 19; an addition unit 20; a deblocking filter 21; a frame memory 22; a switch 23; an intra prediction unit 24; a motion prediction/compensation unit 25; a predicted image selecting unit 26; and a rate control unit 27.

In addition, between the deblocking filter 21 and the frame memory 22, an adaptive offset filter 41 and an adaptive loop filter 42 are provided.

More specifically, the A/D converter 11 of the encoder 1 performs an A/D conversion of an image, which is configured in units of frames, input as an input signal and outputs the converted image to the screen rearrangement buffer 12 so as to be stored therein. The screen rearrangement buffer 12 rearranges the stored image, which is configured in units of frames in the display order, in order for coding in accordance with a GOP (Group of Picture) structure and outputs the rearranged image to the calculation unit 13, the intra prediction unit 24, and the motion prediction/compensation unit 25.

The calculation unit 13 performs coding by calculating a difference between a predicted image supplied from the predicted image selecting unit 26 and a current coding image output from the screen rearrangement buffer 12. More specifically, the calculation unit 13 subtracts a predicted image supplied from the predicted image selecting unit 26 from a current coding image output from the screen rearrangement buffer 12. The calculation unit 13 outputs an image acquired as a result thereof to the orthogonal transform unit 14 as differential information. In addition, in a case where a predicted image is not supplied from the predicted image selecting unit 26, the calculation unit 13 outputs the image read from the screen rearrangement buffer 12 to the orthogonal transform unit 14 as it is as differential information.

The orthogonal transform unit 14 performs an orthogonal transform for the differential information supplied from the calculation unit 13 and supplies coefficients acquired as a result of the orthogonal transform to the quantization unit 15.

The quantization unit 15 quantizes the coefficients supplied from the orthogonal transform unit 14. The quantized coefficients are input to the lossless encoding unit 16.

The lossless encoding unit 16 acquires information (hereinafter, referred to as intra prediction mode information) representing an optimal intra prediction mode from the intra prediction unit 24. In addition, the lossless encoding unit 16 acquires information representing the optimal inter prediction mode (hereinafter, referred to as inter prediction mode information), a motion vector, information used for specifying a reference image, and the like from the motion prediction/compensation unit 25. Furthermore, the lossless encoding unit 16 acquires stored flags, an index or an offset, and type information from the adaptive offset filter 41 as offset filter information and acquires filter coefficients from the adaptive loop filter 42.

The lossless encoding unit 16 performs lossless coding such as a variable length coding (for example, CAVLC (Context-Adaptive Variable Length Coding) or the like), arithmetic coding (for example, CABAC (Context-Adaptive Binary Arithmetic Coding) or the like) for the quantized coefficients supplied from the quantization unit 15.

In addition, the lossless encoding unit 16 performs lossless coding of the intra prediction mode information or the inter prediction mode information, the motion vector, the information specifying a reference image, the offset filter information, the filter coefficients, and the like as coding information relating to coding. The lossless encoding unit 16 generates a coded stream based on the coding information and the coefficients that have been coded in a lossless manner and supplies the generated coded stream to the accumulation buffer 17 so as to be accumulated therein. Here, the coding information that is coded in a lossless manner may be regarded as header information of the coefficients that are coded in a lossless manner.

The accumulation buffer 17 temporarily stores the coded stream supplied from the lossless encoding unit 16. In addition, the accumulation buffer 17 supplies the stored coded stream to the file generating unit 2 illustrated in FIG. 1.

In addition, the quantized coefficients output from the quantization unit 15 are input also to the inverse quantization unit 18, are inversely quantized, and then, are supplied to the inverse orthogonal transform unit 19.

The inverse orthogonal transform unit 19 performs an inverse orthogonal transform for the coefficients supplied from the inverse quantization unit 18 and supplies differential information acquired as a result thereof to the addition unit 20.

The addition unit 20 adds the differential information as a current decoding image supplied from the inverse orthogonal transform unit. 19 and the predicted image supplied from the predicted image selecting unit 26 together, thereby acquiring a locally-decoded image. In addition, in a case where a predicted image is not supplied from the predicted image selecting unit 26, the addition unit 20 sets the differential information supplied from the inverse orthogonal transform unit 19 as a locally-decoded image. The addition unit 20 supplies the locally-decoded image to the deblocking filter 21 and supplies the locally-decoded image to the frame memory 22 so as to be accumulated therein.

The deblocking filter 21 filters the image, which is locally decoded, supplied from the addition unit 20, thereby removing a block distortion. The deblocking filter 21 supplies an image acquired as a result thereof to the adaptive offset filter 41.

The adaptive offset filter 41 performs an adaptive offset filter (SAO: Sample adaptive offset) process of mainly removing ringing for the image for which the adaptive deblocking filter process has been performed by the deblocking filter 21.

Described in more detail, the adaptive offset filter 41 determines the type of the adaptive offset filter process for each LCU (Largest Coding Unit) that is a maximal encoding unit and acquires an offset that is used for the adaptive offset filter process. The adaptive offset filter 41 performs the adaptive offset filter process of the determined type for the image acquired after the adaptive deblocking filter process by using the acquired offset. Then, the adaptive offset filter 41 supplies the image acquired after the adaptive offset filter process to the adaptive loop filter 42.

In addition, the adaptive offset filter 41 includes a buffer that stores an offset. The adaptive offset filter 41 determines whether or not the offset used for the adaptive deblocking filter process has already been stored in the buffer for each LCU.

In a case where the offset used for the adaptive deblocking filter process is determined to have already been stored in the buffer, the adaptive offset filter 41 sets a storage flag representing whether the offset is stored in the buffer to a value (here, 1) representing that the offset is stored in the buffer.

Then, the adaptive offset filter 41 supplies the storage flag set to "1", the index representing a storage position of an offset in the buffer, and the type information representing the type of the performed adaptive offset filter process to the lossless encoding unit 16 for each LCU.

On the other hand, in a case where the offset used for the adaptive deblocking filter process is not stored in the buffer yet, the adaptive offset filter 41 sequentially stores the offset in the buffer. In addition, the adaptive offset filter 41 sets the storage flag to a value (here, "0") representing that the offset is not stored in the buffer. Then, the adaptive offset filter 41 supplies the storage flag set to "0", the offset, and the type information to the lossless encoding unit 16 for each LCU.

The adaptive loop filter 42, for example, performs an adaptive loop filter (ALF) process for the image, which is acquired after the adaptive offset filter process, supplied from the adaptive offset filter 41 for each LCU. As the adaptive loop filter process, for example, a process using a two-dimensional Wiener filter is used. It is apparent that a filter other than the Wiener filter may be used.

More specifically, the adaptive loop filter 42 calculates filter coefficients used for the adaptive loop filter process for each LCU such that a difference between the original image that is an image output from the screen rearrangement buffer 12 and an image acquired after the adaptive loop filter process is minimized. Then, the adaptive loop filter 42 performs an adaptive loop filter process for the image acquired after the adaptive offset filter process by using the calculated filter coefficients for each LCU.

The adaptive loop filter 42 supplies the image acquired after the adaptive loop filter process to the frame memory 22. In addition, the adaptive loop filter 42 supplies the filter coefficients to the lossless encoding unit 16.

Here, while the adaptive loop filter process is performed for each LCU, the processing unit of the adaptive loop filter process is not limited to the LCU. However, by matching the processing units of the adaptive offset filter 41 and the adaptive loop filter 42, the process can be efficiently performed.

The image accumulated in the frame memory 22 is output to the intra prediction unit 24 or the motion prediction/compensation unit 25 through the switch 23 as a reference image.

The intra prediction unit 24 performs an intra prediction process of each of all the intra prediction modes that are candidates in units of tiles and slices by using the reference image, which has not been filtered by the deblocking filter 21, read from the frame memory 22 through the switch 23.

In addition, the intra prediction unit 24 calculates cost function values (to be described later in detail) for all the intra prediction modes that are candidates based on the image read from the screen rearrangement buffer 12 and the predicted image generated as a result of the intra prediction process. Then, the intra prediction unit 24 determines an intra prediction mode of which the cost function value is smallest as an optimal intra prediction mode.

The intra prediction unit 24 supplies the predicted image generated in the optimal intra prediction mode and a corresponding cost function value to the predicted image selecting unit 26. In a case where the intra prediction unit 24 is notified of the selection of the predicted image generated in the optimal intra prediction mode from the predicted image selecting unit 26, the intra prediction unit 24 supplies the intra prediction mode information to the lossless encoding unit 16.

The cost function value is also called an RD (Rate Distortion) cost and, for example, is calculated using a technique of one of a high complexity mode and a low complexity mode as defined in a JM (Joint Model) that is reference software in the H.264/AVC system.

More specifically, in a case where the high complexity mode is employed as the technique for calculating the cost function value, for all the prediction modes that are candidates, the process up to the lossless coding is temporarily performed, and a cost function value represented in the following Equation (1) is calculated for each prediction mode.

$$\text{Cost(Mode)} = D + \lambda \cdot R \tag{1}$$

Here, D is a difference between the original image and a decoded image, R is a generated coding amount including up to the coefficients of the orthogonal transform, and $\lambda$ is a Lagrange multiplier that is given as a function of the quantization parameter QP.

On the other hand, in a case where the low complexity mode is employed as the technique for calculating the cost function value, for each of all the prediction modes that are candidates, a decoded image is generated, and a header bit such as information representing a prediction mode is calculated, and the cost function value represented in the following Equation (2) is calculated for each prediction mode.

$$\text{Cost(Mode)} = D + Q P \text{toQuant}(QP) \cdot \text{Header\_Bit} \tag{2}$$

Here, D is a difference (distortion) between the original image and a decoded image, Header_Bit is a header bit for a prediction mode, and QPtoQuant is a function given as a function of the quantization parameter QP.

In the low complexity mode, only decoded images may be generated for all the prediction modes, and lossless coding does not need to be performed, whereby the calculation amount is reduced.

The motion prediction/compensation unit 25 performs a motion prediction/compensation processes in each of all the inter prediction modes that are candidates in units of tiles and slices. More specifically, the motion prediction/compensation unit 25 detects a motion vector of each of all the inter prediction modes that are candidates in units of tiles and slices based on the image supplied from the screen rearrangement buffer 12 and the filtered reference image read from the frame memory 22 through the switch 23. Then, the motion prediction/compensation unit 25 performs a compensation process for the reference image based on the motion vector in units of tiles and slices, thereby generating a predicted image.

At this time, the motion prediction/compensation unit 25 calculates a cost function value for each of all the inter prediction modes that are candidates based on the image supplied from the screen rearrangement buffer 12 and the predicted image and determines an inter prediction mode of which the cost function value is smallest as the optimal inter prediction mode. Then, the motion prediction/compensation unit 25 supplies the cost function value of the optimal inter prediction mode and a corresponding predicted image to the predicted image selecting unit 26. In addition, in a case where the motion prediction/compensation unit 25 is notified of the selection of the predicted image generated in the optimal inter prediction mode from the predicted image selecting unit 26, the motion prediction/compensation unit 25 outputs the inter prediction mode information, a corresponding motion vector, the information specifying the reference image, and the like to the lossless encoding unit 16.

The predicted image selecting unit 26 determines one of the optimal intra prediction mode and the optimal inter prediction mode that has a smaller cost function value as the optimal prediction mode based on the cost function values supplied from the intra prediction unit 24 and the motion prediction/compensation unit 25. Then, the predicted image selecting unit 26 supplies the predicted image of the optimal prediction mode to the calculation unit 13 and the addition unit 20. In addition, the predicted image selecting unit 26 notifies the intra prediction unit 24 or the motion prediction/compensation unit 25 of the selection of the predicted image of the optimal prediction mode.

The rate control unit 27 performs control of the quantization operation performed by the quantization unit 15 based on the coded data accumulated in the accumulation buffer 17 such that an overflow or an underflow does not occur.

[Background and Problem]

In an AVC file format defined in ISO/IEC 14496-15, it is not allowed to include the startcode and the filler data in a bitstream (Elementary Stream). However, the processing load at the time of handling data of an ISO base media file format, an MPEG-2 TS (Transport Stream), and the like is caused to increase.

In addition, in order to generate (convert) an MPEG-2 TS from the bitstream (Elementary Stream), there are cases where the value of a parameter managing the decoder buffer becomes different by removing the startcode and the filler data (dummy data used for adjusting the data size). Accordingly, for example, it is necessary to reset buffering period SEI (Supplemental enhancement information), which leads to an increase in the processing load at the time of converting the bitstream.

[Operation of File Generating Unit]

Thus, in a case where a stream used at the time of transmission or a stream used at the time of storing data in a file is generated, the file generating unit 2 sets startcode and filler data for a file including a bitstream acquired by coding an image and performs controls of the setting of the startcode and the filler data such that the startcode and the filler data, which have been set, configure a file with the characteristic of the parameter managing the decoder buffer being maintained in media data of the file.

In addition, in a case where the startcode and the filler data are removed from media data of a file including a bitstream acquired by coding an image, the file generating unit 2 sets a characteristic of the parameter managing the decoder buffer and generates a file by using the set characteristic.

Here, the parameter managing the decoder buffer is an HRD parameter (Hypothetical Reference Decoder Parameter), in other words, a parameter that manages a virtual reference decoder. This parameter that manages the decoder buffer is a parameter included in the VUI, a parameter included in the buffering period SEI, or a parameter included in the picture timing SEI.

By configuring as above, in a case where a stream at the time of transmission or at the time of storing data in a file is generated (converted), the startcode and the filler data do not need to be reset, and the processing burden can be reduced.

In addition, the filler data may be responded as below. In other words, in the AVC or HEVC system, the filler data is non-VCL to be in a table of NAL unit type codes and NAL unit type classes. More specifically, when nal_unit_type is 31, Name of nal_unit_type is FD_NUT, and Content of NAL unit and RBSP syntax structure is filler data and filler_data_rbsp( ), NAL unit type class is non-VCL. By changing this non-VCL to VCL data, the filler data can be included in the media data of the file, and accordingly, it can be suppressed that the filler data is removed at the time of conversion into a transmission stream.

More specifically, the file generating unit 2 performs setting of the startcode and the filler data as below.

Startcode and Filler Data

Therefore, this contribution proposes to allow to include startcode and filler data in the elementary streams for new brands only.

In the original version of ISO/IEC 14496-15, SPS/PPS can't be included in the elementary stream. In ISO/IEC 14496-16 PDAM2, it is allowed to include SPS/PPS now. If it is allowed to include startcode and filler data in the elementary stream, then the burden for bitstream converter is significantly reduced. Rewriting of HRD parameters, e.g. buffering period SEI and picture timing SEI, is not necessary in this case.

In order to ensure backward compatibility, this change should be applied to new brands. (new AVC brand and HEVC)

Indication that HRD Parameters are Wrong

When startcode, filler data, etc. were removed from the elementary stream to store ISOMFF, HRD parameters, e.g. buffering period SEI, picture timing SEI, etc. are not correct. However, decoder cannot know if HRD parameters in the elementary stream is correct. There should be an id to indicate the HRD parameters in the elementary stream may be wrong.

In HEVC or AVC Change Filler Data as VCL Data

Currently in HEVC and AVC, filler data is categorized as non-VCL. That mean the bit for filler data is counted as non-VCL (header information). However, if we specify filler data as VCLdata, the bit for filler is counted as video bitstream itself. In this case, filler data is not necessary to remove from the elementary stream and HRD parameters are not changed. The table for HEVC is attached.

Furthermore, in a case where the parameter that manages the decoder buffer is different (incorrect), the decoder cannot determine whether the parameter managing the decoder buffer is the same (correct). Thus, in a case where the startcode and the filler data are removed from the bitstream, an identification parameter used for identifying whether the characteristic of the parameter managing the decoder buffer is changed is set. As an example, a case will be represented in which the identification parameter is stored in an optional box of the file format.

For example, in case of the AVC, such id can be defined as an optional box in AVCSampleEntry as follows. (The same approach can be applied to other AVC sample entries and HEVCSampleEntry.)

AVCSampleEntry ( ) extends VisualSampleEntry (type') {
//type is 'avc1' or 'avc3'
AVCConfigurationBox config;
MPEG4BitRateBox ( ); //Optional
MPEG4ExtensionDescriptorsBox ( ); //Optional
HRDConformanceBox ( ); //Optional
}
Add HRDConformanceBox into AVCSampleEntry and
AVC2SVVSampleEntry in 5.4.2.1
Add HRDConformanceBox into AVCSVCSampleEntry,
AVC2SVCSampleEntry and SVCSampleEntry in 6.5.3.1.
Add HRDConformanceBox into AVCMVCSampleEntry,
AVC2MVCSampleEntry and MVCSampleEntry in section7.6.3.3.
Add HRDConformanceBox into HEVC SampleEntry in section
8.4.1.1.
HRDConformanceBox can be defined as follows.
class HRDConformanceBox extends Box ('hrdc') {
HRDConformanceData ( ) HRDConformance;
}
aligned (8) class HRDConformanceData {
unsigned int (7) reserved =0;

```
unsigned int (1) HRDConformanceFlag;
unsigned int (24) reserved;
Box [ ] any_box; //Optional
}
```

The identification parameter, for example, is set as below.

HRDConformanceFlag is the identifier if HRD characteristics was changed by removing startcode, filler data, etc from the elementary stream. When HRDConformanceFlag is equal to 1, the HRD parameters, e.g. buffering period SEI, picture timing SEI, was changed by removing startcode, filler data, etc from the elementary stream.

The file generating unit 2, which is illustrated in FIG. 1, performing the process described above is configured as illustrated in FIG. 3.

[Configuration Example of File Generating Unit]

Figure 3:
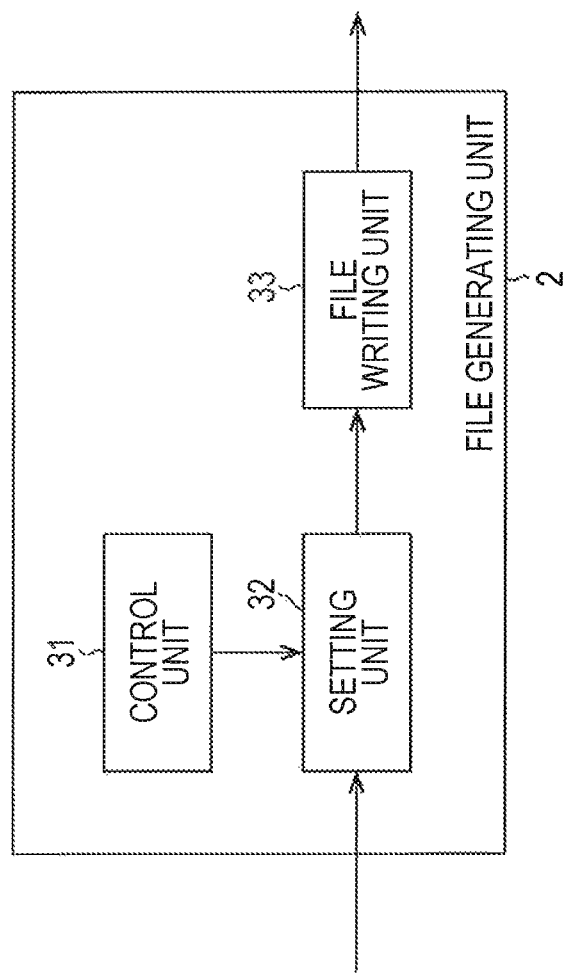
FIG. 3 is a block diagram that illustrates an example of the configuration of a file generating unit.

FIG. 3 is a block diagram that illustrates an example of the configuration of the file generating unit that performs the process described above.

In the example illustrated in FIG. 3, the file generating unit 2 is configured to include a control unit 31, a setting unit 32, and a file writing unit 33.

The control unit 31 controls a process of generating mdat data, which is a VCL data part of a file, that is performed by the setting unit 32 based on whether or not the characteristic of the HRD parameter that is a parameter managing the decoder buffer is to be maintained. In addition, the control unit 31 controls the setting of the characteristic of the HRD parameter or the setting of the identification parameter of the HRD in moov that is a management information part of the file based on whether or not the startcode and the filler data are removed from the mdat data set by the setting unit 32.

The setting unit 32 generates the mdat data of the file by using the coded stream supplied from the encoder 1 under the control of the control unit 31 and supplies the generated mdat data to the file writing unit 33. While the startcode and the filler data are removed according to a conventional technique, according to the technique of the present technology, the mdat data is generated with the startcode and the filler data set in the coded stream being set.

In addition, the setting unit 32 resets the characteristic of the HRD parameter or sets the identification parameter of the HRD in the moov of the file under the control of the control unit 31. Then, the setting unit 32 generates moov of the file and supplies the generated moov to the file writing unit 33.

The file writing unit 33 writes the moov supplied from the setting unit 32 into a file and writes the mdat into the file. The file of MP4 written by the file writing unit 33 is transmitted to a decoding apparatus to be described later or the like and is read and decoded by the decoding apparatus.

[Example of File Generating Process]

Next, the file generating process performed by the file generating unit 2 will be described with reference to a flowchart represented in FIG. 4.

In step S1, the control unit 31 determines whether or not the characteristic of the HRD parameter that is the parameter managing the decoder buffer is to be maintained. In step S1, in a case where the characteristic of the HRD parameter is determined not to be maintained, the process proceeds to step S2. In step S2, the setting unit 32 performs a conventional mdat data generating process under the control of the control unit 31. This process will be described later with reference to FIG. 6.

In the process of step S2, startcode is detected, NAL data is acquired, and the startcode is removed. Then, addition of a Unit size, accumulation of data in the buffer, or discard of data is performed based on whether the acquired data is VCL data, filler data, management information, or the like, whereby mdat data is generated. The generated mdat data is supplied to the file writing unit 33, and the process proceeds to step S4.

On the other hand, in step S1, in a case where the characteristic of the HRD parameter is determined to be maintained, the process proceeds to step S3. In step S3, the setting unit 32 performs an mdat data generating process according to the present technology under the control of the control unit 31. This process will be described later with reference to FIG. 7.

In the process of step S3, startcode is detected, NAL data is acquired, the acquired data is set as VCL data, a Unit Size is added, and resultant data is accumulated in the buffer, whereby mdat data is generated. The generated mdat data is supplied to the file writing unit 33, and the process proceeds to step S4.

In step S4, the control unit 31 determines whether or not the startcode and the filler data have been removed from the mdat data generated in step S2 or S3.

In step S4, in a case where the startcode and the filler data are determined to have been removed, the process proceeds to step S5. In step S5, the setting unit 32 sets the characteristic of the HRD parameter. In other words, since the characteristic of the HRD parameter is different, the characteristic of the HRD parameter is recalculated and is set again. Then, the SEI and the VUI of the mdat data are rewritten by the set HRD parameter.

In step S4, in a case where the startcode and the filler data are determined not to have been removed, the process of step S5 is skipped, and the process proceeds to step S6.

In step S6, the setting unit 32 generates moov of the file by using the size information of the data that is acquired by the process of step S2 or S3. In addition, in a case where the process of step S3 is performed, the management information and the like accumulated in a buffer for the moov are also used. The generated moov is supplied to the file writing unit 33.

In step S7, the file writing unit 33 writes the moov generated in step S6 into the file.

In step S8, the file writing unit 33 writes the mdat generated in step S2 or S3 into the file.

The file of MP4 written by the file writing unit 33, as described above, is transmitted to the decoding apparatus to be described later or the like and is read and decoded by the decoding apparatus. At that time, the file is generated without changing the characteristic of the HRD parameter. In addition, even when the startcode and the filler data have been removed, the HRD parameter is set again, and accordingly, by referring to the HRD parameter, the decoding process can be correctly performed.

Figure 4:
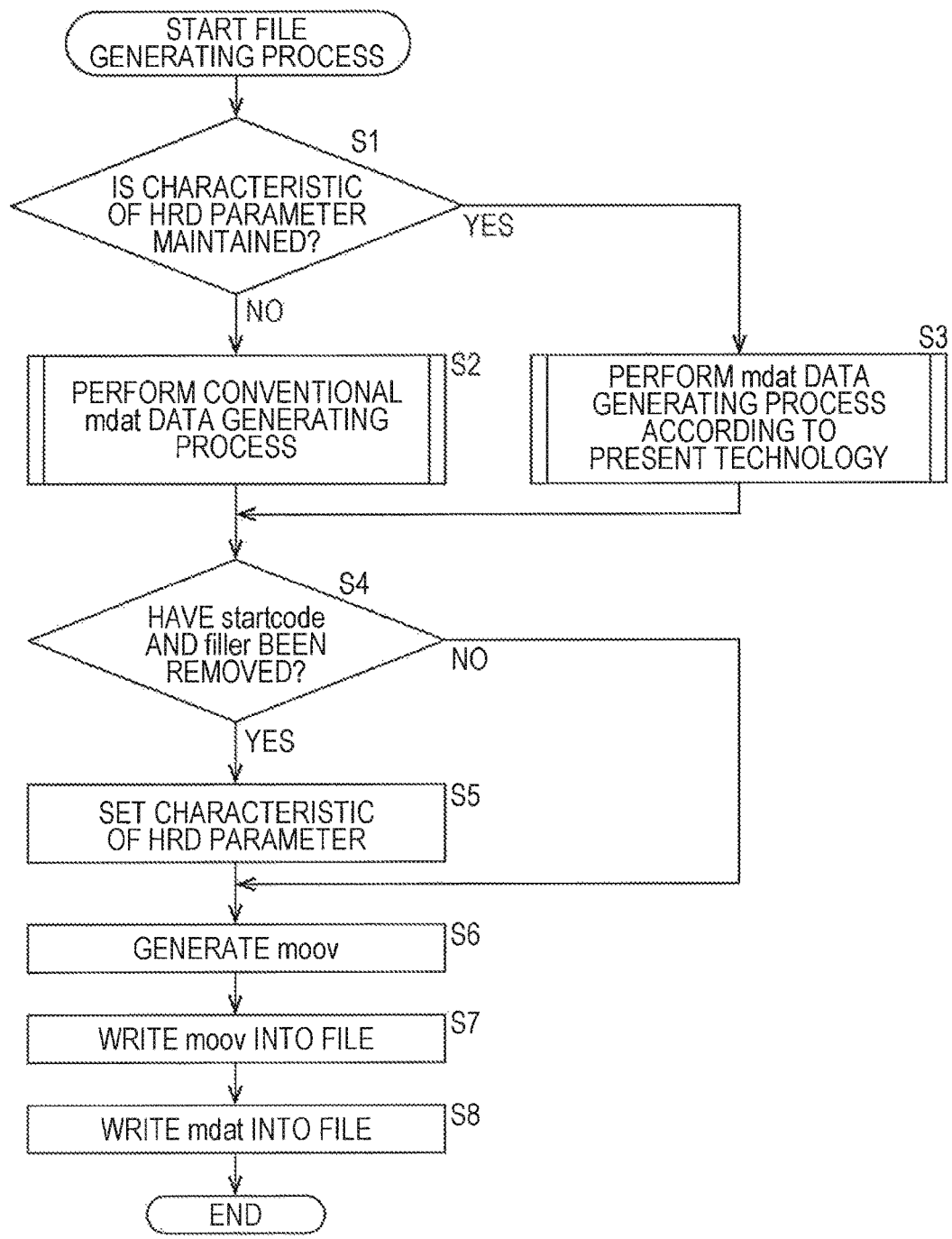
FIG. 4 is a flowchart that illustrates a file generating process.

In the description of FIG. 4, while an example has been described in which the characteristic of the HRD parameter is set again in a case where the startcode and the filler data are removed, as will be described next, an identification parameter that represents whether the characteristic of the HRD parameter is correct or different may be set.

[Another Example of File Generating Process]

Next, the file generating process performed by the file generating unit 2 will be described with reference to a flowchart represented in FIG. 5.

In step S11, the control unit 31 determines whether or not the characteristic of the HRD parameter that is the parameter managing the decoder buffer is to be maintained. In step S11, in a case where the characteristic of the HRD parameter is determined not to be maintained, the process proceeds to step S12. In step S12, the setting unit 32 performs a conventional mdat data generating process under the control of the control unit 31. This process will be described later with reference to FIG. 5.

In the process of step S12, startcode is detected, NAL data is acquired, and the startcode is removed. Then, addition of a Unit size, accumulation of data in the buffer, or discard of data is performed based on whether the acquired data is VCL data, filler data, management information, or the like, whereby mdat data is generated. The generated mdat data is supplied to the file writing unit 33, and the process proceeds to step S14.

On the other hand, in step S11, in a case where the characteristic of the HRD parameter is determined to be maintained, the process proceeds to step S13. In step S13, the setting unit 32 performs an mdat data generating process according to the present technology under the control of the control unit 31. This process will be described later with reference to FIG. 6.

In the process of step S13, startcode is detected, NAL data is acquired, the acquired data is set as VCL data, a Unit Size is added, and resultant data is accumulated in the buffer, whereby mdat data is generated. The generated mdat data is supplied to the file writing unit 33, and the process proceeds to step S14.

In step S14, the control unit 31 determines whether or not the startcode and the filler data have been removed from the mdat data generated in step S12 or S13.

In step S14, in a case where the startcode and the filler data are determined not to have been removed, the process proceeds to step S15. In step S15, the setting unit 32 sets the identification parameter of the HRD of the moov to "1", and the process proceeds to step S17. Accordingly, it can be determined that the HRD parameter is correct on the decoding side.

In step S14, in a case where the startcode and the filler data are determined to have been removed, the process proceeds to step S16. In step S16, the setting unit 32 sets the identification parameter of the HRD of the moov to "0", and the process proceeds to step S17. Accordingly, it can be determined that the HRD parameter is erroneous (incorrect) on the decoding side.

In step S17, the setting unit 32 generates moov of the file by using the size information of the data that is acquired by the process of step S12 or S13. In addition, in a case where the process of step S13 is performed, the management information and the like accumulated in a buffer for the moov are also used. The generated moov is supplied to the file writing unit 33.

In step S18, the file writing unit 33 writes the moov generated in step S17 into the file.

In step S19, the file writing unit 33 writes the mdat generated in step S12 or S13 into the file.

The file of MP4 written by the file writing unit 33, as described above, is transmitted to the decoding apparatus to be described later or the like and is read and decoded by the decoding apparatus. At that time, the file is generated without changing the characteristic of the HRD parameter. In addition, since the identification parameter used for identifying whether the HRD parameter is correct is set, by referring to the HRD parameter, it can be clearly determined whether or not decoding is performed.

[Example of Conventional Mdat Data Generating Process]

Next, the conventional mdat data generating process performed in step S2 (step S12 represented in FIG. 5) represented in FIG. 4 will be described with reference to a flowchart illustrated in FIG. 6.

The setting unit 32 detects a startcode from a coded stream supplied from the encoder 1 in step S21 and acquires NAL data from the startcode detected in step 321 to the next startcode in step S22.

In step S23, the setting unit 32 removes the startcode that has been detected in step S21. In step S24, it is determined whether or not data acquired in step S22 is VCL data.

In step S24, in a case where the data acquired in step S22 is determined to be VCL data, the process proceeds to step S25. In step S25, the setting unit 32 adds a corresponding unit size to the data acquired in step S22 and sets resultant data as an access unit. Then, in step S26, the setting unit 32 accumulates the access unit to which the unit size has been added in a built-in mdat buffer, and the process proceeds to step S30.

On the other hand, in step S24, in a case where the data acquired in step S22 is determined not to be the VCL data, the process proceeds to step S27. In step S27, the setting unit 32 determines whether or not the data acquired in step S22 is filler data.

In step S27, in a case where the data acquired in step S22 is determined to be filler data, the process proceeds to step S28. In step S28, the setting unit 32 discards the filler data, and the process proceeds to step S30.

On the other hand, in step S27, in a case where the data acquired in step S22 is determined not to be filler data, the process proceeds to step S29. In such a case, since the acquired data is management information such as an SPS, a PPS, or the like, in step S29, the setting unit 32 accumulates the acquired data in a built-in moov buffer, and the process proceeds to step S30.

In step S30, the setting unit 32 detects a startcode from a coded stream supplied from the encoder 1.

In step 331, the setting unit 32 determines whether or not current data is final data of the file. In a case where a startcode is not detected in step S30, in step S31, the current data is determined as the final data of the file, the mdat data generating process ends, and the process is returned to step S2 (or step S12 represented in FIG. 5) represented in FIG. 4.

On the other hand, in a case where a startcode is detected in step S30, in step S31, in a case where the final data is determined not to be final data of the file, the process proceeds to step S22, and processes of steps S22 and subsequent thereto are repeated.

[Example of Mdat Data Generating Process According to Present Technology]

Figure 7:
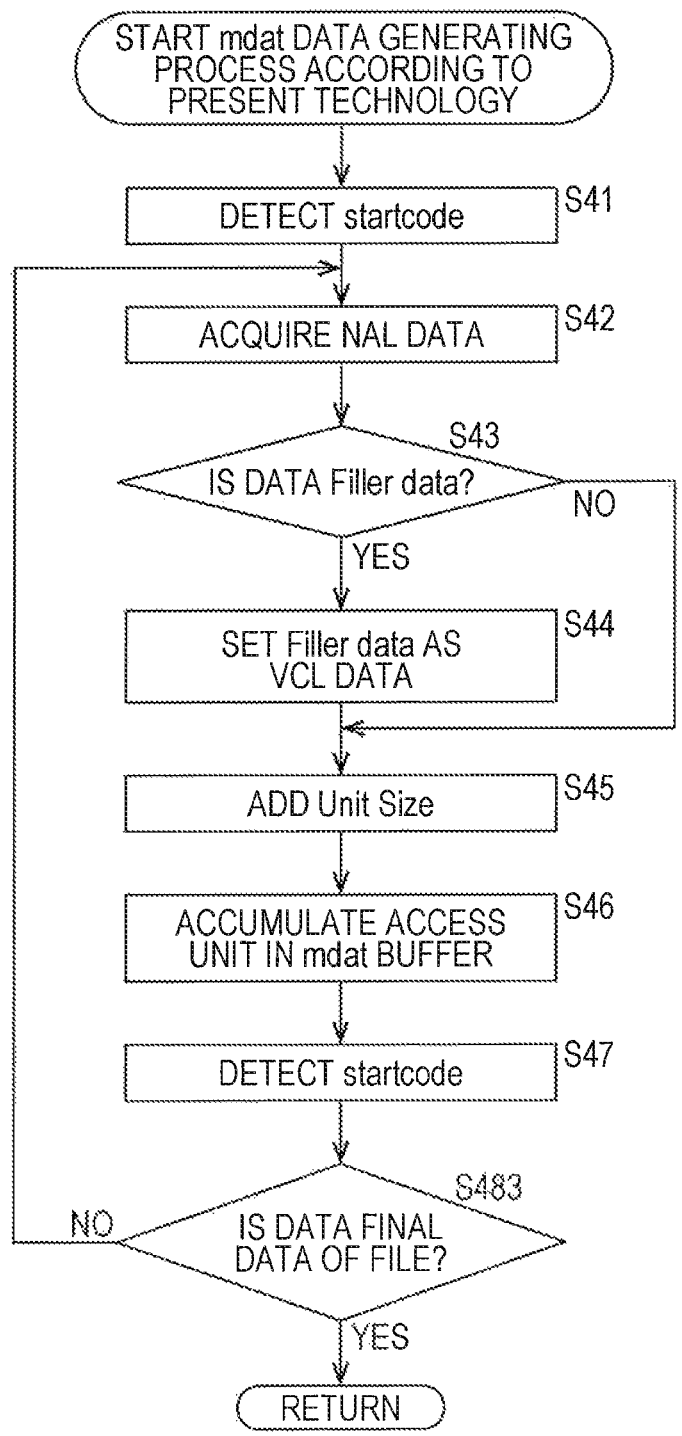
FIG. 7 is a flowchart that illustrates a process of generating mdat data according to the present technology.

In contrast to this, a mdat data generating process according to the present technology that is performed in step S3 (step S13 represented in FIG. 5) represented in FIG. 4 will be described with reference to a flowchart illustrated in FIG. 7.

The setting unit 32 detects a startcode from a coded stream supplied from the encoder 1 in step S41 and acquires NAL data from the startcode detected in step S41 to the next startcode in step S42. In the example illustrated in FIG. 7, the startcode is not removed.

In step S43, the setting unit 32 determines whether or not the data acquired in step S42 is filler data. In step S43, in a case where the data acquired in step S42 is determined to be filler data, the process proceeds to step S44. In step S44, the setting unit 32 sets the filler data as VCL data.

On the other hand, in step S43, in a case where the data acquired in step S42 is determined not to be filler data, the process of step S44 is skipped, and the process proceeds to step S45.

In step S45, a corresponding unit size is added to the data acquired in step S42, resultant data is set as an access unit, and the access unit to which the unit size has been added in step S46 is accumulated in a built-in mdat buffer. Here, in a case where the acquired data is management information such as an SPS or a PPS, the data is also accumulated in a built-in moov buffer and is stored in Sample Description of the moov as a default SPS or PPS in step S6 represented in FIG. 4 or step S17 represented in FIG. 5.

Here, in the case where the acquired data is management information such as an SPS or a PPS, similarly to the conventional case, the acquired data may be stored not in the mdat buffer but only in the built-in moov buffer.

In step S47, the setting unit 32 detects a startcode from a coded stream supplied from the encoder 1.

In step S48, the setting unit 32 determines whether or not the current data is final data of the file. In a case where a startcode is not detected in step S47, in step S48, the current data is determined to be the final data of the file, the mdat data generating process ends, and the process is returned to step S3 (step S13 represented in FIG. 5) represented in FIG. 4.

In a case where a startcode is detected in step S47, in step S48, in a case where the current data is determined not to be the final data of the file, the process proceeds to step S42, and processes of steps S42 and subsequent thereto are repeated.

As above, according to the present technology, the setting of the startcode and the filler data is controlled such that the file is configured with the characteristic of the parameter managing the decoder buffer being maintained. In other words, the startcode and the filler data are not removed, and the file is configured to include the startcode and the filler data, and accordingly, the characteristic of the parameter managing the decoder buffer can be maintained.

In addition, since the filler data is changed to the VCL data, the filler data can be included in the media data of the file, and it can be suppressed that the filler data is removed at the time of conversion into a transmission stream.

Furthermore, in a case where the startcode and the filler data are removed from the media data of the file, the characteristic of the parameter managing the decoder buffer is set, and a file is generated by using the set parameter. Accordingly, decoding can be correctly performed.

Alternatively, in a case where the startcode and the filler data are removed from the media data of the file, the identification parameter identifying that the characteristic of the parameter has been changed is set, and a file is generated by using the set identification parameter. Accordingly, decoding can be correctly performed.

[Configuration Example of Decoding Apparatus According to First Embodiment]

Figure 8:
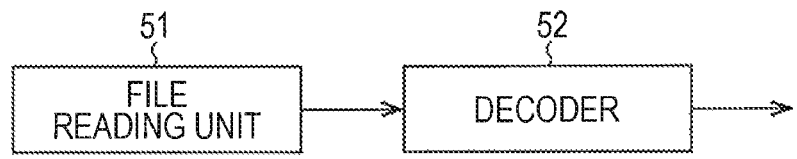
FIG. 8 is a block diagram that illustrates an example of the configuration of a decoding apparatus, to which the present technology is applied, according to the first embodiment.

FIG. 8 is a block diagram that illustrates an example of the configuration of a decoding apparatus, which decodes a coded stream transmitted from the coding apparatus illustrated in FIG. 1, according to the first embodiment as an image processing device to which the present technology is applied.

The decoding apparatus illustrated in FIG. 8 is configured by a file reading unit 51 and a decoder 52.

The file reading unit 51 of the decoding apparatus receives a file of MP4 generated by the coding apparatus illustrated in FIG. 1 and reads an SPS, a PPS, VUI, SEI, coded data, and the like configuring a coded stream that is coded by the encoder 1 illustrated in FIG. 1 from the received file. The file reading unit 51 supplies the SPS, the PPS, the VUI, the SEI, and the coded data to the decoder 52.

More specifically, the file reading unit 51 receives a file that is controlled to be set such that the startcode and the filler data configure the file with the characteristic of the parameter managing the decoder buffer being maintained in media data of the file that includes a bitstream acquired by coding an image. Alternatively, in a case where the startcode and the filler data are removed from media data of a file including a bitstream acquired by coding an image, the file reading unit 51 receives a file that is generated by using a set characteristic of the parameter managing the decoder buffer that is set. Then, the file reading unit 51 reads the received file and causes the decoder 52 to decode the coded data of the bitstream.

The decoder 52, under the control of the file reading unit 51, refers to the SPS, PPS, the VUI, the SEI, and the like (particularly, the characteristic of the HRD parameter) supplied from the file reading unit 51 and decodes the coded data supplied from the file reading unit 51 by using the HEVC system. The decoder 52 supplies an image acquired as a result of the decoding process to a later stage as an output signal.

[Configuration Example of File Reading Unit]

Figure 9:
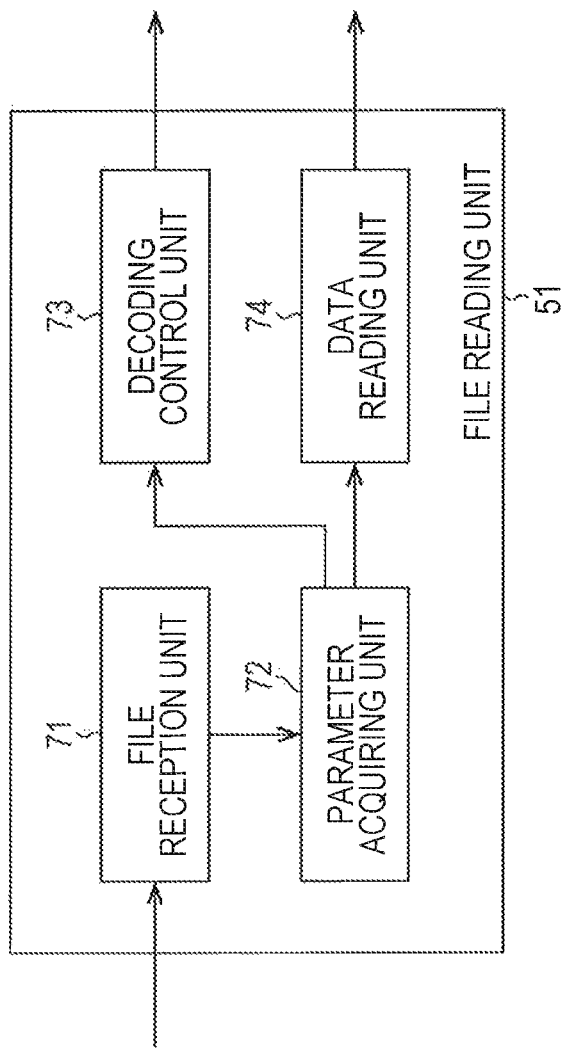
FIG. 9 is a block diagram that illustrates an example of the configuration of a file reading unit.

FIG. 9 is a block diagram that illustrates an example of the configuration of the file reading unit 51.

In the example illustrated in FIG. 9, the file reading unit 51 is configured to include: a file reception unit 71; a parameter acquiring unit 72; a decoding control unit 73; and a data reading unit 74.

The file reception unit 71 receives a file of MP4 generated by the file generating unit 2 illustrated in FIG. 1 and supplies the received file to the parameter acquiring unit 72.

The parameter acquiring unit 72 acquires a moov that is management information from the file of MP4 and supplies the acquired moov to the data reading unit 74. In addition, the parameter acquiring unit 72 causes the data reading unit 74 to read data from the mdat based on the acquired moov.

Figure 5:
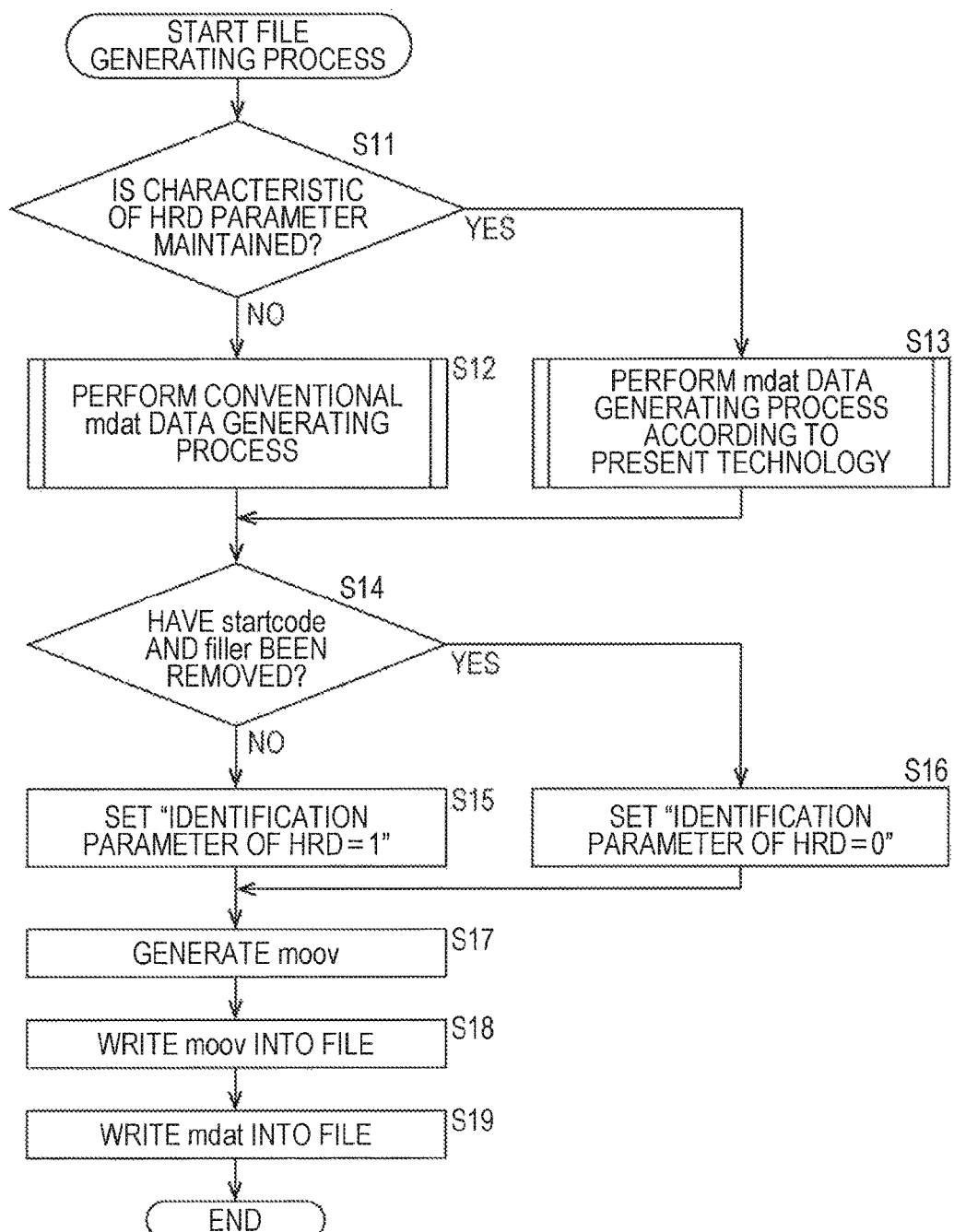
FIG. 5 is a flowchart that illustrates another example of the file generating process.
Figure 6:
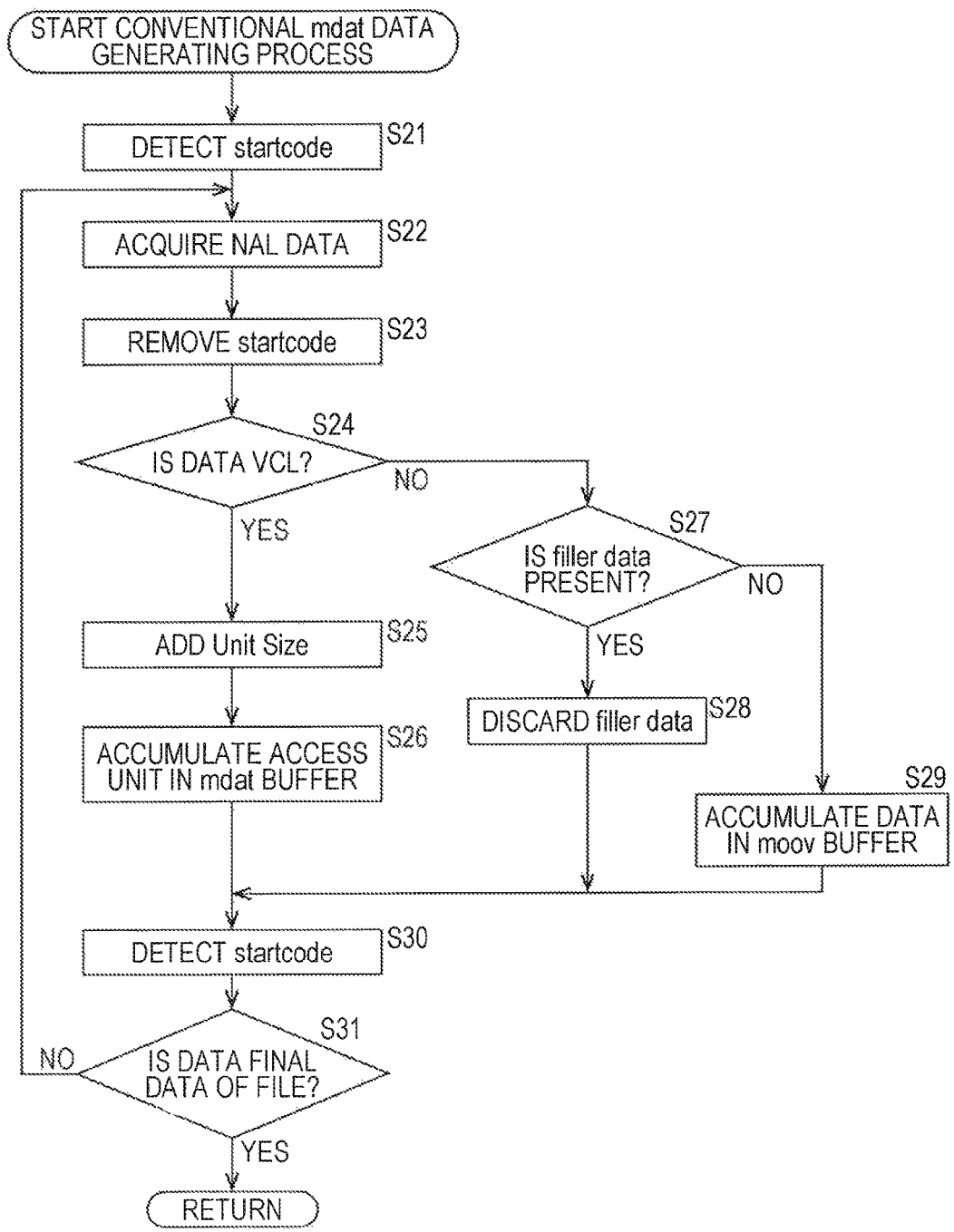
FIG. 6 is a flowchart that illustrates a conventional process of generating mdat data.

In addition, in the case of a file generated by the file generating process illustrated in FIG. 5, the parameter acquiring unit 72 acquires an identification parameter used for determining whether or not the characteristic of the HRD parameter is correct from the moov and supplies the identification parameter to the decoding control unit. 73.

In a case where the identification parameter of the HRD supplied from the parameter acquiring unit 72 is present, the decoding control unit 73 determines whether to follow the HRD parameter based on the identification parameter of the HRD and controls the decoder 52, thereby performing a decoding process.

Meanwhile, in the case of a file generated by the file generating process illustrated in FIG. 4, while the identification parameter of the HRD is not present in the moov, even when the startcode and the filler data of the file of MP4 are removed, the characteristic of the HRD parameter is set again, and accordingly, the characteristic is correct. Thus, in this case, the decoding control unit 73 does not particularly perform an operation.

The data reading unit 74, under the control of the parameter acquiring unit 72, reads an SPS, a PPS, VUI, SEI, and the like from the moov or the mdat of the file and reads coded data from the mdat of the file. Then, the data reading unit 74 supplies the SPS, the PPS, the VUI, the SET, the coded data, and the like that have been read to the decoder 52.

[Configuration Example of Decoding Unit]

Figure 10:
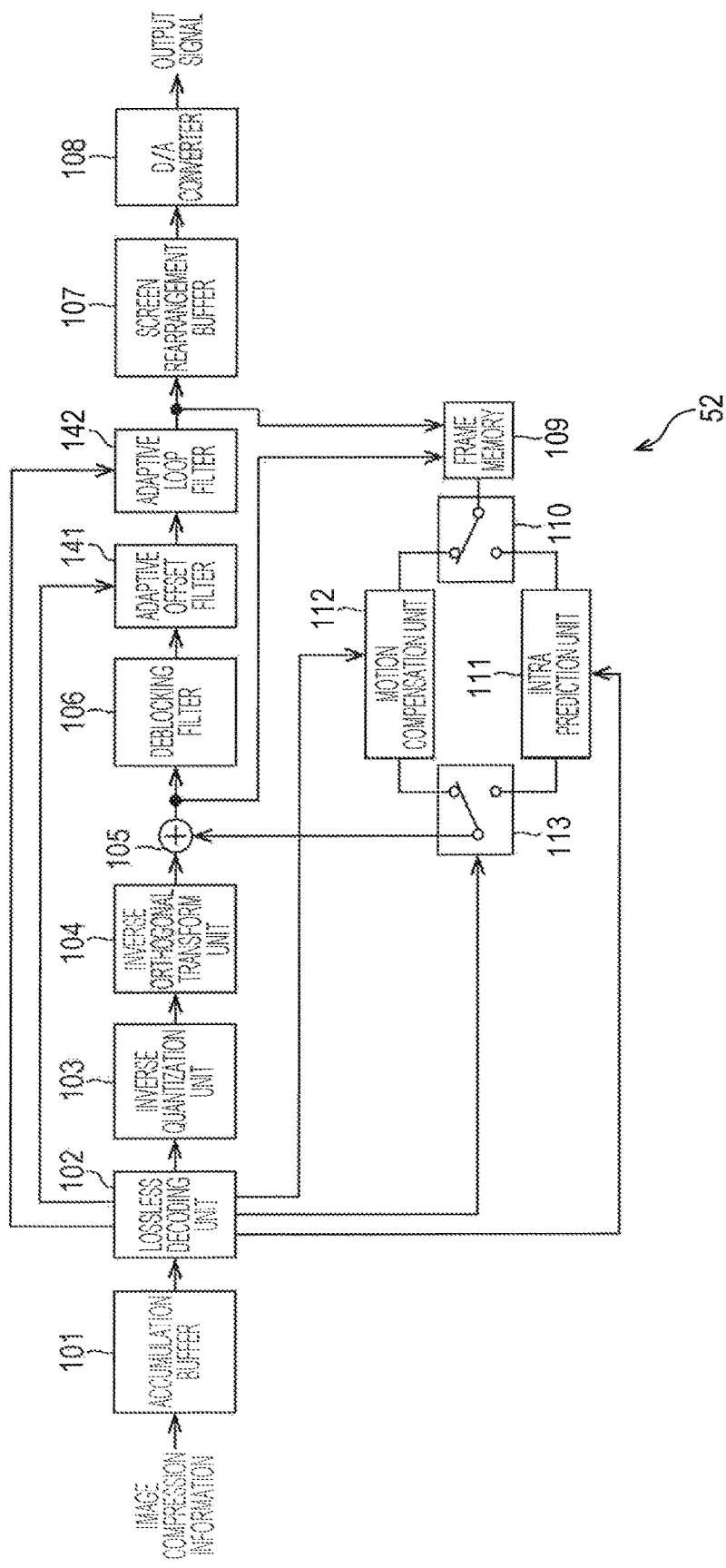
FIG. 10 is a block diagram that illustrates an example of the configuration of a decoder.

FIG. 10 is a block diagram that illustrates an example of the configuration of the decoder 52 illustrated in FIG. 8. Each unit of the decoder 52 decodes the coded data by using parameters included in the SPS, the PPS, the VUI, and the SEI supplied from the file reading unit 51, thereby generating an image.

The decoder 52 illustrated in FIG. 10 is configured by: an accumulation buffer 101; a lossless decoding unit 102; an inverse quantization unit 103; an inverse orthogonal transform unit 104; an addition unit 105; a deblocking filter 106; a screen rearrangement buffer 107; a D/A converter 108; a frame memory 109; a switch 110; an intra prediction unit 111; a motion compensation unit 112; and a switch 113.

In addition, between the deblocking filter 106 and the screen rearrangement buffer 107 and the frame memory 109, an adaptive offset filter 141 and an adaptive loop filter 142 are provided.

The accumulation buffer 101 of the decoder 52 receives the coded data from the file reading unit 51 illustrated in FIG. 8 and accumulates the received coded data. The accumulation buffer 101 supplies the accumulated coded data to the lossless decoding unit 102.

The lossless decoding unit 102 performs lossless decoding such as variable-length decoding or arithmetic decoding for the coded data supplied from the accumulation buffer 101, thereby acquiring quantized coefficients and coding information. The lossless decoding unit 102 supplies the quantized coefficients to the inverse quantization unit 103. In addition, the lossless decoding unit 102 supplies the intra prediction mode information and the like as coding information to the intra prediction unit 111 and supplies the motion vector, the information used for specifying a reference image, the inter prediction mode information, and the like to the motion compensation unit 112. Furthermore, the lossless decoding unit 102 supplies the intra prediction mode information or the inter prediction mode information as coding information to the switch 113.

The lossless decoding unit 102 supplies offset filter information as coding information to the adaptive offset filter 141 and supplies the filter coefficients to the adaptive loop filter 142.

The inverse quantization unit 103, the inverse orthogonal transform unit 104, the addition unit 105, the deblocking filter 106, the frame memory 109, the switch 110, the intra prediction unit 111, and the motion compensation unit 112 respectively perform processes similar to those of the inverse quantization unit 18, the inverse orthogonal transform unit 19, the addition unit 20, the deblocking filter 21, the frame memory 22, the switch 23, the intra prediction unit 24, and the motion prediction/compensation unit 25 illustrated in FIG. 2, whereby an image is decoded.

More specifically, the inverse quantization unit 103 performs inverse quantization of quantized coefficients supplied from the lossless decoding unit 102 and supplies coefficients acquired as a result thereof to the inverse orthogonal transform unit 104.

The inverse orthogonal transform unit 104 performs an inverse orthogonal transform for the coefficients supplied from the inverse quantization unit 103 and supplies differential information acquired as a result thereof to the addition unit 105.

The addition unit 105 adds the differential information as a current decoding image supplied from the inverse orthogonal transform unit 104 and a predicted image supplied from the switch 113 together, thereby performing a decoding process. The addition unit 105 supplies an image acquired as a result of the decoding process to the deblocking filter 106 and the frame memory 109. In addition, in a case where a predicted image is not supplied from the switch 113, the addition unit 105 supplies an image that is the differential information supplied from the inverse orthogonal transform unit 104 as an image acquired as a result of the decoding process to the deblocking filter 106 and supplies the image to the frame memory 109 so as to be accumulated therein.

The deblocking filter 106 filters an image supplied from the addition unit 105, thereby removing a block distortion. The deblocking filter 106 supplies an image acquired as a result thereof to the adaptive offset filter 141.

The adaptive offset filter 141 includes a buffer that sequentially stores offsets supplied from the lossless decoding unit 102. In addition, the adaptive offset filter 141 performs an adaptive offset filter process for an image acquired after the adaptive deblocking filter process performed by the deblocking filter 106 for each LCU based on the offset filter information supplied from the lossless decoding unit 102.

More specifically, in a case where the storage flag included in the offset filter information is "0", the adaptive offset filter 141 performs an adaptive offset filter process of a type that is represented by the type information by using an offset included in the offset filter information for the image acquired after the deblocking filter process in units of LCUs.

On the other hand, in a case where the storage flag included in the offset filter information is "1", the adaptive offset filter 141, for the image acquired after the deblocking filter process in units of LCUs, reads an offset that is stored at a position represented by an index included in the offset filter information. Then, the adaptive offset filter 141 performs an adaptive offset filter process of a type that is represented by the type information by using the read offset. The adaptive offset filter 141 supplies an image acquired after the adaptive offset filter process to the adaptive loop filter 142.

The adaptive loop filter 142 performs an adaptive loop filter process for the image supplied from the adaptive offset filter 141 for each LCU by using a filter coefficient supplied from the lossless decoding unit 102. The adaptive loop filter 142 supplies an image acquired as a result thereof to the frame memory 109 and the screen rearrangement buffer 107.

The image accumulated in the frame memory 109 is read as a reference image through the switch 110 and is supplied to the motion compensation unit 112 or the intra prediction unit 111.

The screen rearrangement buffer 107 stores the image supplied from the deblocking filter 106 in units of frames. The screen rearrangement buffer 107 rearranges the stored image, which is configured in units of frames, arranged in the coding order in the original display order and supplies the rearranged image to the D/A converter 108.

The D/A converter 108 performs a D/A conversion of the image configured in units of frames supplied from the screen rearrangement buffer 107 and outputs the converted image to a later stage not illustrated in the figure as an output signal.

The intra prediction unit 111 performs an intra prediction process of an intra prediction mode represented by the intra prediction mode information that is supplied from the lossless decoding unit 102 by using the reference image, which has not been filtered by the deblocking filter 106, read from the frame memory 109 through the switch 110 in units of tiles and slices. The intra prediction unit 111 supplies a predicted image generated as a result thereof to the switch 113.

The motion compensation unit 112 reads the reference image, which has been filtered by the deblocking filter 106, from the frame memory 109 through the switch 110 based on the information used for specifying a reference image that is supplied from the lossless decoding unit 102 in units of tiles and slices. The motion compensation unit 112 performs a motion compensation process of an optimal inter prediction mode represented by the inter prediction mode information by using the motion vector and the reference image. The motion compensation unit 112 supplies a predicted image generated as a result thereof to the switch 113.

In a case where the intra prediction mode information is supplied from the lossless decoding unit 102, the switch 113 supplies the predicted image supplied from the intra prediction unit 111 to the addition unit 105. On the other hand, in a case where the inter prediction mode information is supplied from the lossless decoding unit 102, the switch 113 supplies the predicted image supplied from the motion compensation unit 112 to the addition unit 105.

[Example of File Decoding Process]

Next, a file decoding process performed by the decoding apparatus illustrated in FIG. 8 will be described with reference to a flowchart illustrated in FIG. 11. This file decoding process is a process for a file that is generated by the file generating process illustrated in FIG. 4. In other words, even when the startcode and the filler data are removed, the characteristic of the HRD parameter is set again in this file.

In step S71, the file reception unit 71 receives a file of MP4 and supplies the received file to the parameter acquiring unit 72.

In step S72, the parameter acquiring unit 72 acquires a moov that is management information from the file of MP4 and supplies the acquired moov to the data reading unit 74. The data reading unit 74 acquires an SPS and a PPS from the moov in step S73. In step S74, the parameter acquiring unit 72 acquires a unit size of a current decoding mdat based on the moov acquired in step S72.

In step S75, the parameter acquiring unit 72 detects a NAL based on the unit size acquired in step S74. At this time, for example, the startcode is also acquired and is referred to in accordance with a file structure to be described later with reference to FIGS. 17 and 18.

In step S76, the data reading unit 74 reads data from the NAL detected in step S75 and supplies the read data to the decoder 52. Here, in a case where the NAL is an SPS or a PPS, the SPS or the PPS of the moov that is acquired in step S73 has a default value, and the SPS or the PPS of the NAL is used.

In step S77, the decoder 52 performs a decoding process. At that time, the decoder 52 performs the decoding process based on the HRD parameter.

Here, according to the present technology, a file is configured with the startcode and the filler data being set without being removed such that the characteristic of the HRD parameter is maintained, and accordingly, the decoding process can be correctly performed.

In addition, even when the startcode and the filler data are removed, the HRD parameter is set again in the file generating process illustrated in FIG. 4, and accordingly, a correct decoding process can be performed.

For example, in the case of an MP4 file, there is designation of a transmission rate of a VBR or a CBR from the outside. While a stream is output to the decoder 52 from the data reading unit 74 as it is in the case of the VBR, in the case of the CBR, filler data or a stuffing bit is added to form the CBR by the data reading unit 74, and the HRD parameter is rewritten. Also at that time, the HRD parameter of the MP4 file is normal and can be overwritten to be normal also on the decoding side.

[Another Example of File Decoding Process]

Next, a file decoding process performed by the decoding apparatus illustrated in FIG. 8 will be described with reference to a flowchart illustrated in FIG. 12. This file decoding process is a process for the file generated by the file generating process illustrated in FIG. 5. In other words, in a moov of this file, an identification parameter identifying whether the characteristic of the HRD parameter is correct or different is set.

In step S91, the file reception unit 71 receives a file of MP4 and supplies the received file to the parameter acquiring unit 72.

In step S92, the parameter acquiring unit 72 acquires a moov that is management information from the file of MP4 and supplies the acquired moov to the data reading unit 74. The data reading unit 74 acquires an SPS and a PPS from the moov in step S93. In step S94, the parameter acquiring unit 72 acquires the identification parameter of the HRD from the moov that is acquired in step S92 and supplies the acquired identification parameter of the HRD to the decoding control unit 73. In step S95, the parameter acquiring unit 72 acquires a unit size of a current decoding mdat based on the moov acquired in step S92.

In step S96, the parameter acquiring unit 72 detects a NAL based on the unit size acquired in step S95. At this time, for example, the startcode is also acquired and is referred to in accordance with the file structure to be described later with reference to FIGS. 17 and 18.

In step S97, the data reading unit 74 reads data from the NAL detected in step S96 and supplies the read data to the decoder 52. Here, in a case where the NAL is an SPS or a PPS, the SPS or the PPS of the moov that is acquired in step S93 has a default value, and the SPS or the PPS of the NAL is used.

In step S98, the decoding control unit 73 determines whether or not the identification parameter of the HRD supplied from the parameter acquiring unit 72 is "1". In a case where the identification parameter of the HRD is determined to be "1" in step S98, the process proceeds to step S99.

In step S99, the decoder 52 performs a decoding process according to the HRD parameter under the control of the decoding control unit 73.

On the other hand, in a case where the identification parameter of the HRD is determined not to be "1" in step S98, the process proceeds to step S100.

In step S100, the decoder 52 performs a decoding process with the HRD parameter being ignored under the control of the decoding control unit 73

Here, according to the present technology, the file is configured such that the startcode and the filler data are set without being removed so as to maintain the characteristic of the HRD parameter, and accordingly, the decoding process can be correctly performed.

In addition, even when the startcode and the filler data are removed, in the file generating process illustrated in FIG. 5, the identification parameter identifying whether or not this HRD parameter is correct is set, and accordingly, the decoding process can be correctly performed.

<2. Second Embodiment>
[Configuration Example of Encoder]

Figure 13:
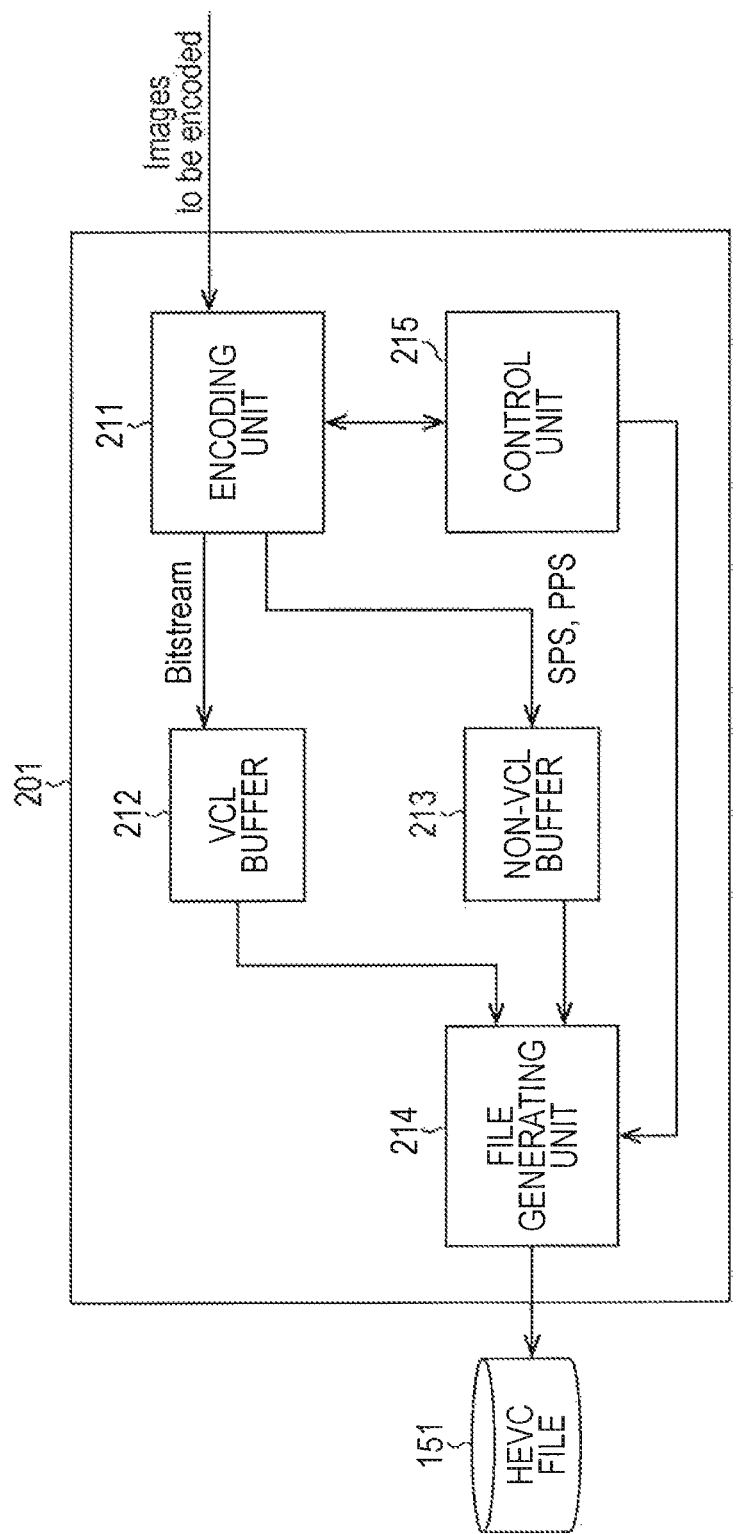
FIG. 13 is a block diagram that illustrates an example of the configuration of a coding apparatus, to which the present technology is applied, according to a second embodiment.

FIG. 13 is a block diagram that illustrates an example of the configuration of an image coding apparatus 201 according to an embodiment for generating the above-described file of the MP4. As illustrated in FIG. 13, the image coding apparatus 201 includes: an encoding unit 211; a VCL buffer 212; a non-VCL buffer 213; a file generating unit 214; and a control unit 215.

The encoding unit 211 illustrated in FIG. 13 corresponds to the encoder 1 illustrated in FIG. 1. In addition, the VCL buffer 212, the non-VCL buffer 213, the file generating unit 214, and the control unit 215 illustrated in FIG. 13 correspond to the file generating unit 2 illustrated in FIG. 1.

The encoding unit 211 is an encoder that operates according to the HEVC system. The encoding unit 211 sequentially acquires images to be coded from a video source such as a camera or a television tuner connected to the image coding apparatus 201. Then, the encoding unit 211 codes the acquired images by using parameters included in the SPS, the PPS, and the APS, thereby generating a bitstream of image data. In addition, the encoding unit 211 generates an SPS and a PPS as a non-VCL NAL unit. On the other hand, the encoding unit 211 generates the filler data and the bitstream of the image data as a VCL NAL unit. The encoding unit 211 outputs the filler data and the bitstream of the image data to the file generating unit 214 through the VCL buffer 212. In addition, the encoding unit 211 outputs the SPS and the PPS to the file generating unit 214 through the non-VCL buffer 213. The VCL buffer 212 buffers the VCL NAL unit. The non-VCL buffer 213 buffers the non-VCL NAL unit. The file generating unit 214 generates an HEVC file 151 that stores a series of coded image data. More specifically, the file generating unit 214 inserts the filler data and the bitstream of the image data into a data region (for example, the mdat box) of the HEVC file 151 in decoding order as a VCL NAL unit. In addition, the file generating unit 214 inserts the SPS and the PPS into a header region (for example, the moov box) of the HEVC file 151 as a non-VCL NAL unit. The control unit 215 controls the coding process performed by the image coding apparatus 201.

In addition, the control unit 215 may control the generation of a coded stream by using a virtual decoder model called an HRD (Hypothetical Reference Decoder: virtual reference decoder) such that the buffer of the decoder does not fail. In the HEVC system, as conformance points (check points for standard conformance) to be satisfied by a coded stream, two kinds of conformance points including Type 1 and Type 2 are defined. The conformance point of Type 1 is applied to a VCL NAL unit and a filter data NAL unit but is not applied to a non-VCL NAL unit. The conformance point of Type 2 is applied to a VCL NAL unit, a filter data NAL unit, and a non-VCL NAL unit. In this embodiment, the filler data is defined not as the non-VCL NAL unit but as the VCL NAL unit. Thus, the control unit 215 may perform control of the generation of a coded stream so that not only the bitstream of the image data but also the filler data satisfies the conformance point of Type 1.

[Configuration Example of Decoder]

Figure 14:
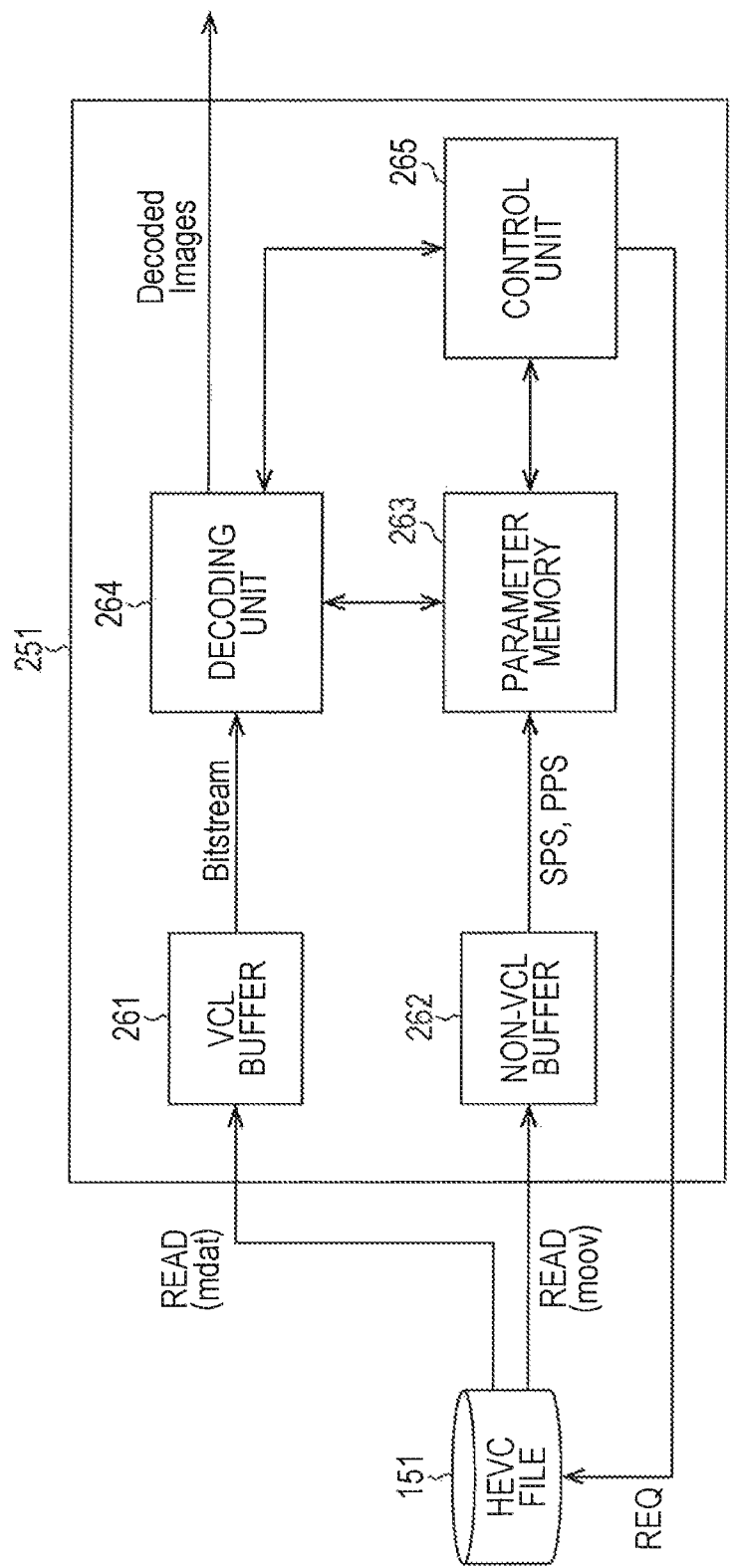
FIG. 14 is a block diagram that illustrates an example of the configuration of the decoding apparatus, to which the present technology is applied, according to the second embodiment.

FIG. 14 is a block diagram that illustrates an example of the configuration of an image decoding apparatus according to an embodiment for decoding an image from the file of the MP4 described above. As illustrated in FIG. 14, the image decoding apparatus 251 includes: a VCL buffer 261; a non-VCL buffer 262; a parameter memory 263; a decoding unit 264; and a control unit 265.

Here, the VCL buffer 261, the non-VCL buffer 262, the parameter memory 263, and the control unit 265 illustrated in FIG. 14 correspond to the file reading unit 51 illustrated in FIG. 8. In addition, the decoding unit 264 illustrated in FIG. 14 corresponds to the decoder 52 illustrated in FIG. 8.

The VCL buffer 261 buffers a bitstream of image data and filler data read from the data region (for example, the mdat box) of a file. The non-VCL buffer 262 buffers parameter sets read from the header region (for example, the moov box) of a file. The parameter memory 263 stores parameter sets disposed within the header region of the file acquired through the non-VCL buffer 262 altogether. The decoding unit 264 is a decoder that operates according to the HEVC system. The decoding unit 264 decodes images from bitstreams that are sequentially acquired from the data region of the file through the VCL buffer 261. When an image is decoded, the decoding unit 264 uses parameters disposed within the SPS and the PPS stored in the parameter memory 263. The control unit 265 controls the decoding process performed by the image decoding apparatus 251.

<3. Third Embodiment>
[Conventional MP4 Video Sample Structure]

Figure 15:
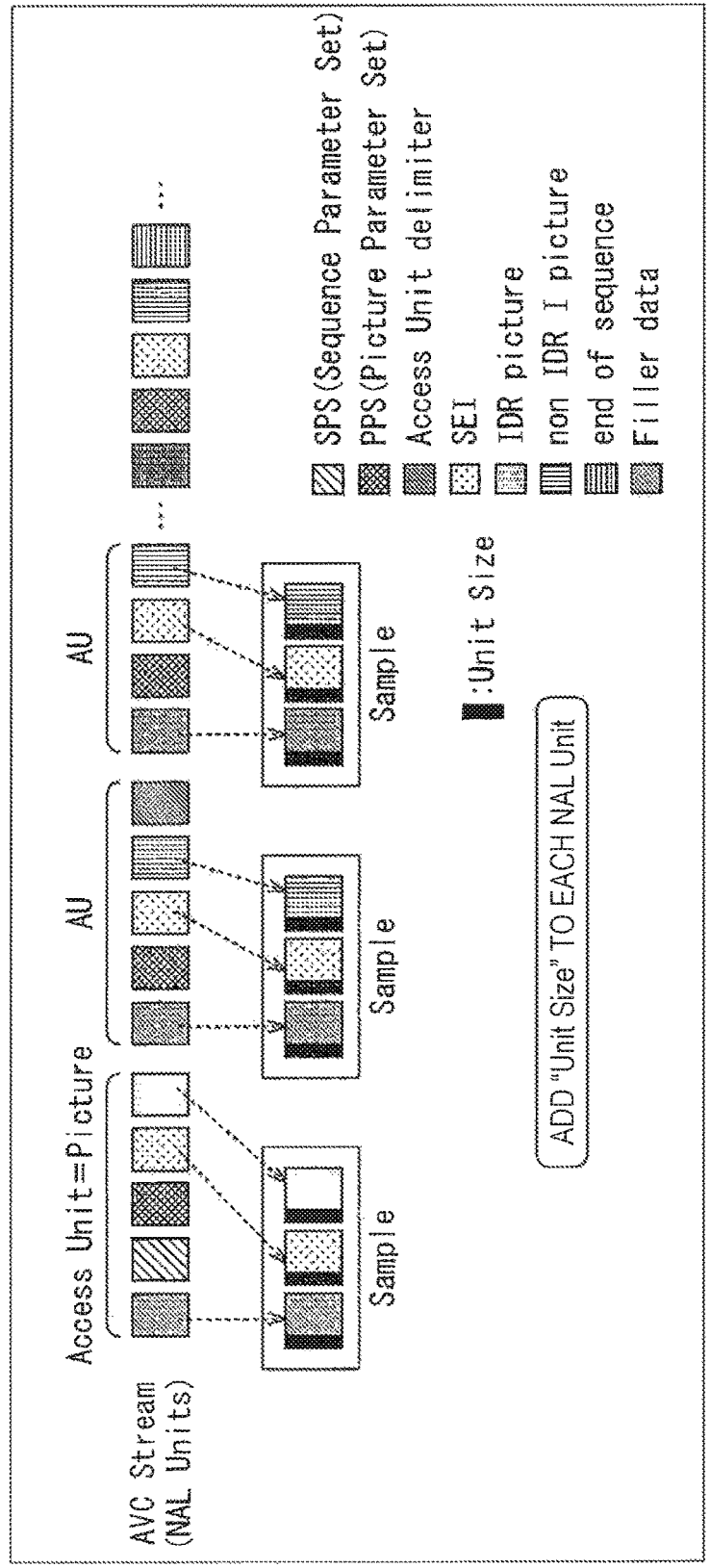
FIG. 15 is a diagram that illustrates an example of a conventional MP4 video sample structure.

FIG. 15 is a diagram that illustrates an example of a conventional MP4 video sample structure. A NAL unit that configures the video sample is defined as illustrated in FIG. 15.

In the example illustrated in FIG. 15, an AVC stream that is configured by a plurality of NAL units is represented. In the AVC stream, one picture is configured by one access unit. As types of NAL units configuring the access unit, there are units such as an SPS, a PPS, an access unit delimiter, SEI, an IDR picture, a non-IDR picture, an end of sequence, and filler data.

In a conventional MP4 specification, one access unit is stored in one video sample. In other words, a unit size is added to each NAL unit configuring one access unit, and a resultant NAL unit is stored in one video sample. However, in a case where a NAL unit of the SPS, the PPS, or the filler data is present in a NAL unit configuring an access unit, the NAL unit of the SPS, the PPS, or the filler data is excluded from a video sample.

For example, while an access unit disposed first from the left side is configured by NAL units of an access unit delimiter, an SPS, a PPS, SEI, and an IDR picture, the NAL units of the SPS and the PPS are excluded when the access unit is stored in the sample.

While an access unit disposed second from the left side is configured by NAL units of an access unit delimiter, an SPS, SEI, a non-IDR picture, and filler data, the NAL units of the SPS and the filler data are excluded when the access unit is stored in a sample.

While an access unit disposed third from the left side is configured by NAL units of an access unit delimiter, an SPS, SEI, and a non-IDR picture, the NAL unit of the SPS is excluded when the access unit is stored in a sample.

[Configuration Example of One Access Unit of AVC Stream]

Figure 16:
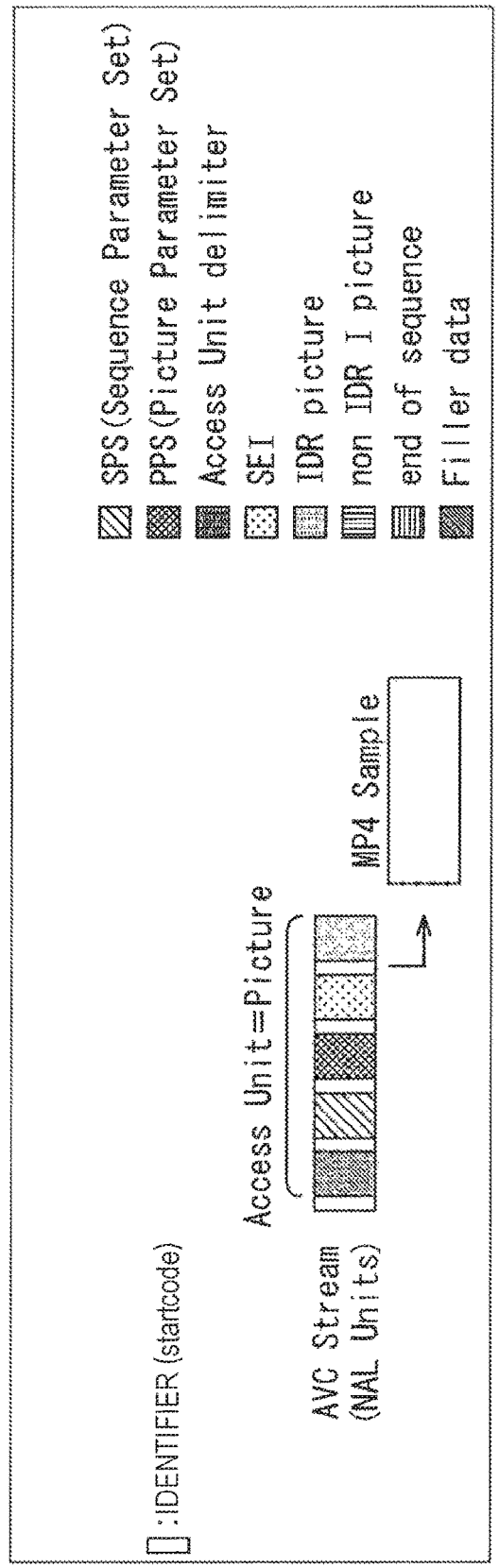
FIG. 16 is a diagram that illustrates an example of the configuration of one access unit of an AVC stream.

FIG. 16 is a diagram that illustrates an example of the configuration of one access unit of an AVC stream.

As illustrated in FIG. 16, actually, an identifier (startcode) is added before each NAL unit in one access unit of the AVC stream, conventionally, such identifiers are also excluded when the access unit is stored in a sample.

When the NAL units of this identifier (startcode) and the filler data are excluded, as described above, the characteristic of the HRD parameter is not maintained. Thus, according to the present technology, an access unit is stored in a sample of MP4 as it is.

[Example of Storage of Access Unit According to Present Technology]

Figure 17:
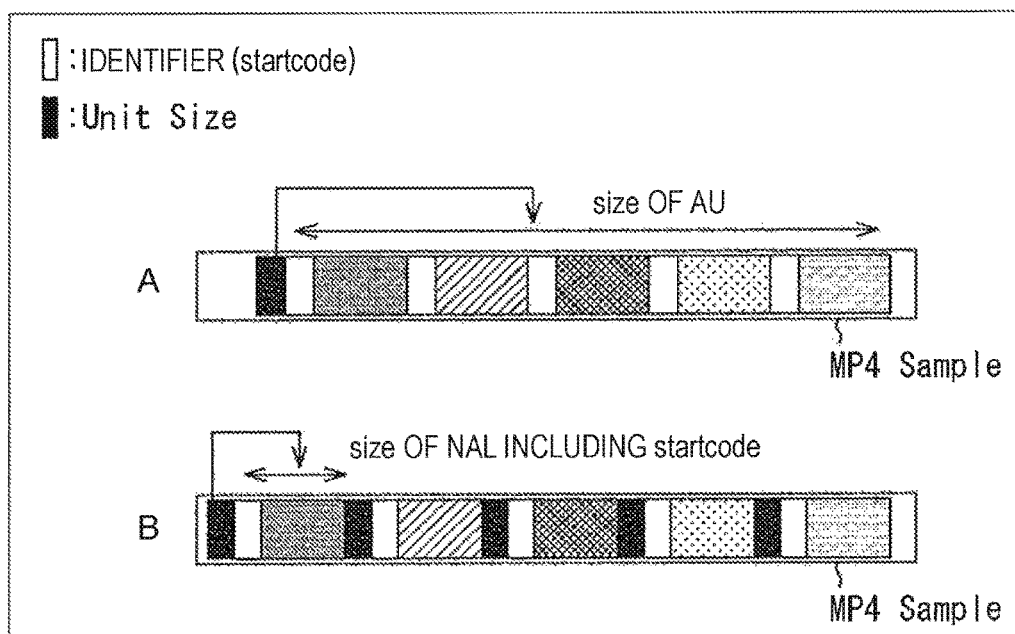
FIG. 17 is a diagram that illustrates an example of an MP4 video sample structure according to the present technology.

FIGS. 17 and 18 are diagrams that illustrate examples of an MP4 video sample structure according to the present technology.

In the example of A of FIG. 17, a unit size describing the size of an access unit is added to the start of the access unit, and the access unit is stored in an MP4 sample as it is. Here, "as it is" represents a state in which the startcode is attached, and, in a case where filler data is present, the filler data is not removed. In other words, "as it is" represents a state in which the startcode and the filler data are set.

Figure 11:
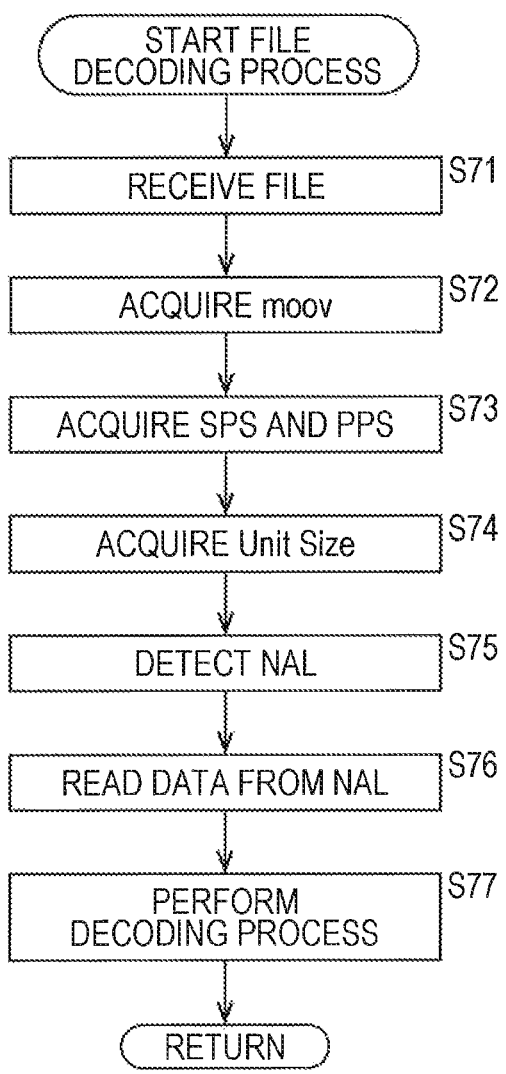
FIG. 11 is a flowchart that illustrates a file decoding process.
Figure 12:
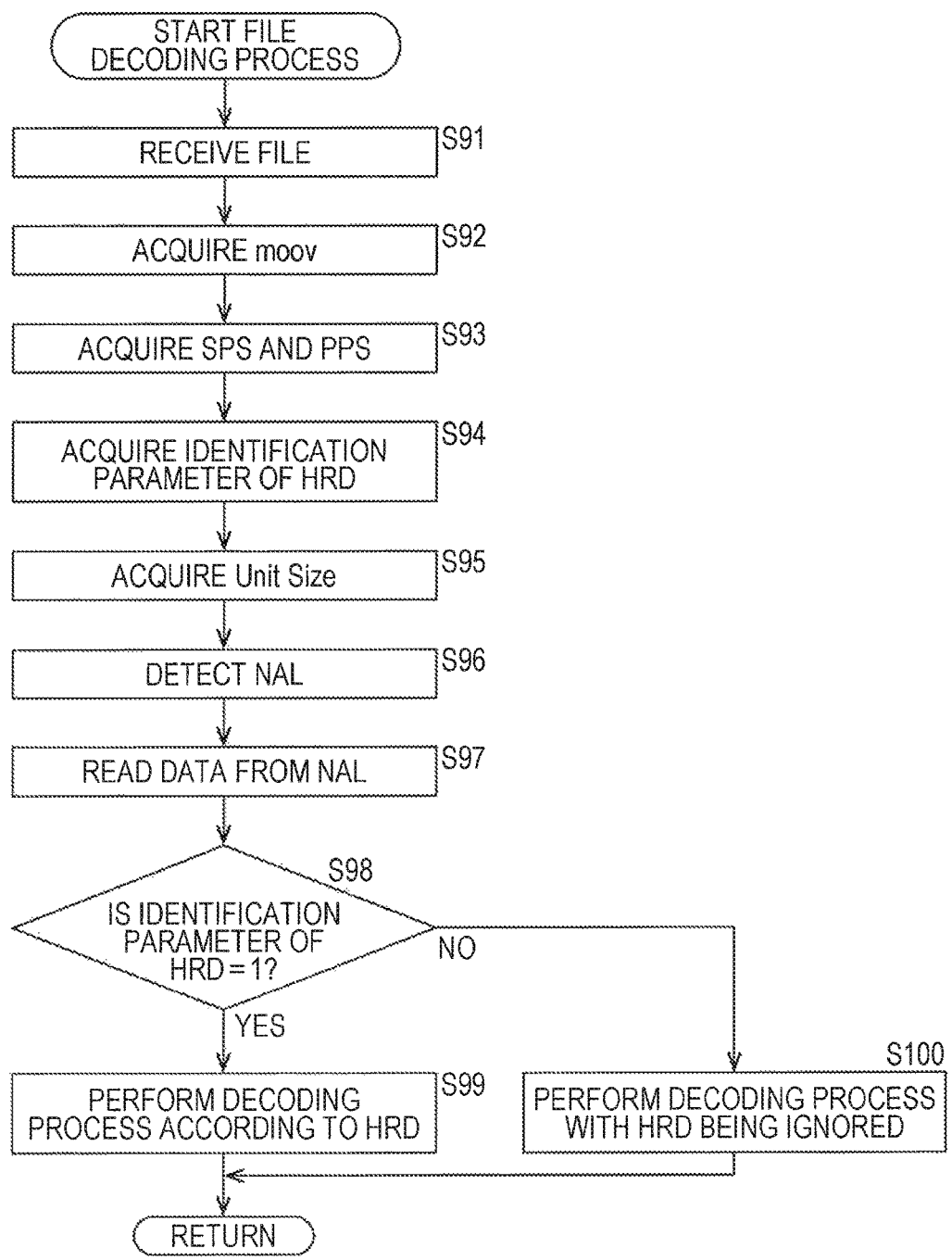
FIG. 12 is a flowchart that illustrates another example of the file decoding process.

In the case of A of FIG. 17, in step S75 represented in FIG. 11 or step 396 represented in FIG. 12 described above, an access unit corresponding to a unit size is detected, and a NAL is detected based on the startcode included in the access unit. Then, in step S76 represented in FIG. 11 or step S97 represented in FIG. 12, data of the NAL up to the next startcode is acquired. The case of A of FIG. 17 represents a very simple structure.

In the case of B of FIG. 17, a unit size describing the size of each NAL unit including the startcode is added to the start of each NAL unit configuring an access unit, and the access unit is stored in an MP4 sample as it is.

In the case of B of FIG. 17, in step S75 represented in FIG. 11 or step S96 represented in FIG. 12 described above, startcode+NAL corresponding to a unit size is detected. Then, in step S76 represented in FIG. 11 or step S97 represented in FIG. 12, among them, the startcode is discarded, and the data of the NAL is acquired. In this case, while the structure is close to a conventional structure of "size+data", and the embedding is the same as that thereof, it is necessary to analyze the startcode based on the acquired data structure.

In the case of C of FIG. 18, a unit size describing the size of each NAL unit is added to the start of each NAL unit configuring an access unit, and the size of a startcode including 0 data, in other words, an offset size up to the NAL is added. Then, the NAL unit to which the unit size and the offset size are added is stored as it is in an MP4 sample.

In the case of C of FIG. 18, in step S75 represented in FIG. 11 or step S96 represented in FIG. 12 described above, an offset size is acquired, and a NAL is detected from a position acquired by performing skipping corresponding to the offset. Then, in step S76 represented in FIG. 11 or step S97 represented in FIG. 12, data of a NAL corresponding to the unit size is acquired.

In addition, C of FIG. 18 is an example of a case where FixedStartCodeSizeFlag of an HRD Conformance Box illustrated in FIG. 19 to be described later is "0". In a case where the FixedStartCodeSizeFlag is "0", since the start code size is not fixed, the size of the startcode is stored in an offset size field.

In contrast to this, in a case where the FixedStartCodeSizeFlag of the HRD Conformance Box is "1", the MP4 sample has a structure illustrated in C' of FIG. 18.

In the example of C' illustrated in FIG. 18, a unit size describing the size of each NAL unit is added to the start of each NAL unit that configures an access unit, and the NAL unit is stored in the MP4 sample as it is.

In other words, in a case where the FixedStartCodeSizeFlag is "1", since the start code size is fixed as start code size=4 bytes, the offset size field does not need to be disposed before the startcode.

In this case, a new parsing structure is formed.

In the case of D of FIG. 18, a unit size describing the size of each NAL unit, the size of a startcode, and the startcode is added to the start of each NAL unit that configures an access unit, and the size of the startcode including 0 data, in other words, an offset size up to the NAL is added. Then, the NAL unit to which the unit size and the offset size are added is stored in the MP4 sample as it is.

In the case of D of FIG. 18, in step S75 represented in FIG. 11 or step S96 represented in FIG. 12 described above, "offset size+startcode+NAL" corresponding to the unit size is detected, the offset size is acquired, and a NAL is detected from a position acquired by performing skipping corresponding to the offset. Then, in step S76 represented in FIG. 11 or step S97 represented in FIG. 12, data of the NAL corresponding to "unit size−(offset size+startcode)" is acquired.

In addition, D of FIG. 18 is an example of a case where the FixedStartCodeSizeFlag of the HRD Conformance Box is "0". In the case where the FixedStartCodeSizeFlag is "0", since the start code size is not fixed, the size of the startcode is stored in the offset size field.

In contrast to this, in a case where the FixedStartCodeSizeFlag of the HRD Conformance Box is "1", the MP4 sample has a structure illustrated in D' of FIG. 18.

In the example of D' illustrated in FIG. 18, a unit size describing the size of each NAL unit including a startcode is added to the start of each NAL unit that configures an access unit, and the NAL unit is stored in the MP4 sample as it is.

In other words, in a case where the FixedStartCodeSizeFlag is "1", since the start code size is fixed as start code size=4 bytes, the offset size field does not need to be disposed before the startcode, and the structure of D' of FIG. 18 is similar to that of B of FIG. 17 described above.

In this case, while the embedding is the same as that thereof based on the conventional structure of "size+data", a parsing structure is formed in which skipping corresponding to the offset size disposed at the start of the acquired data structure is performed. In addition, in this case, it is necessary to analyze the startcode.

[Example of HRD Conformance Box Extension]

FIG. 19 is a diagram that illustrates an example of an HRD Conformance Box extension. Hereinafter, the example of the HRD Conformance Box extension will be similarly illustrated.

```
AVCSampleEntry ( ) extends VisualSampleEntry ('type') {
    // type is 'avc3' or 'avc4', (and all hevc)
    AVCConfigurationBox config;
    MPEG4BitRateBox ( );   //Optional
    MPEG4ExtensionDescriptorsBox ( );   //Optional
    HRDConformanceBox ( );   //Optional
}
```

Add HRDConformanceBox into AVCSampleEntry and AVC2SVVSampleEntry in 5.4.2.1
Add HRDConformanceBox into AVCSVCSampleEntry, AVC2SVCSampleEntry and SVCSampleEntry in 6.5.3.1.
Add HRDConformanceBox into AVCMVCSampleEntry, AVC2MVCSampleEntry and MVCSampleEntry in section 7.6.3.3.
Add HRDConformanceBox into HEVC SampleEntry in section 8.4.1.1.
Sample entry without HRDConformanceBox is used only for samples without start codes nor fillers.
HRDConformanceBox can be defined as follows.

```
class HRDConformanceBox extends Box ('hrdc') {
    HRDConformanceData ( ) HRDConformance;
}
aligned (8) class HRDConformanceData {
    unsigned int (1) HRDConformanceFlag;
    unsigned int (1) FixedStartCodeSizeFlag;
    unsigned int (2) OffsetSizeMinusOne;
    unsigned int (4) reserved =0;
    unsigned int (24) reserved;
    Box [ ] any_box;    //Optional
}
```

HRDConformanceFlag is the identifier if HRD characteristics was changed by removing startcode, filler data, etc from the elementary stream. When HRDConformanceFlag is equal to 1, the HRD parameters, e.g. buffering period SEI, picture timing SEI, was changed by removing startcode, filler data, etc from the elementary stream.

FixedStartCodeSizeFlag is the identifier when startcode in each NAL is fixed size of 4 bytes. When FixedStartCodeSizeFlag is equal to 1, no offset field is for each NAL in sample data to indicate the size of Start Code.

OffsetSizeMinusOne indicates the length in bytes of the StartcodeLength field in a video sample minus one. For example, a size of one byte is indicated with a value of 0. The value of this field shall be one of 0, 1, or 3 corresponding to a length encoded with 1, 2, or 4 bytes, respectively.

HRDConformanceBox is useful to indicate the status of HRD conformance even in the other options.

In FIG. 19 and the example described above, the FixedStartCodeSize lag that is a flag identifying whether or not the size information of the startcode is present is additionally defined in the HRD Conformance box. In this way, as illustrated in C' of FIG. 18 and D' of FIG. 18, in a case where the size of the startcode is fixed, the file structure can be configured to be simple.

[Example of Storage of Access Unit According to Present Technology]

Figure 20:
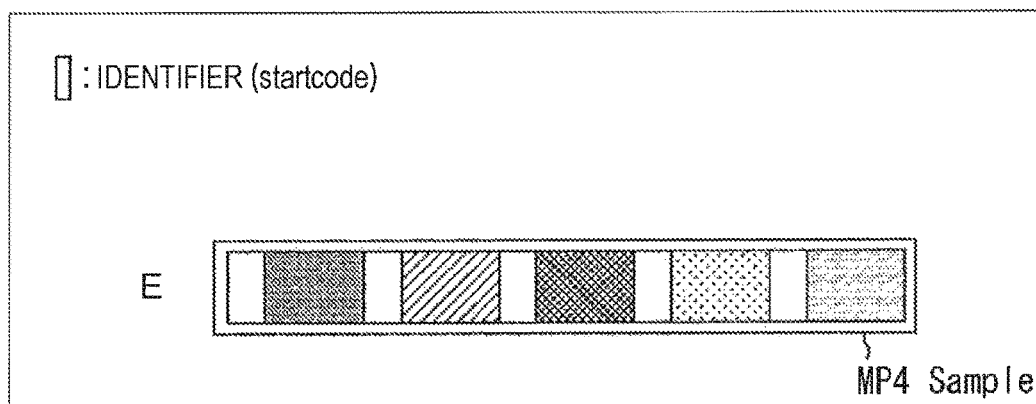
FIG. 20 is a diagram that illustrates further another example of the MP4 video sample structure according to the present technology.

FIG. 20 is a diagram that illustrates another example of the MP4 video sample structure according to the present technology.

In the example illustrated in E of FIG. 20, the unit size is removed from mdat, and an elementary stream in which the startcode is included is stored (reserved) without being changed.

In the case of E of FIG. 20, a new box used for maintaining an offset of each access unit, as illustrated in FIG. 21 and as below, is added to a sample table.

```
aligned (8) class NALunitOffsetBox
    extends FullBox ('nalo', version=0, 0) {
    unsigned int (32) sample_count:
    for (i=1; i <= sample_count; i++) {
        unsigned int (8) offset_count;
        unsigned int (8) offset_size;
        for (j=1; j <= offset_count; j++) {
            unsigned int (offset_size*8) offset;
        }
    }
}
``` sample_count is an integer that gives the number of entries in the following table.

offset_count is an integer that gives the number of entries in the following subtable.

offset_size is an integer that gives the byte size of the offset field in the following subtable.

offset is an integer that gives the offset of the start of a NAL, unit into its containing sample.

Figure 22:
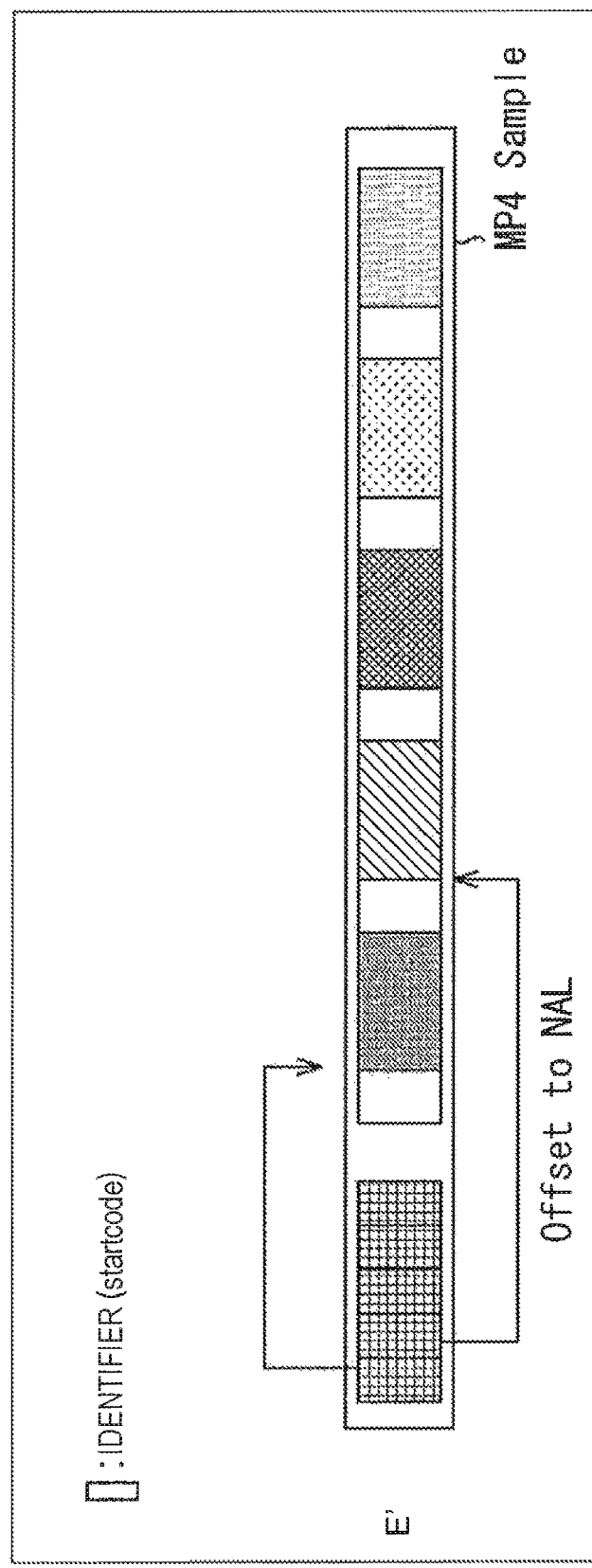
FIG. 22 is a diagram that illustrates another example of the MP4 video sample structure illustrated in FIG. 20.

In addition, as a substitute for the example represented in E of FIG. 20, as illustrated in the example of E' of FIG. 22, a list of offsets may be configured to be included at the start of each sample instead of the addition of the box described above.

In the example represented in E' of FIG. 22, for example, a list of five offsets of five access units is included at the start of the sample.

The files of the MP4 video samples illustrated in FIGS. 17 and 18 are generated by the file generating unit 2 having the configuration illustrated in FIG. 3 described above through the file generating process illustrated in FIG. 4 or 5 described above. In addition, the MP4 video sample files illustrated in FIGS. 20 and 22 are generated by the file generating unit 2 having the configuration illustrated in FIG. 3 described above through the file generating process illustrated in FIG. 4 or 5 described above.

Furthermore, the files of the MP4 video samples illustrated in FIGS. 17 and 18 are decoded by the file reading unit 51 having the configuration illustrated in FIG. 9 described above through the file decoding process illustrated in FIG. 11 or 12 described above. In addition, the files of the MP4 video sample files illustrated in FIGS. 20 and 22 are decoded by the file reading unit 51 having the configuration illustrated in FIG. 9 described above through the file decoding process illustrated in FIG. 11 or 12 described above.

[Further Another Example of Storage of Access Unit According to Present Technology]

Figure 23:
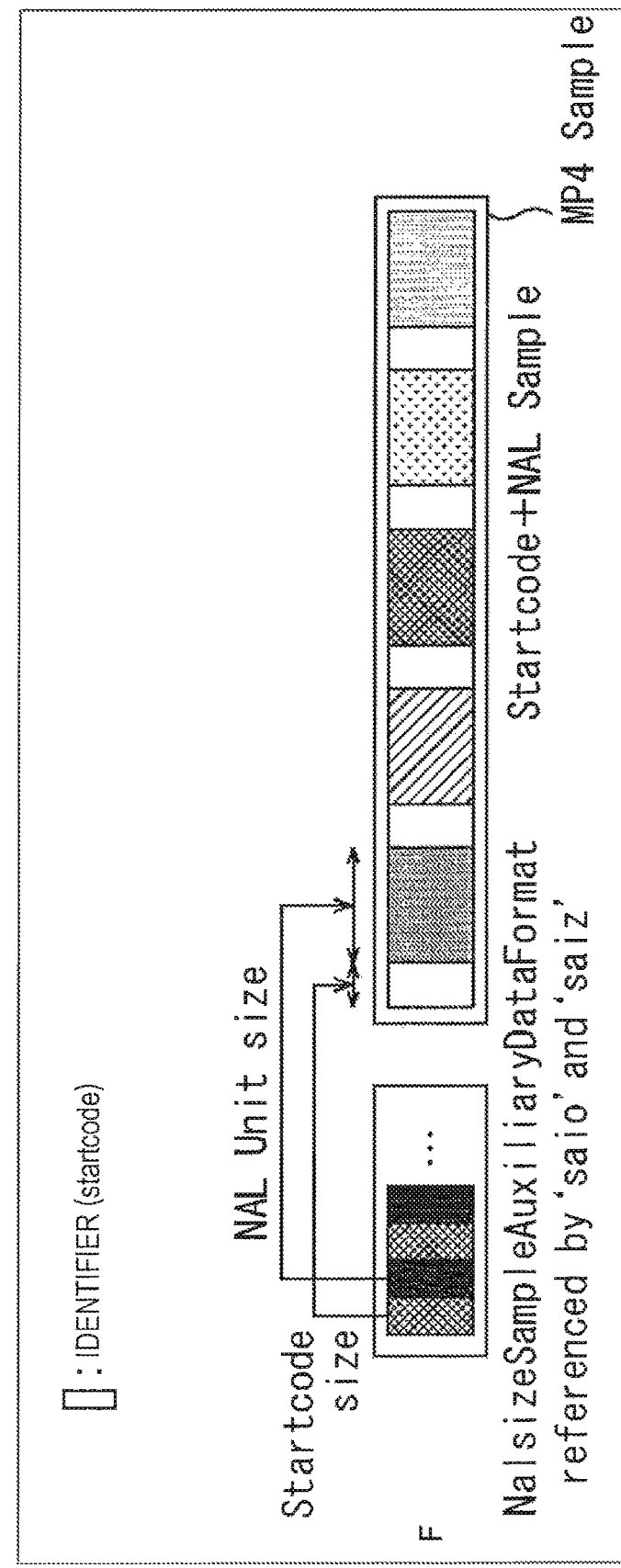
FIG. 23 is a diagram that illustrates further another example of the MP4 video sample structure illustrated in FIG. 20.

FIG. 23 is a diagram that illustrates further another example of the MP4 video sample structure according to the present technology.

In the example illustrated in F of FIG. 23, the unit size is removed from mdat, and the elementary stream in which the startcode is included is stored (reserved) as it is without any change. In addition, in order to store the lengths of each start code (startcode) and the NAL unit, a sample auxiliary information function defined in ISO/IEC 14496-12 is applied.

To the lengths of each startcode and the NAL unit, aux_info_type="nalz" and aux_info_type_parameter=0 are given as the sample auxiliary information function. The sample auxiliary information function is referred to by "saiz" that is a used sample auxiliary information function size box (SampleAuxiliaryInformationSizesBox) and "saio" that is a sample auxiliary information function offset box.

[Example of Format of Sample Auxiliary Information Function]

FIG. 24 is a diagram that illustrates an example of a format of the sample auxiliary information function. Hereinafter, an example of the format of the sample auxiliary information function will be similarly illustrated.

```
aligned (8) class NalsizeSampleAuxiliaryDataFormat
{
    unsigned int (2) StartcodeSizeMinusOne;
    unsigned int (2) NALunitSizeMinusOne;
    unsigned int (4) reserved;
    unsigned int (32) subsample_count;
    for (i = 1; i <= subsample_count; i++) {
        switch (StartcodeSizeMinusOne) {
            case 0:
                unsigned int (8) Startcode Size;
                break;
            case 1:
                unsigned int (16) Startcode Size;
```

```
            break;
          case 3:
            unsigned int (32) Startcode Size;
            break;
        }
        switch (NALUnitSizeMinusOne) {
          case 0:
            unsigned int (8) NALUnit Size;
            break;
          case 1:
            unsigned int (16) NALUnit Size;
            break;
          case 3:
            unsigned int (32) NALUnit Size;
            break;
        }
      }
    }
```

StartcodeSizeMinusOne indicates the length in bytes of the Startcode Size field minus one. For example, a size of one byte is indicated with a value of 0. The value of this field shall be one of 0, 1, or 3 corresponding to a length encoded with 1, 2, or 4 bytes, respectively.

NALUnitSizeMinusOne indicates the length in bytes of the NALUnit Size field minus one. For example, a size of one byte is indicated with a value of 0. The value of this field shall be one of 0, 1, or 3 corresponding to a length encoded with 1, 2, or 4 bytes, respectively.

StartcodeSize indicates the length in bytes of the Startcode of subsample in a sampleNALUnitSize indicates the length in bytes of the Startcode of subsample in a sample StartcodeSizeMinusOne represents a value acquired by subtracting one from the byte length of the start code size field (Startcode Size field). For example, in a case where the byte length of the start cord size field is one byte, the value of the StartcodeSizeMinusOne is "0". The value of the StartcodeSizeMinusOne is 0, 1, or 3 in correspondence with the code length of one byte, two bytes, or four bytes.

NALUnitSizeMinusOne represents a value that is acquired by subtracting one from the byte length of the NAL unit size field (NALUnit Size field). For example, in a case where the byte length of the NAL unit size field is one byte, the value of the NALUnitSizeMinusOne is "0". The value of the NALUnitSizeMinusOne is 0, 1, or 3 in correspondence with the code length of one byte, two bytes, or four bytes.

StartcodeSize represents a byte length of the start code (Startcode) of a subsample within the sample.

NALUnitSize represents a byte length of the NAL unit of a subsample within the sample.

The format may be configured as described above. In addition, the format of the sample auxiliary information function may be configured as below.

[Another Example of Format of Sample Auxiliary Information Function]

FIG. 25 is a diagram that illustrates another example of the format of the sample auxiliary information function. Hereinafter, another example of the format of the sample auxiliary information function will be similarly illustrated.

```
aligned (8) class NalsizeSampleAuxiliaryDataFormat
{
  unsigned int (1) FixedStartCodeSizeFlag;
  unsigned int (2) StartcodeSizeMinusOne;
  unsigned int (2) NALunitSizeMinusOne;
  unsigned int (3) reserved;
  unsigned int (32) subsample_count;
```
```
  for (i = 1; i <= subsample_count; i++) {
    if (FixedStartCodeSizeFlag == 0) {
      switch (StartcodeSizeMinusOne) {
        case 0:
          unsigned int (8) Startcode Size;
          break;
        case 1:
          unsigned lot (16) Startcode Size;
          break;
        case 3:
          unsigned int (32) Startcode Size;
          break;
      }
    }
    switch (NALUnitSizeMinusOne) {
      case 0:
        unsigned int (8) NALUnit Size;
        break;
      case 1:
        unsigned int (16) NALUnit Size;
        break;
      case 3:
        unsigned int (32) NALUnit Size;
        break;
    }
  }
}
```

FixedStartCodeSizeFlag is the identifier when startcode before each NAL unit has fixed size of 4 bytes. When FixedStartCodeSizeFlag is equal to 1.

StartcodeSizeMinusOne indicates the length in bytes of the Startcode Size field minus one. For example, a size of one byte is indicated with a value of 0. The value of this field shall be one of 0, 1, or 3 corresponding to a length encoded with 1, 2, or 4 bytes, respectively.

NALUnitSizeMinusOne indicates the length in bytes of the NALUnit Size field minus one. For example, a size of one byte is indicated with a value of 0. The value of this field shall be one of 0, 1, or 3 corresponding to a length encoded with 1, 2, or 4 bytes, respectively.

StartcodeSize indicates the length in bytes of the Startcode of subsample in a sample.

NALUnitSize indicates the length in bytes of the Startcode of subsample in a sample.

The FixedStartCodeSizeFlag is flag information. The FixedStartCodeSizeFlag is flag information that represents whether or not the size of the start code (startcode) disposed before each NAL unit is four bytes. The value of the FixedStartCodeSizeFlag is set to "1" in a case where the size of the start code (startcode) disposed before each NAL unit is four bytes and is set to "0" otherwise. In other words, in a case where the value of the FixedStartCodeSizeFlag is "1", it represents that the size of the start code (startcode) disposed before each NAL unit is four bytes. On the other hand, in a case where the value of the FixedStartCodeSizeFlag is "0", it represents that the size of the start code (startcode) disposed before each NAL unit is not four bytes.

Each parameter of the StartcodeSizeMinusOne, the NALUnitSizeMinusOne, the StartcodeSize, and the NALUnitSize is similar to that of the case illustrated in FIG. 24.

In a case where the FixedStartCodeSizeFlag of the HRD-ConformanceData box is "1", when the size of each start codes is included, there is a possibility that the data amount is unnecessarily increased. Thus, by configuring as in the example illustrated in FIG. 25, in this case, a structure having a size of only the NAL units can be formed, whereby an unnecessary increase in the data amount can be suppressed. In addition, in this case, the HRDConformanceBox has only the HRDConformanceFlag.

In addition, the file of the MP4 video sample illustrated in FIG. 23 is generated by the file generating unit 2 of the configuration illustrated in FIG. 3 described above through the file generating process illustrated in FIG. 4 or 5.

Furthermore, the file of the MP4 video sample illustrated in FIG. 23 is decoded by the file reading unit 51 of the configuration illustrated in FIG. 9 described above through the file decoding process illustrated in FIG. 11 or 12 described above.

In this option, unit size is removed from mdat, and elementary stream including startcode is simply stored without modification. And to store the length of each startcode and NAL unit, we propose to use the sample auxiliary information function defined in ISO/IEC 14496-12. FIG. 23 shows an example of a sample of this option.

Each length of start code and NAL unit are provided as Sample Auxiliary Information with aux_info_type equal to 'nalz' and aux_info_type_parameter equal to 0. Sample Auxiliary Information is referenced by using a SampleAuxiliaryInformationSizesBox ('saiz') and a SampleAuxiliaryInformationOffsetsBox ('saio').

The format of the sample auxiliary information for samples with this type shall be:

```
aligned (8) class NalsizeSampleAuxiliaryDataFormat
{
    unsigned int (1) FixedStartCodeSizeFlag;
    unsigned int (2) StartcodeSizeMinusOne;
    unsigned int (2) NALunitSizeMinusOne;
    unsigned int (3) reserved;
    unsigned int (32) subsample_count;
    for (i = 1; i <= subsample_count; i++) {
        if (FixedStartCodeSizeFlag == 0) {
            switch (StartcodeSizeMinusOne) {
                case 0:
                    unsigned int (8) Startcode Size;
                    break;
                case 1:
                    unsigned int (16) Startcode Size;
                    break;
                case 3:
                    unsigned int (32) Startcode Size;
                    break;
            }
        }
        switch (NALUnitSizeMinusOne) {
            case 0:
                unsigned int (8) NALUnit Size;
                break;
            case 1:
                unsigned int (16) NALUnit Size;
                break;
            case 3:
                unsigned int (32) NALUnit Size;
                break;
        }
    }
}
```

FixedStarcCodeSizeFlag is the identifier when startcode before each NAL unit has fixed size of 4 bytes. When FixedStartCodeSizeFlag is equal to 1.

StartcodeSizeMinusOne indicates the length in bytes of the Startcode Size field minus one. For example, a size of one byte is indicated with a value of 0. The value of this field shall be one of 0, 1, or 3 corresponding to a length encoded with 1, 2, or 4 bytes, respectively.

NALUnitSizeMinusOne indicates the length in bytes of the NALUnit Size field minus one. For example, a size of one byte is indicated with a value of 0. The value of this field shall be one of 0, 1, or 3 corresponding to a length encoded with 1, 2, or 4 bytes, respectively.

StartcodeSize indicates the length in bytes of the Startcode of subsample in a sample NALUnitSize indicates the length in bytes of the NAL unit of subsample in a sample

[Comparison of MP4 Video Sample Structure According to Present Technology]

In an example illustrated in FIG. 26, a table used for comparing MP4 video sample structures described above is represented.

In an example of the storage of an access unit illustrated in B of FIG. 17, there is an advantage of being close to a conventional (currently-used) structure of "size+data".

In an example of the storage of an access unit illustrated in C of FIG. 18 or C' of FIG. 18, there are advantages of being close to the conventional (currently-used) structure of "size+data" and not changing the semantics of the unit size. In addition, in a case where the size of the startcode is fixed, there is an advantage that the data structure is similar to a conventional (currently-used) file format design.

In an example of the storage of an access unit illustrated in D of FIG. 18 or D' of FIG. 18, there is an advantage of being close to the conventional (currently-used) structure of "size+data".

In an example of the storage of an access unit illustrated in E of FIG. 20 or E' of FIG. 22, there is an advantage that the storage of the access unit in the elementary stream is simple (in other words, the startcode does not need to be removed, and the unit size and the startcode size do not need to be added).

In a case where the design consistency of the sample is a significant factor, C of FIG. 18 or C' of FIG. 18 is a best option. However, E of FIG. 20 or E' of FIG. 22 is a best method for storing the elementary stream without any change.

All the above-described examples of the storage of an access unit have been proposed to store the startcode in the mdat (In this contribution, the following options are proposed to store startcode in mdat (for both AVC and HEVC file format)).

In addition, the MP4 video sample structure illustrated in FIG. 23 described above may be configured as illustrated in the following FIG. 27.

[Other Example of Storage of Access Unit According to Present Technology]

Figure 27:
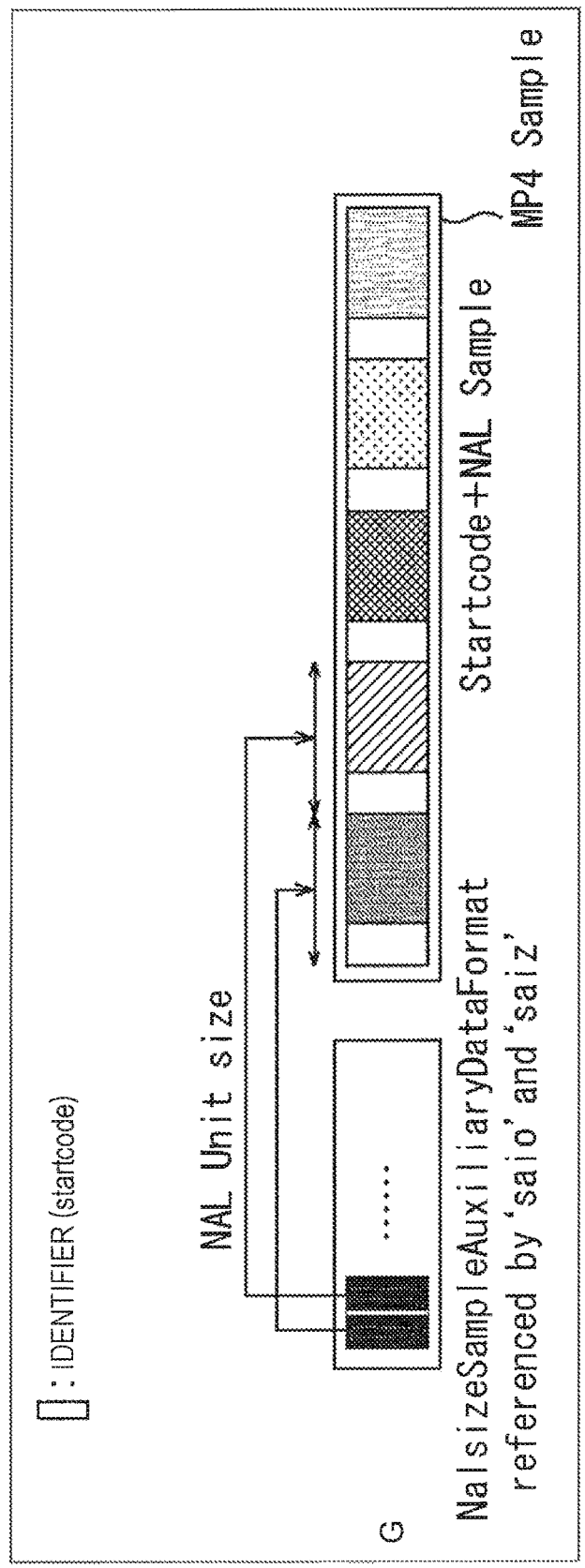
FIG. 27 is a diagram that illustrates another example of the MP4 video sample structure illustrated in FIG. 23.

FIG. 27 is a diagram that illustrates another example of the MP4 video sample structure illustrated in FIG. 23.

In the example of G of FIG. 27, similarly to the example illustrated in F of FIG. 23, the unit size is removed from the mdat, and the elementary stream in which the startcode is included is stored (reserved) as it is without any change. However, differently from the example illustrated in F of FIG. 23, in the elementary stream, each start code (startcode) is included in a NAL unit, and, in order to store the length of the NAL unit including the start code, the sample auxiliary information function defined in ISO/IEC 14496-12 is applied.

To the length of each NAL unit, aux_info_type="nalz" and aux_info_type_parameter=0 are given as the sample auxiliary information function. The sample auxiliary information function is referred to by "saiz" that is a used sample auxiliary information function size box (SampleAuxiliaryInformationSizesBox) and "saio" that is a sample auxiliary information function offset box.

In other words, in the example illustrated in G of FIG. 27, as the sample auxiliary information function, the length of the start code is not stored, and only the length of the NAL unit including the start code is stored. Accordingly, the example of G of FIG. 27 is the same as the example illustrated in F of FIG. 23 except that the length of the start code is not stored.

The file of the MP4 video sample illustrated in FIG. 27 is generated by the file generating unit 2 of the configuration illustrated in FIG. 3 described above through the file generating process illustrated in FIG. 4 or 5 described above.

In addition, the file of the MP4 video sample illustrated in FIG. 27 is decoded by the file reading unit 51 of the configuration illustrated in FIG. 9 described above through the file decoding process illustrated in FIG. 11 or 12 described above.

<4. Fourth Embodiment>

Here, conventionally, when an elementary stream of the MP4 is to be stored in MPEG2-PS, it is necessary to extract a unit size and insert a start code. To the contrary, when an elementary stream of the MPEG2-PS is to be stored in MP4, it is necessary to extract a start code and insert a unit size. In other words, at least, two types of streams are present, and, when a stream is formed as a file, the stream needs to be changed, and a flag representing compliance/no-compliance with the HRD conformance is necessary.

In addition, in a case where there are various variations in the stream according to the presence/no-presence of the startcode, there is concern that the compatibility may be lost.

In contrast to this, a byte stream format, which is a stream including a startcode, to be stored in a file of the MPEG2-PS is defined. By enabling the stream to be stored in an MP4 file, the compatibility between the two files is improved.

According to the present technology, in a sample, in order to identify whether or not a byte stream is present, a byte stream format information box used for storing information of a byte stream format is defined.

[Byte Stream Format Information Box]

Next, the byte stream format information box will be described with reference to FIG. 28.

The byte stream format information box is defined to be optional for a sample entry into which a parameter set or the like can be inserted. The sample entry into which the parameter set or the like can be inserted may be stored also as a byte stream. In addition, at that time, in order to signal that the sample entry is the byte stream, this box is stored.

In an example illustrated in FIG. 28, the specification of the byte stream format information box is illustrated.

The Byte Stream Format Information Box may be stored in 'avc3', 'avc4', 'mvc3', 'mvc4' or 'hev1' Sample Entry (in Sample entry box of media track).

This box SHALL be stored when sample data is structured by Byte Stream Format as defined in ISO/IEC 14496-10.

The Sub-Sample Information Box may be used to store one or more contiguous Byte stream NAL unit size a sub-sample is defined as one or more contiguous Byte stream NAL units as defined in ISO/IEC 14496-10.

---

Box Type: 'bsfi'
Container: Sample Entry ('avc3', 'avc4', 'mvc3', 'mvc4' or 'hev1' ) Mandatory: No
Quantity: Zero or one
Class ByteStreamFormatInformationBox extends Box('bsfi') {
  ByteStreamFormatInformation ( ) ByteStreamInformation;
}

---

The byte stream format information box is stored (housed) in a sample entry of "avc3", "avc4", "mvc3", "mvc4", or "hevc1" in a sample entry box of a media track. The sample entry of "avc3", "avc4", "mvc3", "mvc4", or "hevc1" is a sample entry into which a parameter set or the like can be inserted.

This box is stored (housed) when the sample data is configured in a byte stream format defined in ISO/IEC 14496-10.

A subsample information box may be used for storing a NAL unit size including one or more continuous startcodes.

A subsample is defined as one or more contiguous Byte stream NAL units defined in ISO/IEC 14496-10.

A box type (Box Type) is "bsfi", and an entry (Container) included therein is a sample entry of "avc3", "avc4", "mvc3", "mvc4", or "hevc1". There is no mandatory (essential item), and the quantity (volume) is "0" or "1".

The byte stream format information box extends the box of "bsfi" in which the byte stream format information is described.

In the byte stream format information box configured as described above, as illustrated in FIG. 29, by only inserting a sample entry of "avc5", "avc6", "mvc5", "mvc6" or "hevc2", which are new formats, the sample entry can be extended.

FIG. 29 is a diagram that illustrates another example of the byte stream format information box.

The Byte Stream Format Information Box SHALL be stored in 'avc5', 'avc6', 'mvc5', 'mvc6' or 'hev2' Sample Entry (in Sample entry box of media track).

This box SHALL be stored when sample data is structured by Byte Stream Format as defined in ISO/IEC 14496-10.

The Sub-Sample Information Box may be used to store one or more contiguous Byte stream NAL unit size a sub-sample is defined as one or more contiguous Byte stream NAL units as defined in ISO/IEC 14496-10.

---

Box Type: 'bsfi'
Container: Sample Entry ('avc5', 'avc6', 'mvc5', 'mvc6' or 'hev2' ) Mandatory: No
Quantity: Zero or one
Class ByteStreamFormatInformationBox extends Box('bsfi ') {
  ByteStreamFormatInformation ( ) ByteStreamInformation;
}

---

While "avc3", "avc4", "mvc3", "mvc4", or "hevc1" is a type of codec in which a parameter set can be inserted, in the case of "avc3", "avc4", "mvc3", "mvc4", or "hevc1", there is a time when a startcode is inserted therein and a time when a startcode is not inserted.

In contrast to this, as illustrated in FIG. 29, by extending the sample entry to "avc5", "avc6", "mvc5", "mvc6", "hev2", or the like, for example, as a type of codec in which a startcode is inserted and referring to this sample entry, it can be identified whether or not a byte stream is present within the sample.

In addition, in a case where the sample entry is "avc3", "avc4", "mvc3", "mvc4", or "hevc1", by configuring the byte stream format information as below, it can be identified whether or not a byte stream is present within the sample (in other words, whether or not a startcode is inserted therein).

Furthermore, the byte stream structure of the subsample can be represented.

In addition, in the case of "avc5", "avc6", "mvc5", "mvc6", or "hev2", by configuring the byte stream format information as below, the structure of the byte stream of the subsample can be represented.

[Example of Data Structure of Byte Stream Format Information]

FIG. 30 is a diagram that illustrates an example of the data structure of the byte stream format information stored in each sample entry.

```
aligned (8) class ByteStreamFormatInformation {
    unsigned int (1) StartcodePresentFlag;
    unsigned int (1) ZeroBytePresentFlag;
    unsigned int (1) LeadingZeroBytesPresentFlag;
    unsigned int (1) TrailingZeroBytesPresentFlag;
    unsigned int (4) reserved =0;
    unsigned int (24) reserved;
    Box [ ] any_box;   //Optional
}
```

StartcodePresentFlag is a flag that represents the presence/no-presence of Startcode in a sample. In a case where each of all the subsamples, which are included in a sample, includes a Startcode of three bytes before a NAL unit, the StartcodePresentFlag is "1". ZeroBytePresentFlag is a flag that represents the presence/no-presence of zero data of one byte before the Startcode, and, in a case where this flag is "1", it represents that the Startcode is four bytes.

In addition, instead of the StartcodePresentFlag and the ZeroBytePresentFlag, the Startcode may be represented to be three bytes or four bytes by using a flag of two bits.

LeadingZeroBytePresentFlag is a flag that represents the presence/no-presence of zero data in a sample. Among subsamples included in the sample, in a case where a plurality of 0x00 of one byte are included before three bytes or four bytes of at least one subsample, the LeadingZeroBytePresentFlag is "1". In a case where the LeadingZeroBytePresentFlag is "0", it can be acquired that the start of the subsample is a fixed-length start code.

TrailingZeroBytePresentFlag is a flag that represents the presence/no-presence of zero data in a sample. Among subsamples included in the sample, in a case where a plurality of 0x00 of one byte are included after a NAL unit of three bytes of at least one subsample, the TrailingZeroBytePresentFlag is "1".

In addition, among such flags, while all the flags may be arranged, all the flags are not essential, and any other flag may be added.

[Example of Storage of NAL Unit According to Present Technology]

Next, an example of the storage of a NAL unit of a case where the above-described byte stream format information is used will be described. FIG. 31 is a diagram that illustrates an example of the MP4 video sample structure in the case of Pattern 1 in which 0x00 (zero data) is present before and after the NAL unit. In other words, the example illustrated in FIG. 31 is an example of the MP4 video sample structure of a case where all the StartcodePresentFlag, ZeroBytePresentFlag, LeadingZeroBytePresentFlag, and TrailingZeroBytePresentFlag, which are the flags of the byte stream format information described above, are "1"s.

In the case of the example illustrated in FIG. 31, an example is illustrated in which a sample is configured by five subsamples, and the size of the five subsamples is stored in the sample size box as a sample size.

A subsample is configured by leading zero data (LeadingZeroBytes), a Startcode (4 bytes), a NAL unit, and trailing zero data (TrailingZeroBytes), and a size from the leading zero data to the trailing zero data is stored in the subsample information box as a size of the subsample. In other words, since the size of a subsample is present in the subsample information box, a boundary of the subsample can be acquired.

Instead of the subsample information box, the structure as illustrated in the example of G of FIG. 27 may be employed as well. As the sample auxiliary information function, aux_info_type="bsfi" and aux_info_type_parameter=0 are given. The sample auxiliary information function is referred to by "saiz" that is the used sample auxiliary information function size box (SampleAuxiliaryInformationSizesBox) and "saio" that is the sample auxiliary information function offset box.

In addition, there are cases where such an operation is performed at a CBR (constant bitrate: constant bit rate) for business. Accordingly, this Pattern 1, for example, is appropriate for a case where all the samples for business are used for streams configured by intra pictures.

Furthermore, a border between LeadingZeroBytes and TrailingZeroBytes, for example, may be set by the operation of an application.

FIG. 32 is a diagram that illustrates an example of the MP4 video sample structure in the case of Pattern 2 in which a subsample starts from a Startcode, and 0x00 (zero data) is not present. In other words, the example illustrated in FIG. 32 illustrates an example of the MP4 video sample structure of a case where StartcodePresentFlag and ZeroBytePresentFlag are 1's, and LeadingZeroBytePresentFlag and TrailingZeroBytePresentFlag are 0's.

In case of the example illustrated in FIG. 32, an example is illustrated in which a sample is configured by five subsamples, and the size of the five subsamples is stored in the sample size box as a sample size.

A subsample is configured by a Startcode (four bytes) and a NAL unit, and a size from the Startcode to the NAL unit is stored in the subsample information box as the size of the subsample. In other words, since the size of the subsample is present in the subsample information box, a boundary of the subsample can be acquired.

This Pattern 2 a simplest example.

FIG. 33 is a diagram that illustrates an example of the MP4 video sample structure in the case of Pattern 3 in which a subsample is started from a Startcode, and 0x00 (zero data) is presented after the NAL. In other words, the example illustrated in FIG. 33 illustrates an example of the MP4 video sample structure of a case where StartcodePresentFlag, ZeroBytePresentFlag, andTrailingZeroBytePresentFlag are 1's, and LeadingZeroBytePresentFlag is 0.

In the case of the example illustrated in FIG. 33, an example is illustrated in which a sample is configured by five subsamples, and the size of the five subsamples is stored in the sample size box as a sample size.

A subsample is configured by a Startcode (four bytes), a NAL unit, and trailing zero data (TrailingZeroBytes), and a size from the Startcode to the trailing zero data is stored in the subsample information box as the size of the subsample. In other words, since the size of the subsample is present in the subsample information box, a boundary of the subsample can be acquired.

In addition, in the case of this Pattern 3, for example, in an editor of streams in which all the samples for business are configured by intra pictures, it can be known that a fixed length is set by the TrailingZero, and accordingly, there is an advantage that the stream can be easily edited. In addition, there are cases where a three-byte start code is also used for a television conference system or the like.

In this way, the byte stream format information is defined by forming the byte stream format information as a box. For example, since a subsample is configured as one of Patterns 1 to 3 described above with reference to FIGS. 31 to 33, it can be identified whether or not a byte stream is included within a sample.

The files of the MP4 video samples illustrated in FIGS. 31 to 33 are generated by the file generating unit 2 having the configuration illustrated in FIG. 3 described above through file generating process illustrated in FIG. 4 or 5 described above.

In addition, the files of the MP4 video samples illustrated in FIGS. 31 to 33 are decoded by the file reading unit 51 having the configuration illustrated in FIG. 9 described above through the file decoding process illustrated in FIG. 11 or 12 described above.

[Another Example of Data Structure of Byte Stream Format Information]

FIG. 34 is a diagram that illustrates an example of the data structure of the byte stream format information stored in each sample entry. In other words, in the example illustrated in FIG. 34, another example of the data structure described above with reference to FIG. 30 is illustrated.

```
aligned (8) class ByteStreamFormatInformation {
    unsigned int (2) StartcodePresentFlag;
    unsigned int (1) LeadingZeroBytesPresentFlag;
    unsigned int (1) TrailingZeroBytesPresentFlag;
    unsigned int (4) reserved =0;
    unsigned int (24) reserved;
    Box [ ] any_box;    //Optional
}
```

StartcodePresentFlag is a two-bit flag that illustrates the structure of the Startcode of each of all the subsamples.

"StartcodePresentFlag=00b" represents "reserved".

"StartcodePresentFlag=01b" represents that a three-byte Startcode is included before a NAL unit in each of all the subsamples included in a sample.

"StartcodePresentFlag=10b" represents that a three-byte Startcode and one-byte ZeroByte data (in other words, configuring four bytes) are included before a NAL unit in each of all the subsamples included in a sample.

"StartcodePresentFlag=11b" represents that, before a NAL unit in each of all the subsamples included in a sample, a three-byte Startcode is included, and one-byte ZeroByte data may be included. In other words, in this case, since there is a possibility that a three-byte Startcode and a four-byte Startcode are mixed, it cannot be assured whether the StartcodePresentFlag is 01b or 10b.

This example is another example of the structure described with reference to FIG. 30 and is an example in which the size of the Startcode can be acquired. In addition, due to a two-bit flag, three bytes, four bytes, or mixing thereof appears.

LeadingZeroBytePresentFlag represents that, among subsamples included in a sample, before a Startcode of three bytes or four bytes of at least one subsample, a plurality of 0x00's each being configured by one byte are included.

TrailingZeroBytePresentFlag represents that, among subsamples included in a sample, a plurality of 0x00's of one byte may be included after a NAL unit of at least one subsample.

In addition, also in the example illustrated in FIG. 34, while all such flags may be present, the flags are not essential, and another flag may be added.

<5. Fifth Embodiment>

[Configuration Example of File Converting Apparatus]

Figure 35:
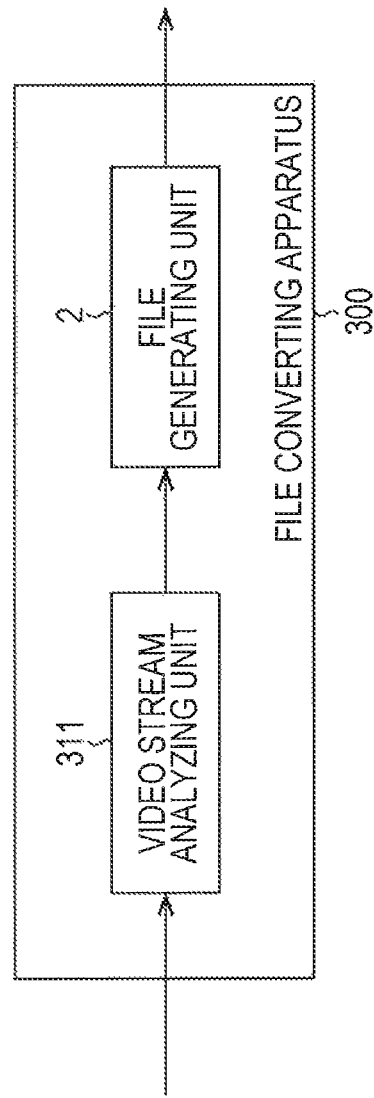
FIG. 35 is a diagram that illustrates an example of the configuration of a file converting apparatus to which the present technology is applied.

FIG. 35 is a block diagram that illustrates an example of the configuration of a file converting apparatus as an image processing device to which the present technology is applied. The file converting apparatus 300 illustrated in FIG. 35, for example, converts an MPEG-2 TS into an MP4 file.

In the example illustrated in FIG. 35, the file converting apparatus 300 is configured to include a video stream analyzing unit 311 and the file generating unit 2 illustrated in FIG. 1.

The video stream analyzing unit 311 analyzes the format of an input video stream. Ina case where the format is analyzed to be an MPEG-2 TS, the video stream analyzing unit 311 supplies the video stream to the file generating unit 2.

The file generating unit 2 performs a process of converting an MPEG-2 TS into an MP4 file. In other words, the file generating unit 2, similarly to the example illustrated in FIG. 1, generates an MP4 file in which the MPEG-2 TS is stored.

[Example of File Converting Process]

Next, the file converting process performed by the file converting apparatus 300 illustrated in FIG. 35 will be described with reference to a flowchart illustrated in FIG. 36.

The video stream analyzing unit 311, in step S311, analyzes the format of an input video stream and, in a case where the format is analyzed to be an MPEG-2 TS, supplies the video stream to the file generating unit 2.

In step S312, the file generating unit 2 generates an MP4 file in which the MPEG-2 TS is stored. This file generating process is the same as the file generating process described above with reference to FIG. 5, and thus duplicate description thereof will not be presented.

The file converting apparatus 300 may be configured as described above.

While the coding apparatus and the decoding apparatus using the HEVC system have been described as above, the present technology, as described below, may be applied also to a coding apparatus and a decoding apparatus using the AVC system.

<6. Sixth Embodiment>

[Configuration Example of Coding Apparatus]

Figure 37:
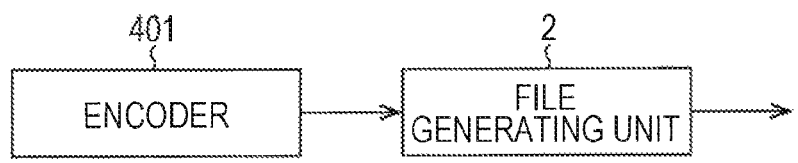
FIG. 37 is a block diagram that illustrates an example of the configuration of a coding apparatus, to which the present technology is applied, according to a third embodiment.

FIG. 37 is a block diagram that illustrates another example of the configuration of the coding apparatus as an image processing device to which the present technology is applied.

In the configuration illustrated in FIG. 37, the same reference numeral is assigned to the same configuration as that illustrated in FIG. 1. In addition, duplicate description will not be presented as is appropriate.

The configuration of the coding apparatus illustrated in FIG. 37 is different from the configuration illustrated in FIG. 1 in that an encoder 401 is disposed instead of the encoder 1. The configuration of the coding apparatus illustrated in FIG. 37 is common to the configuration illustrated in FIG. 1 in that the file generating unit 2 is disposed.

In other words, an image such as captured image configured in units of frames is input to the encoder 401 as an input signal. In addition, an SPS set on a previous stage of the encoder 401 not illustrated in the figure, VUI that represents a characteristic of an image corresponding to coded data for each sequence, SEI, and the like are input thereto.

The encoder 401 codes the input signal using parameters included in the SPS, the PPS, the VUI, and the SEI by using the AVC system. Then, the encoder 401 generates a coded stream such as an MPEG-2 TS based on the SPS, the PPS, the VUI, and the SEI and coded data acquired as a result of the coding process and supplies the generated coded stream to the file generating unit 2. The encoder 401 will be described later in detail with reference to FIG. 38.

The file generating unit 2 generates a file storing the coded stream (a series of coded image data) supplied from the encoder 401.

Figure 36:
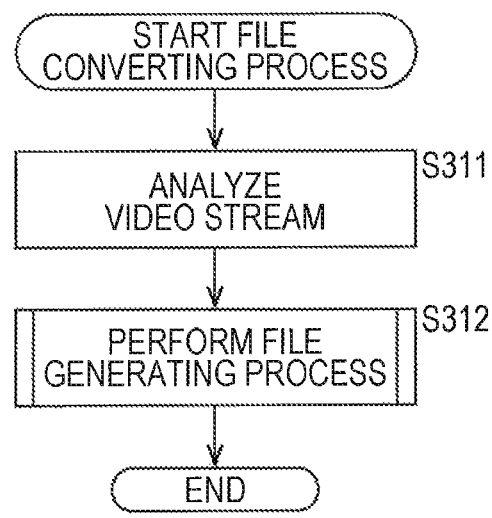
FIG. 36 is a flowchart that illustrates a file converting process.

In other words, the coding apparatus illustrated in FIG. 36 is different from the coding apparatus illustrated in FIG. 1 only in that the coding process using the AVC system is performed.

[Configuration Example of Encoding Unit]

Figure 38:
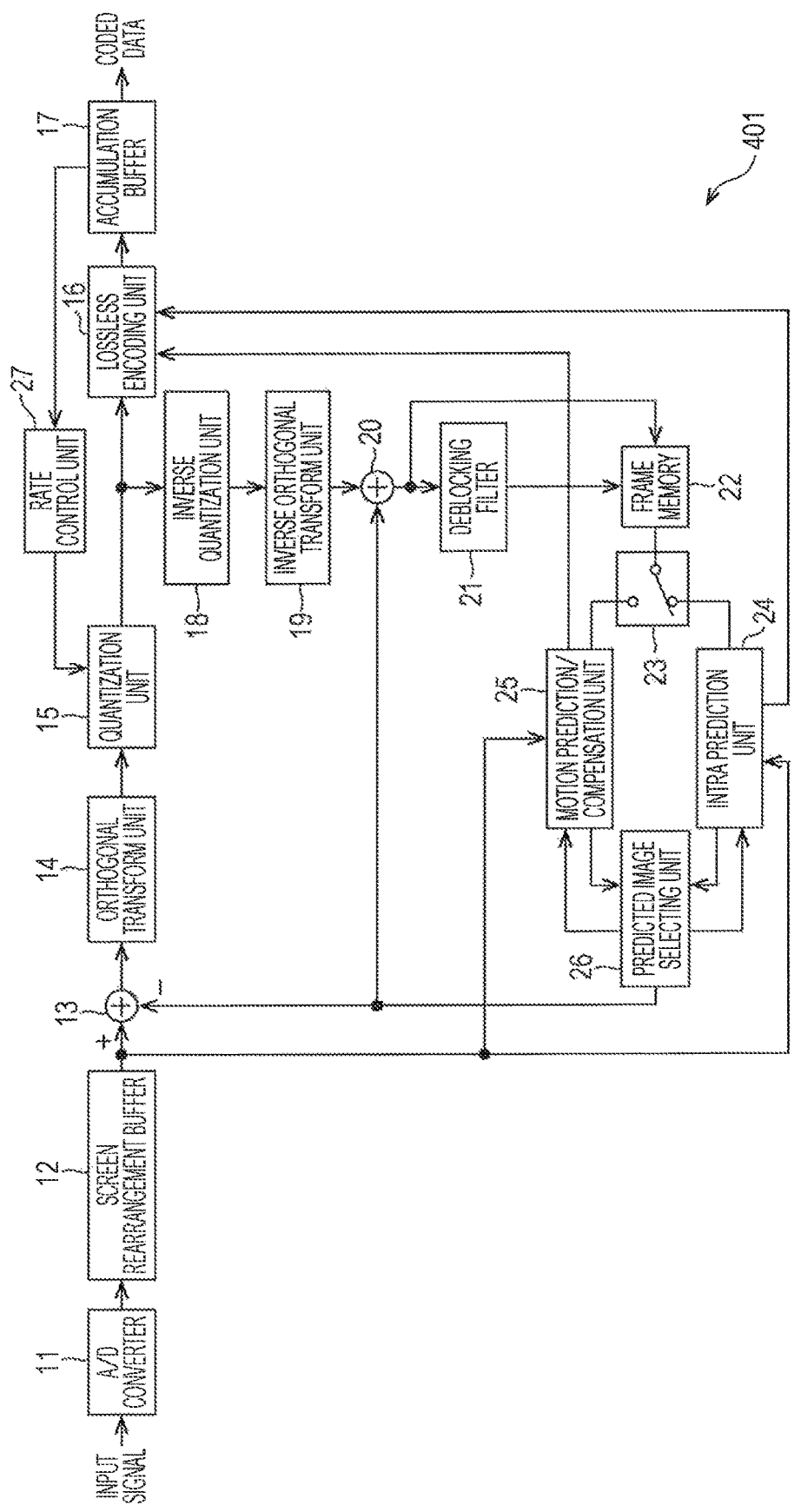
FIG. 38 is a block diagram that illustrates an example the configuration of an encoder.

FIG. 38 is a block diagram that illustrates an example the configuration of the encoder 401 illustrated in FIG. 37.

In the configuration illustrated in FIG. 38, the same reference numeral is assigned to the same configuration as that illustrated in FIG. 2. In addition, duplicate description will not be presented as is appropriate.

The encoder 401 illustrated in FIG. 38 is configured to include: an A/D converter 11; a screen rearrangement buffer 12; a calculation unit 13; an orthogonal transform unit 14; a quantization unit 15; a lossless encoding unit 16; an accumulation buffer 17; an inverse quantization unit 18; an inverse orthogonal transform unit 19; an addition unit 20; a deblocking filter 21; a frame memory 22; a switch 23; an intra prediction unit 24; a motion prediction/compensation unit 25; a predicted image selecting unit 26; and a rate control unit 27.

In other words, the configuration of the encoder 401 illustrated in FIG. 38 is different from the configuration illustrated in FIG. 2 only in that the adaptive offset filter 141 and the adaptive loop filter 142 are excluded, and the lossless encoding unit 16 performs coding using not the HEVC system but the AVC system. Accordingly, the encoder 401 performs a coding process not in units of CUs but in units of blocks.

A target for the coding process performed by the lossless encoding unit 16 is basically the same as that of the lossless encoding unit 16 illustrated in FIG. 2 except for parameters of the adaptive offset filter and the adaptive loop filter. In other words, the lossless encoding unit 16, similarly to the lossless encoding unit 16 illustrated in FIG. 2, acquires intra prediction mode information from the intra prediction unit 24. In addition, the lossless encoding unit 16 acquires inter prediction mode information, a motion vector, information used for specifying a reference image, and the like from the motion prediction/compensation unit 25.

The lossless encoding unit 16, similarly to the lossless encoding unit 16 illustrated in FIG. 2, performs lossless coding such as a variable length coding (for example, CAVLC or the like), arithmetic coding (for example, CABAC or the like) for the quantized coefficients supplied from the quantization unit 15.

In addition, the lossless encoding unit 16, similarly to the lossless encoding unit 16 illustrated in FIG. 2, performs lossless coding of the intra prediction mode information or the inter prediction mode information, the motion vector, the information specifying a reference image, the offset filter information, the filter coefficients, and the like as coding information relating to coding. The lossless encoding unit 16 supplies the coding information and the coefficients that have been coded in a lossless manner to the accumulation buffer 17 as coded data so as to be accumulated therein. Here, the coding information that is coded in a lossless manner may be regarded as header information of the coefficients that are coded in a lossless manner.

The deblocking filter 21 filters the image, which is locally decoded, supplied from the addition unit 20, thereby removing a block distortion. The deblocking filter 21 supplies an image acquired as a result thereof to the frame memory 22 so as to be accumulated therein.

The image accumulated in the frame memory 22 is output to the intra prediction unit 24 or the motion prediction/compensation unit 25 through the switch 23 as a reference image.

The present technology can be applied to the coding apparatus of the AVC system.

[Configuration Example of Decoding Apparatus]

Figure 39:
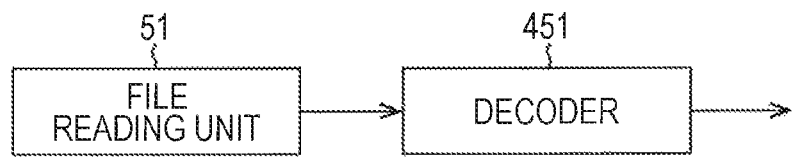
FIG. 39 is a block diagram that illustrates an example of the configuration of a decoding apparatus, to which the present technology is applied, according to the third embodiment.

FIG. 39 is a block diagram that illustrates another example of the configuration of the decoding apparatus, to which the present technology is applied, that reads and decodes a file generated by the coding apparatus illustrated in FIG. 37.

In the configuration illustrated in FIG. 39, the same reference numeral is assigned to the same configuration as that illustrated in FIG. 8. In addition, duplicate description will not be presented as is appropriate.

The configuration of the decoding apparatus 251 illustrated in FIG. 39 is different from the configuration illustrated in FIG. 8 in that a decoder 451 is disposed instead of the decoder 52. The configuration of the image decoding apparatus 251 is common to the configuration illustrated in FIG. 8 in that the file reading unit 51 is disposed.

The file reading unit 51 of the decoding apparatus receives a file of MP4 generated by the coding apparatus illustrated in FIG. 37 and reads an SPS, a PPS, VUI, SEI, coded data, and the like configuring a coded stream that is coded by the encoder 401 illustrated in FIG. 37 from the received file. The file reading unit 51 supplies the SPS, the PPS, the VUI, the SEI, and the coded data to the decoder 451.

The decoder 451, under the control of the file reading unit 51, refers to the SPS, the PPS, the VUI, the SEI, and the like supplied from the file reading unit 51 and decodes the coded data supplied from the file reading unit 51 by using the AVC system. The decoder 451 supplies an image acquired as a result of the decoding process to a later stage as an output signal.

In other words, the decoding apparatus illustrated in FIG. 39 is different from the decoding apparatus illustrated in FIG. 8 only in that the decoding process using the AVC system is performed.

[Configuration Example of Decoding Unit]

Figure 40:
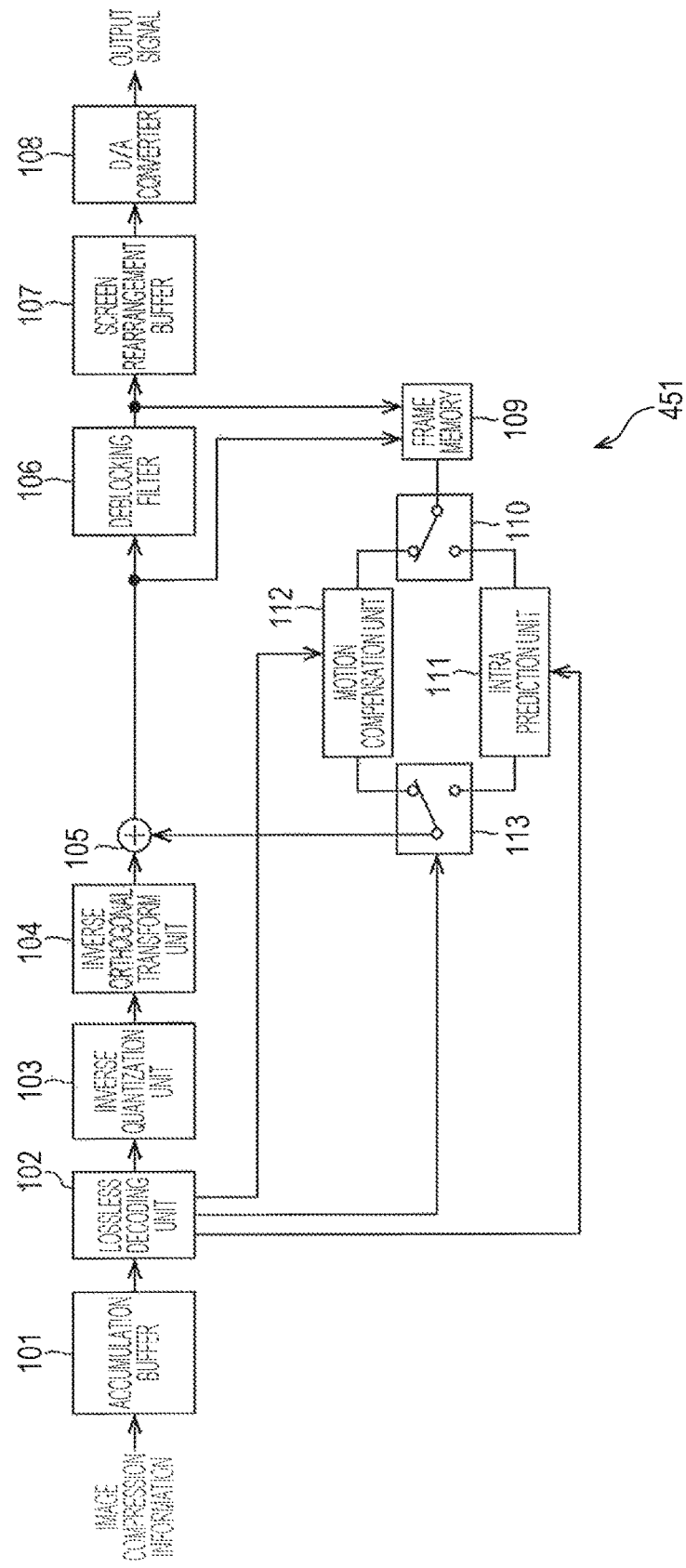
FIG. 40 is a block diagram that illustrates an example of the configuration of a decoder.

FIG. 40 is a block diagram that illustrates an example of the configuration of the decoder 451 illustrated in FIG. 39.

In the configuration illustrated in FIG. 40, the same reference numeral is assigned to the same configuration as that illustrated in FIG. 10. In addition, duplicate description will not be presented as is appropriate.

The decoder 451 illustrated in FIG. 40 is configured by: an accumulation buffer 101; a lossless decoding unit 102; an inverse quantization unit 103; an inverse orthogonal transform unit 104; an addition unit 105; a deblocking filter 106; a screen rearrangement buffer 107; a D/A converter 108; a frame memory 109; a switch 110; an intra prediction unit 111; a motion compensation unit 112; and a switch 113.

The configuration of the decoder 451 illustrated in FIG. 40 is different from the configuration illustrated in FIG. 10 only in that the adaptive offset filter 141 and the adaptive loop filter 142 are excluded, and the lossless decoding unit 102 performs decoding by using not the HEVC system but the AVC system. Accordingly, the decoder 451 performs the decoding process not in units of CUs but in units of blocks.

A target for the decoding process performed by the lossless decoding unit 102 is basically the same as that of the case of the lossless decoding unit 102 illustrated in FIG. 10 except for the parameters of the adaptive offset filter and the adaptive loop filter. In other words, the lossless decoding unit 102, similarly to the lossless decoding unit 102 illustrated in FIG. 10, performs lossless decoding such as variable-length decoding or arithmetic decoding for the coded data supplied from the accumulation buffer 101, thereby acquiring quantized coefficients and coding information. The lossless decoding unit 102 supplies the quantized coefficients to the inverse quantization unit 103.

In addition, the lossless decoding unit 102, similarly to the lossless decoding unit 102 illustrated in FIG. 10, supplies the intra prediction mode information and the like as coding information to the intra prediction unit 111 and supplies the motion vector, the information used for specifying a reference image, the inter prediction mode information, and the like to the motion compensation unit 112. Furthermore, the lossless decoding unit 102 supplies the intra prediction mode information or the inter prediction mode information as coding information to the switch 113.

The deblocking filter 106 filters an image supplied from the addition unit 105, thereby removing a block distortion. The deblocking filter 106 supplies an image acquired as a result thereof to the frame memory 109 and the screen rearrangement buffer 107.

The present technology can be applied also to the decoding apparatus of the AVC system.

In the description presented above, while the example of the MP4 file format has been described, the file format is not limited to the MP4 file format or the AVC file format. In a case where an object and an advantage according to the present technology are the same, the present technology can be similarly applied to another file format, a stream used at the time of transmission, or a stream used at the time of being stored in a file.

In addition, the present disclosure, for example, may be applied to an image coding apparatus and an image decoding apparatus that are used when image information (bitstream) compressed using an orthogonal transform such as a discrete cosine transform and motion compensation, like the HEVC system or the like, is received through a network medium such as satellite broadcast, cable television, the Internet, or a mobile phone. Furthermore, the present disclosure may be applied to an image coding apparatus and an image decoding apparatus that are used when information is processed on a storage medium such as an optical disc, a magnetic disk, or a flash memory.

A series of the processes described above can be performed either by hardware or by software. In a case where the series of the processes is performed by software, a program configuring the software is installed to a computer. Here, the computer includes a computer that is built in dedicated hardware, a computer such as a general-purpose personal computer that can execute various functions by installing various programs thereto, and the like.

Figure 41:
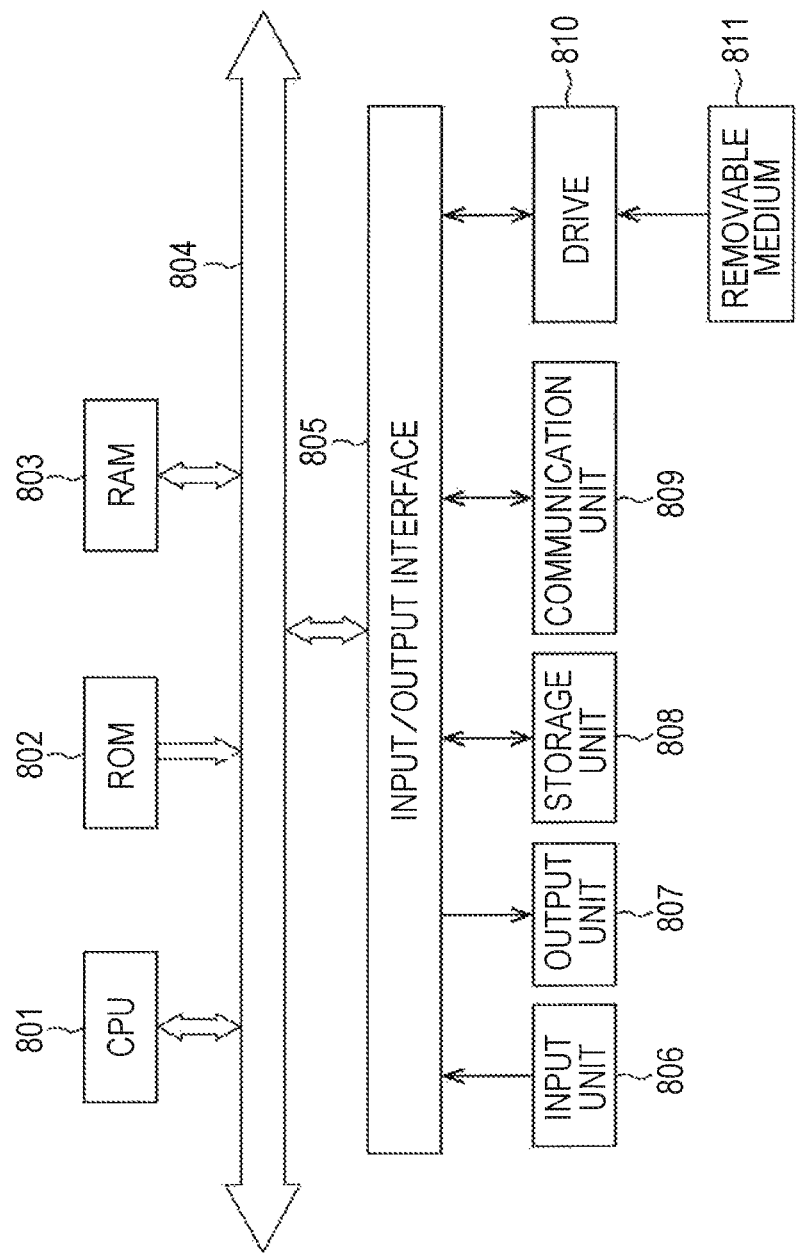
FIG. 41 is a block diagram that illustrates an example of the configuration of a computer.

FIG. 41 is a block diagram that illustrates an example of the hardware configuration of a computer that executes the series of processes described above by using a program.

In the computer 800, a CPU (Central Processing Unit) 801, a ROM (Read Only Memory) 802, and a RAM (Random Access Memory) 803 are interconnected through a bus 804.

In addition, an input/output interface 805 is connected to the bus 804. An input unit 806, an output unit 807, a storage unit 808, a communication unit 809, and a drive 810 are connected to the input/output interface 805.

The input unit 806 is configured by a keyboard, a mouse, a microphone, and the like. The output unit 807 is configured by a display, a speaker, and the like. The storage unit 808 is configured by a hard disk, a non-volatile memory, and the like. The communication unit 809 is configured by a network interface and the like. The drive 810 drives a magnetic disk, an optical disc, a magneto-optical disk, or a removable medium 811 such as a semiconductor memory.

In the computer configured as above, the CPU 801, for example, loads a program stored in the storage unit 808 into the RAM 803 through the input/output interface 805 and the bus 804 and executes the loaded program, thereby executing the series of the processes described above.

The program executed by the computer 800 (the CPU 801), for example, may be provided with being recorded on a removable medium 811 as a package medium or the like. In addition, the program may be provided through a wired or wireless transmission medium such as a local area network, the Internet, or digital satellite broadcast.

By loading the removable medium 811 into the drive 810, the program can be installed to the storage unit 808 through the input/output interface 805. In addition, the program may be received by the communication unit 809 through a wired or wireless transmission medium and be installed to the storage unit 808. Furthermore, the program may be installed to the ROM 802 or the storage unit 808 in advance.

In addition, the program executed by the computer may be a program that executes the processes in a time series along the sequence described in this specification or a program that executes the processes in a parallel manner or at necessary timing such as at the timing of being called.

Furthermore, in this specification, a step describing the program recorded on a recording medium includes not only a process performed in a time series along the described sequence but also a process that is performed in a parallel manner or an individual manner without being necessarily processed in a time series.

In addition, in this specification, a system represents a whole apparatus that is configured by a plurality of devices (apparatuses).

Furthermore, a configuration described above as one device (or processing unit) may be divided so as to be configured as a plurality of devices (or processing units). To the contrary, a configuration described above as a plurality of devices (or processing units) may be arranged to be configured as one device (or processing unit). In addition, a configuration that has not been described above may be added to the configuration of each device (or each processing unit). As long as the overall configuration and the overall operation of the system are substantially the same, a part of the configuration of a specific device (or a specific processing unit) may be configured to be included in a configuration of another device (or another processing unit). In other words, the present technology is not limited to the embodiments described above, and various changes can be made therein in a range not departing from the concept of the present technology.

In other words, the present technology is not limited to the embodiments described above, and various changes can be made therein in a range not departing from the concept of the present technology.

For example, the present technology may take a configuration of cloud computing in which one function is divided and processed cooperatively by a plurality of apparatuses through a network.

In addition, each step described in each flowchart described above may be either executed by one apparatus or executed by a plurality of apparatuses in a shared manner.

Furthermore, in a case where a plurality of processes are included in one step, the plurality of processes included in the one step may be either executed by one apparatus or executed by a plurality of apparatuses in a shared manner.

The image coding apparatus and the image decoding apparatus according to the embodiments described above can be applied to various electronic apparatuses such as a transmitter or a receiver for wired broadcasting such as satellite broadcasting or cable TV, delivery on the Internet, delivery to a terminal through cellular communication, or the like, a recording apparatus that records an image on a medium such as an optical disc, a magnetic disk, or a flash memory, or a reproduction apparatus that reproduces an image from the storage medium. Hereinafter, four application examples will be described.

<7. Application Example>

First Application Example

Television Receiver

Figure 42:
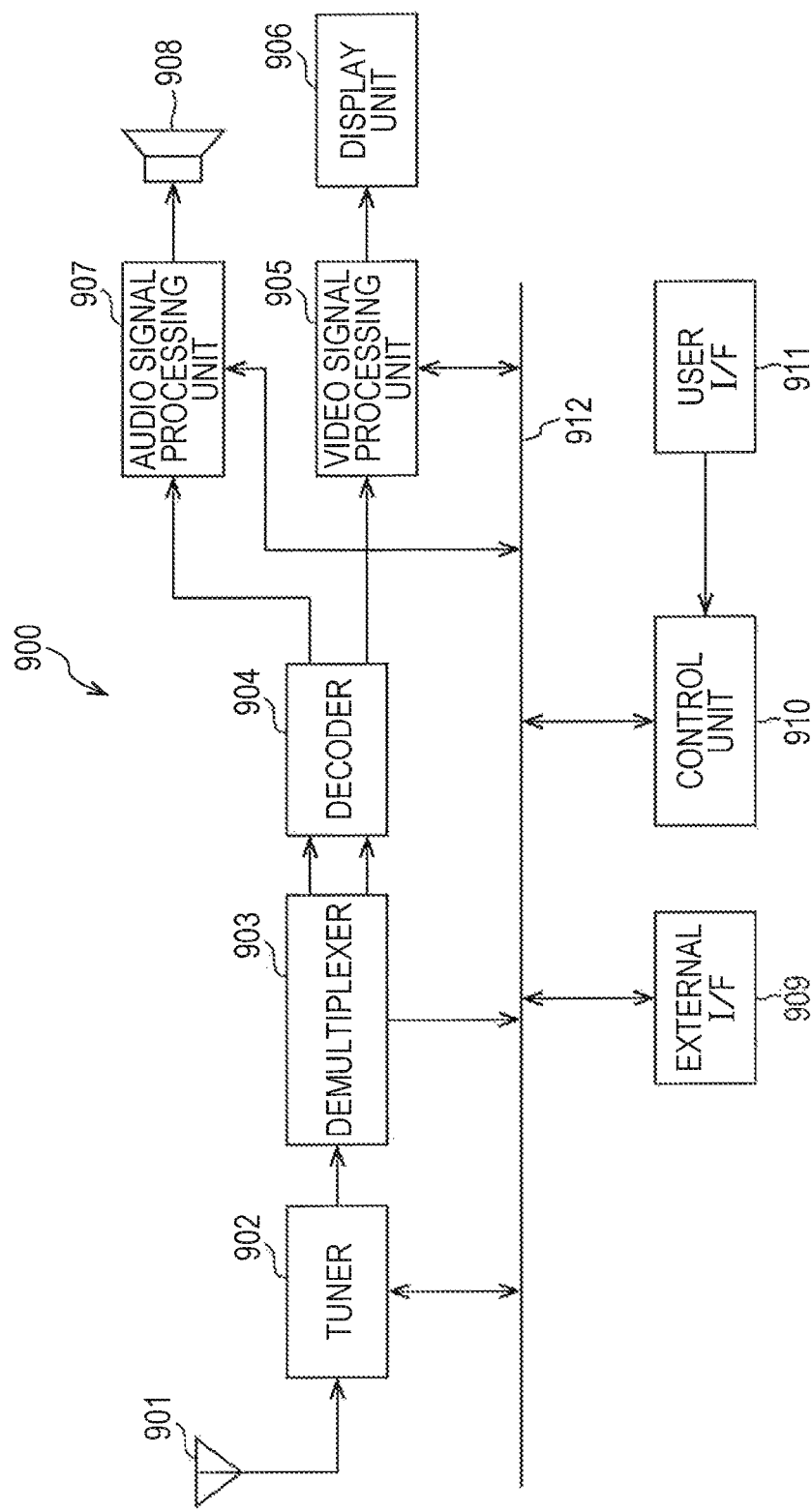
FIG. 42 is a block diagram that illustrates an example of the schematic configuration of a television apparatus.

FIG. 42 illustrates an example of the schematic configuration of a television apparatus to which the above-described embodiment is applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. Then, the tuner 902 outputs a coded bitstream acquired through demodulation to the demultiplexer 903. In other words, the tuner 902 serves as a transmission means of the television apparatus 900 that receives a coded stream in which an image is coded.

The demultiplexer 903 separates a video stream and an audio stream of a program to be watched from the coded bitstream and outputs each separated stream to the decoder 904. In addition, the demultiplexer 903 extracts auxiliary data such as EPG (Electronic Program Guide) from the coded bitstream and supplies the extracted data to the control unit 910. Furthermore, the demultiplexer 903 may perform descrambling in a case where the coded bitstream is scrambled.

The decoder 904 decodes the video stream and the audio stream input from the demultiplexer 903. Then, the decoder 904 outputs video data generated by a decoding process to the video signal processing unit 905. In addition, the decoder 904 outputs audio data generated by the decoding process to the audio signal processing unit 907.

The video signal processing unit 905 reproduces the video data input from the decoder 904 and causes the display unit 906 to display video. The video signal processing unit 905 may also cause the display unit 906 to display an application screen supplied through the network. In addition, the video signal processing unit 905 may perform an additional process such as noise removal for the video data according to a setting. Furthermore, the video signal processing unit 905 may generate a GUI (Graphical User Interface) image such as a menu, a button, and a cursor and superimpose the generated image on an output image.

The display unit 906 is driven according to a drive signal supplied from the video signal processing unit 905 so as to display a video or image on a video screen of a display device (for example, a liquid crystal display, a plasma display, an OELD (Organic ElectroLuminescence Display) (organic EL display), or the like).

The audio signal processing unit 907 performs a reproducing process such as D/A conversion and amplification for the audio data input from the decoder 904 and causes the speaker 908 to output the audio. In addition, the audio signal processing unit 907 may perform an additional, process such as noise removal for the audio data.

The external interface 909 is an interface for connecting the television apparatus 900 to an external device or the network. For example, a video stream or an audio stream received through the external interface 909 may be decoded by the decoder 904. In other words, the external interface 909 also serves as a transmission means of the television apparatus 900 that receives a coded stream in which an image is coded.

The control unit 910 includes a processor such as a CPU and a memory such as a RAM or a ROM. The memory stores a program executed by the CPU, program data, EPG data, data acquired through the network, and the like. The program stored in the memory, for example, is read by the CPU on activation of the television apparatus 900 and is executed. The CPU controls the operation of the television apparatus 900, for example, according to an operation signal input from the user interface 911 by executing the program.

The user interface 911 is connected to the control unit 910. The user interface 911, for example, includes a button and a switch for a user to operate the television apparatus 900, a reception unit for a remote control signal, and the like. The user interface 911 detects a user's operation through such components, generates an operation signal, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to each other.

In the television apparatus 900 configured in this way, the decoder 904 has the function of the image decoding apparatus (for example, the decoding apparatus configured by the file reading unit 51 and the decoder 52 illustrated in FIG. 8) according to the above-described embodiment. Accordingly, in decoding an image that is performed by the television apparatus 900, a processing burden required when a stream used at the time of transmission or a stream used at the time of being stored in a file is decoded can be reduced.

Second Application Example

Mobile Phone

Figure 43:
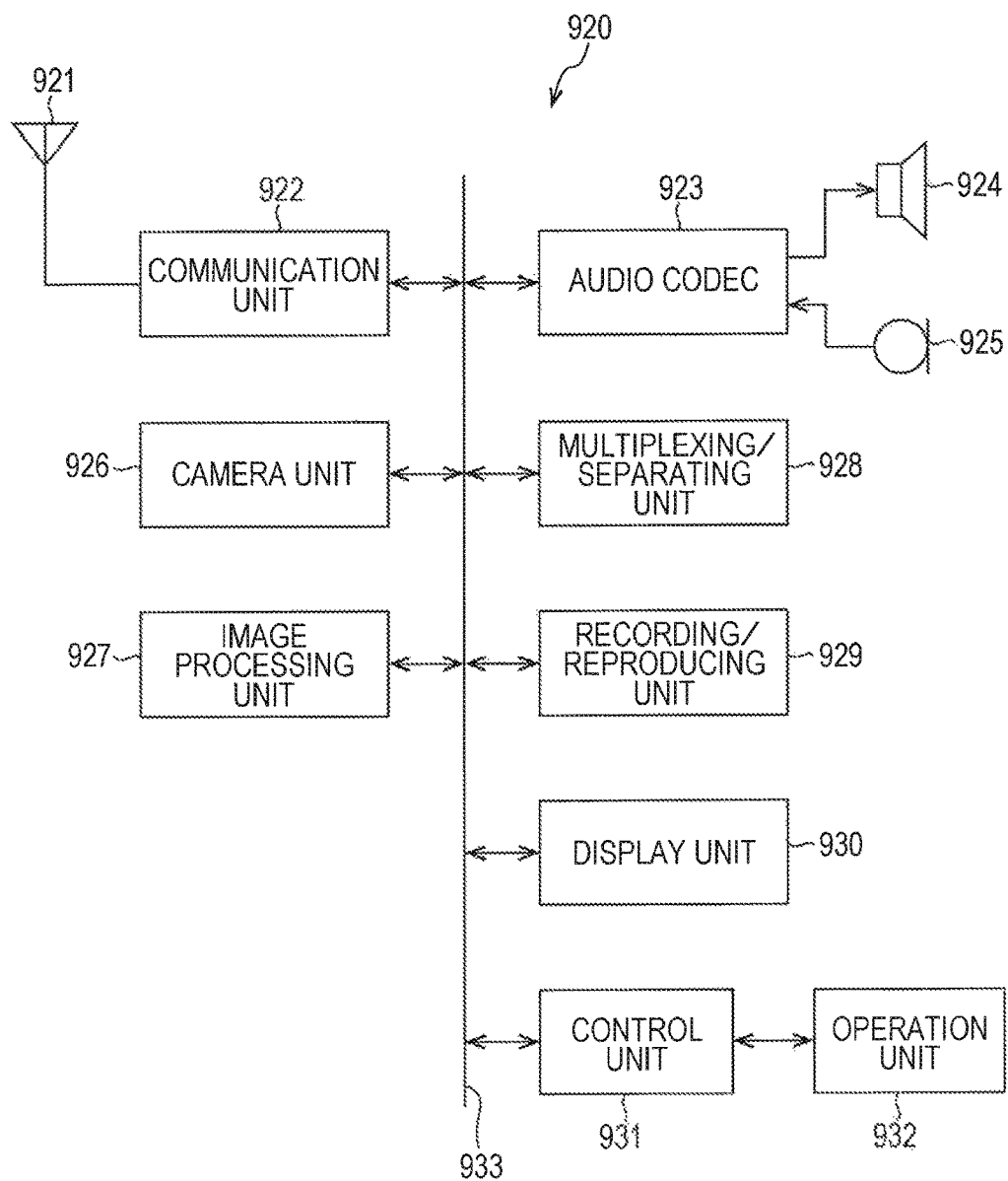
FIG. 43 is a block diagram that illustrates an example of the schematic configuration of a mobile phone.

FIG. 43 illustrates an example of the schematic configuration of a mobile phone to which the above-described embodiment is applied. The mobile phone 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to each other.

The mobile phone 920 performs operation such as transmission/reception of an audio signal, transmission/reception of an e-mail or image data, image capturing, and recording of data in various operation modes including a voice call mode, a data communication mode, an imaging mode, and a television-phone mode.

In the voice call mode, an analog audio signal generated by the microphone 925 is supplied to the audio codec 923. The audio codec 923 converts the analog audio signal into audio data, performs A/D conversion of the converted audio data, and compresses the audio data. Then, the audio codec 923 outputs the compressed audio data to the communication unit 922. The communication unit 922 codes and modulates the audio data to generate a transmission signal. Then, the communication unit 922 transmits the generated transmission signal to a base station (not illustrated in the figure) through the antenna 921. In addition, the communication unit 922 amplifies a wireless signal received through the antenna 921 and performs frequency conversion of the wireless signal, thereby acquiring a reception signal. Then, the communication unit 922 generates audio data by demodulating and decoding the reception signal and outputs the generated audio data to the audio codec 923. The audio codec 923 performs decompression and D/A conversion of the audio data, thereby generating an analog audio signal. Then, the audio codec 923 supplies the generated audio signal to the speaker 924 to causes audio to be outputted.

In the data communication mode, for example, the control unit 931 generates character data configuring an e-mail according to a user's operation performed through the operation unit 932. In addition, the control unit 931 causes the display unit 930 to display characters. The control unit 931 generates e-mail data according to a transmission instruction from the user through the operation unit 932 and outputs the generated e-mail data to the communication unit 922. The communication unit 922 codes and modulates the e-mail data, thereby generating a transmission signal. Then, the communication unit 922 transmits the generated transmission signal to a base station (not illustrated in the figure) through the antenna 921. In addition, the communication unit 922 performs amplification and frequency conversion of the wireless signal received through the antenna 921, thereby acquiring a reception signal. Then, the communication unit 922 demodulates and decodes the reception signal to restore the e-mail data and outputs the restored e-mail data to the control unit 931. The control unit 931 causes the display unit 930 to display a content of the e-mail and stores the e-mail data in a storage medium of the recording/reproducing unit 929.

The recording/reproducing unit 929 includes an arbitrary readable and writable storage medium. For example, the storage medium may be a built-in storage medium such as a RAM and a flash memory or may be an external mounting-type storage medium such as a hard disk, a magnetic disk, a magneto-optical disc, an optical disc, a USB (Universal Serial Bus) memory, or a memory card.

In the imaging mode, for example, the camera unit 926 images an object to generate image data and outputs the generated image data to the image processing unit 927. The image processing unit 927 codes the image data input from the camera unit 926 and stores a coded stream in a storage medium of the recording/reproducing unit 929.

In addition, in the television-phone mode, for example, the multiplexing/separating unit 928 multiplexes the video stream coded by the image processing unit 927 and the audio stream input from the audio codec 923 and outputs a resultant multiplexed stream to the communication unit 922. The communication unit 922 codes and modulates the stream, thereby generating a transmission signal. Then, the communication unit 922 transmits the generated transmission signal to a base station (not illustrated in the figure) through the antenna 921. In addition, the communication unit 922 performs amplification and frequency conversion of a wireless signal received through the antenna 921, thereby acquiring a reception signal. The transmission signal and the reception signal are acquired with the coded bitstream being included therein. Then, the communication unit 922 restores the stream by demodulating and decoding the reception signal and outputs the restored stream to the multiplexing/separating unit 928. The multiplexing/separating unit 928 separates a video stream and an audio stream from the input stream and outputs the video stream and the audio stream respectively to the image processing unit 927 and the audio codec 923. The image processing unit 927 decodes the video stream to generate video data. The video data is supplied to the display unit 930, and a series of images is displayed by the display unit 930. The audio codec 923 performs decompression and D/A conversion of the audio stream, thereby generating an analog audio signal. Then, the audio codec 923 supplies the generated audio signal to the speaker 924 to cause an audio to be outputted.

In the mobile phone 920 configured in this way, the image processing unit 927 has the functions of the image coding apparatus (for example, the coding apparatus configured by the encoder 1 and the file generating unit 2 illustrated in FIG. 1) and the image decoding apparatus (for example, the decoding apparatus configured by the file reading unit 51 and the decoder 52 illustrated in FIG. 8) according to the above-described embodiments. Accordingly, in coding/decoding an image that is performed by the mobile phone 920, a processing burden required when a stream used at the time of transmission or a stream used at the time of being stored in a file is decoded can be reduced.

Third Application Example

Recording/Reproducing Apparatus

Figure 44:
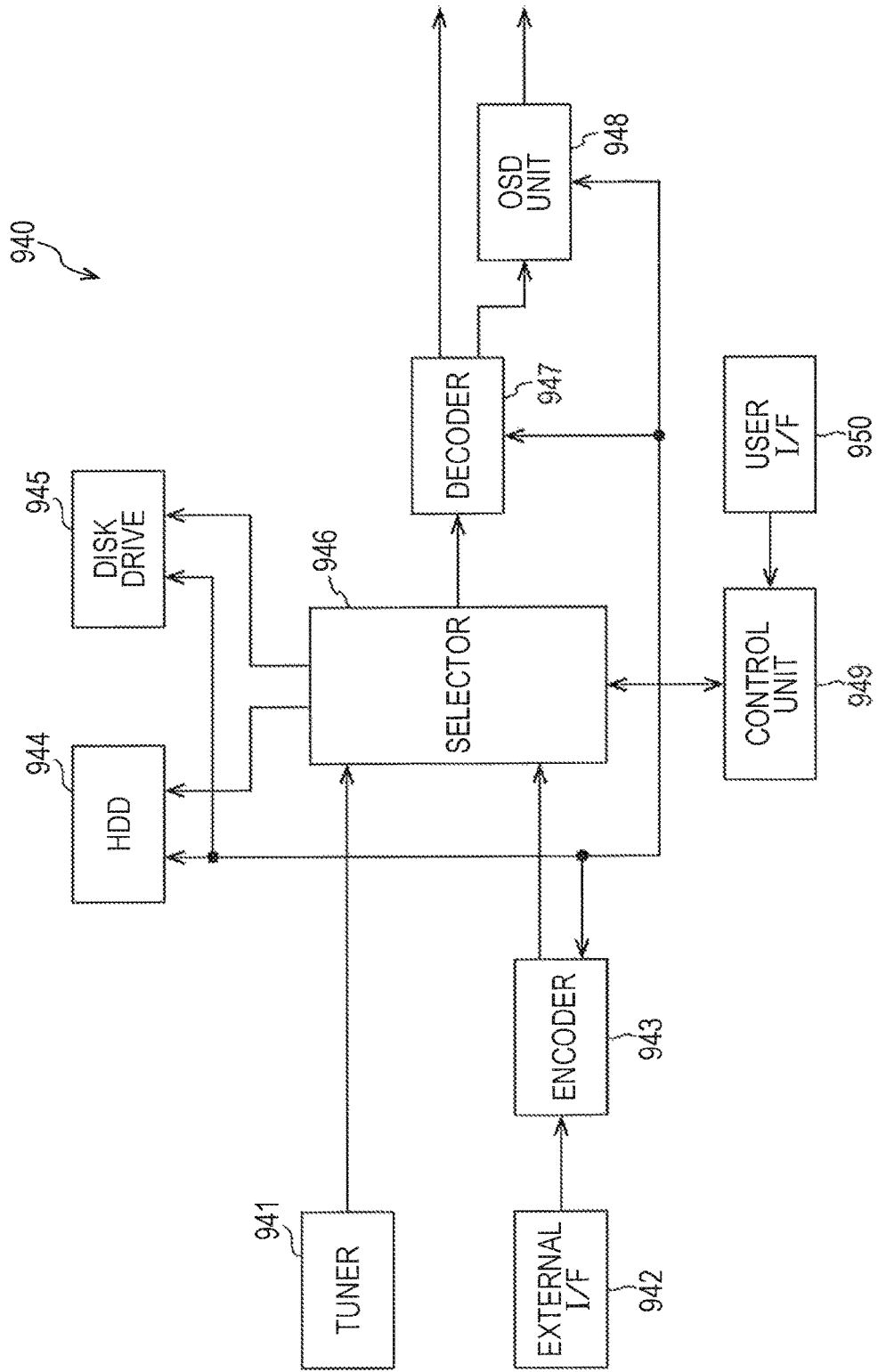
FIG. 44 is a block diagram that illustrates an example of the schematic configuration of a recording/reproducing apparatus.

FIG. 44 is a block diagram that illustrates an example of the schematic configuration of a recording/reproducing apparatus to which the above-described embodiment is applied. The recording/reproducing apparatus 940, for example, codes audio data and video data of a received broadcast program and records the coded data on a recording medium. In addition, the recording/reproducing apparatus 940, for example, may code audio data and video data acquired from another apparatus and record the coded data on a recording medium. Furthermore, the recording/reproducing apparatus 940, for example, reproduces the data recorded on the recording medium using the monitor and the speaker according to a user's instruction. At that time, the recording/reproducing apparatus 940 decodes the audio data and the video data.

The recording/reproducing apparatus 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not illustrated in the figure) and demodulates the extracted signal. Then, the tuner 941 outputs a coded bitstream acquired by the demodulation process to the selector 946. In other words, the tuner 941 serves as a transmission means of the recording/reproducing apparatus 940.

The external interface 942 is an interface used for connecting the recording/reproducing apparatus 940 and an external device or the network. The external interface 942, for example, may bean IEEE 1394 interface, a network interface, a USB interface, a flash memory interface or the like. For example, the video data and the audio data received through the external interface 942 are input to the encoder 943. In other words, the external interface 942 serves as the transmission means of the recording/reproducing apparatus 940.

In a case where the video data and the audio data input from the external interface 942 are not coded, the encoder 943 codes the video data and the audio data. Then, the encoder 943 outputs a coded bitstream to the selector 946.

The HDD 944 records the coded bitstream in which contents data such as a video and an audio is compressed, various programs, and other data in an internal hard disk. When a video and an audio are reproduced, the HDD 944 reads data thereof from the hard disk.

The disk drive 945 records and reads data on/from a loaded recording medium. The recording medium loaded into the disk drive 945, for example, may be a DVD disc (a DVD-Video, a DVD-RAM, a DVD-R, a DVD-RW, DVD+R, a DVD+RW, or the like), a Blu-ray (registered trademark) disc, or the like.

When a video and an audio are recorded, the selector 946 selects a coded bitstream input from the tuner 941 or the encoder 943 and outputs the selected coded bitstream to the HOD 944 or the disk drive 945. In addition, when the video and the audio are reproduced, the selector 946 outputs the coded bitstream input from the HDD 944 or the disk drive 945 to the decoder 947.

The decoder 947 decodes the coded bitstream to generate video data and audio data. Then, the decoder 947 outputs the generated video data to the OSD 948. In addition, the decoder 947 outputs the generated audio data to an external speaker.

The OSD 948 reproduces the video data input from the decoder 947, thereby displaying the video. The OSD 948 may superimpose an image of a GUI such as a menu, a button, a cursor, or the like on the displayed video.

The control unit 949 includes a processor such as a CPU and a memory such as a PSM or a ROM. The memory stores a program executed by the CPU, program data, and the like. The program stored in the memory, for example, is read and executed by the CPU on activation of the recording/reproducing apparatus 940. The CPU controls the operation of the recording/reproducing apparatus 940, for example, according to an operation signal input from the user interface 950 by executing the program.

The user interface 950 is connected to the control unit 949. The user interface 950, for example, includes a button and a switch for the user to operate the recording/reproducing apparatus 940 and a reception unit for a remote control signal. The user interface 950 detects a user's operation through the constituent elements to generate an operation signal and outputs the generated operation signal to the control unit 949.

In the recording/reproducing apparatus 940 configured in this way, the encoder 943 has the function of the image coding apparatus (for example, the coding apparatus configured by the encoder 1 and the file generating unit 2 illustrated in FIG. 1) according to the above-described embodiment. In addition, the decoder 947 has the function of the image decoding apparatus (for example, the decoding apparatus configured by the file reading unit 51 and the decoder 52 illustrated in FIG. 8) according to the above-described embodiment. Accordingly, in coding/decoding an image that is performed by the recording/reproducing apparatus 940, a processing burden required when a stream used at the time of transmission or a stream used at the time of being stored in a file is decoded can be reduced.

Fourth Application Example

Imaging Apparatus

Figure 45:
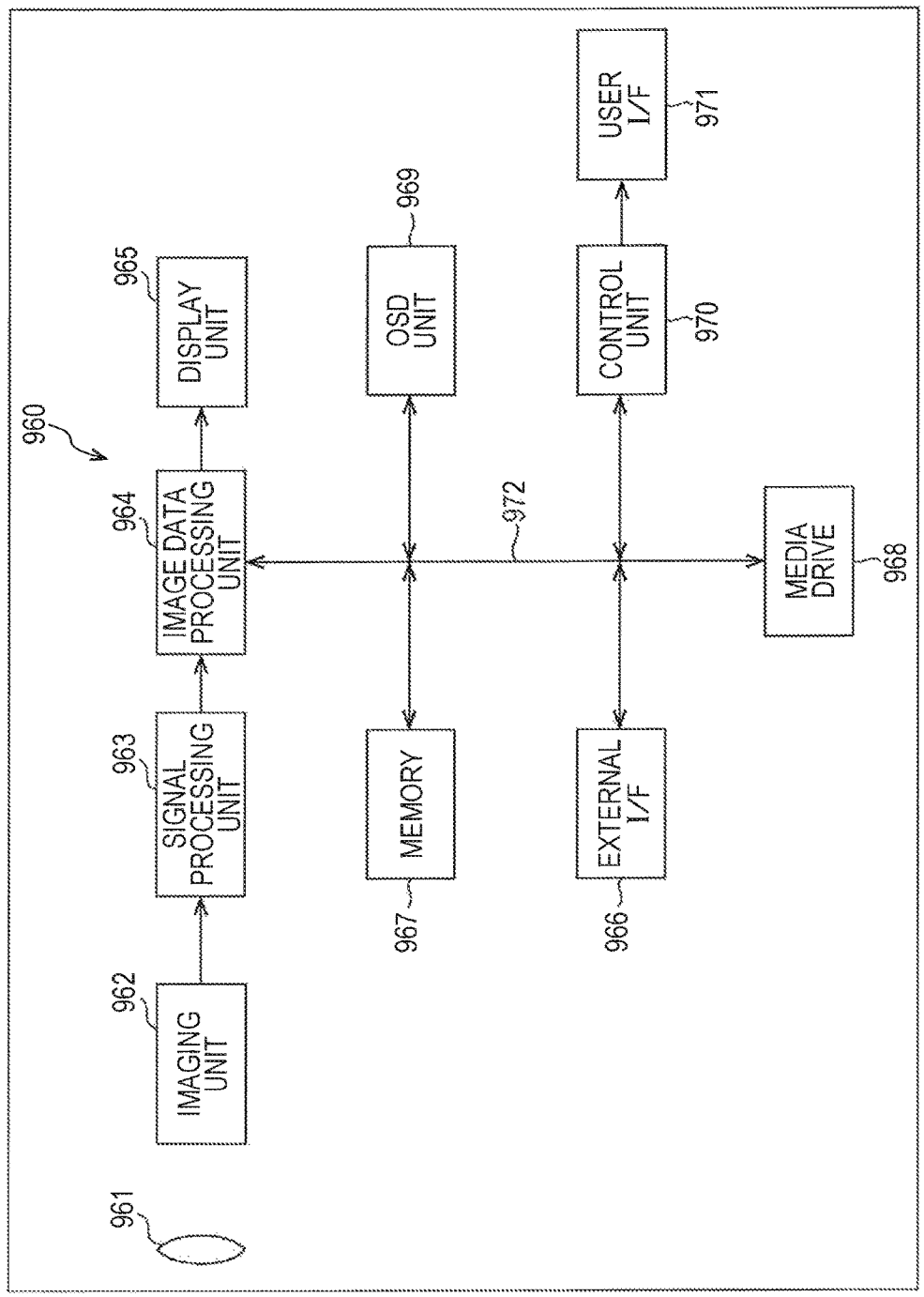
FIG. 45 is a block diagram that illustrates an example of the schematic configuration of an imaging apparatus.

FIG. 45 illustrates an example of the schematic configuration of an imaging apparatus to which the above-described embodiment is applied. The imaging apparatus 960 images an object to generate an image, codes the image data, and records the coded image data on a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the media drive 968, the OSD 969, and the control unit 970 to each other.

The optical block 961 includes a focus lens, a diaphragm mechanism, and the like. The optical block 961 forms an optical image of the object on an imaging surface of the imaging unit 962. The imaging unit 962 includes an image sensor such as a CCD (Charge Coupled Device) and a CMOS (Complementary Metal Oxide Semiconductor) and converts the optical image formed on the imaging surface into an image signal as an electric signal through photoelectric conversion. Then, the imaging unit 962 outputs the image signal to the signal processing unit 963.

The signal processing unit 963 performs various camera signal processes such as a knee correction, a gamma correction, a color correction, and the like for the image signal input from the imaging unit 962. The signal processing unit 963 outputs the image data after the camera signal processes to the image processing unit 964.

The image processing unit 964 codes the image data input from the signal processing unit 963 to generate coded data. Then, the image processing unit 964 outputs the generated coded data to the external interface 966 or the media drive 968. In addition, the image processing unit 964 decodes the coded data input from the external interface 966 or the media drive 968 to generate image data. Then, the image processing unit 964 outputs the generated image data to the display unit 965. In addition, the image processing unit 964 may output the image data input from the signal processing unit 963 to the display unit 965 to display the image. Furthermore, the image processing unit 964 may superimpose data for display that is acquired from the OSD 969 on the image output to the display unit 965.

The OSD 969, for example, generates an image of a GUI such as a menu, a button, a cursor, or the like and outputs the generated image to the image processing unit 964.

The external interface 966, for example, is configured as an USB input/output terminal. The external interface 966, for example, connects the imaging apparatus 960 and a printer when an image is printed. In addition, a drive is connected to the external interface 966 as is necessary. A removable medium such as a magnetic disk or an optical disc is loaded into the drive, and a program read from the removable medium may be installed to the imaging apparatus 960. Furthermore, the external interface 966 may be configured as a network interface that is connected to a network such as a LAN, the Internet, or the like. In other words, the external interface 966 serves as a transmission means of the imaging apparatus 960.

The recording medium loaded into the media drive 968, for example, may be an arbitrary readable/writable removable medium such as a magnetic disk, a magneto-optical disk, an optical disc, or a semiconductor memory. In addition, it may be configured such that a recording medium is fixedly mounted to the media drive 968 to configure a non-portable storage unit such as a built-in hard disk drive or an SSD (Solid State Drive).

The control unit 970 includes a processor such as a CPU and a memory such as a RAM or a ROM. The memory stores a program executed by the CPU, program data, and the like. The program stored in the memory is read by the CPU, for example, on activation of the imaging apparatus 960 and is executed. The CPU controls the operation of the imaging apparatus 960, for example, according to an operation signal input from the user interface 971 by executing the program.

The user interface 971 is connected to the control unit 970. The user interface 971, for example, includes buttons, switches, and the like for a user to operate the imaging apparatus 960. The user interface 971 detects a user's operation through such constituent elements, generates an operation signal, and outputs the generated operation signal to the control unit 970.

In the imaging apparatus 960 configured as such, the image processing unit 964 has the functions of the image coding apparatus (for example, the coding apparatus configured by the encoder 1 and the file generating unit 2 illustrated in FIG. 1) and the image decoding apparatus (for example, the decoding apparatus configured by the file reading unit 51 and the decoder 52 illustrated in FIG. 8) according to the above-described embodiments. Accordingly, in coding/decoding an image that is performed by the imaging apparatus 960, a processing burden required when a stream used at the time of transmission or a stream used at the time of being stored in a file is decoded can be reduced.

<8. Seventh Embodiment>

OTHER EXAMPLES

While the examples of the apparatus, the system, and the like to which the present technology is applied have been described as above, the present technology is not limited thereto. Thus, the present technology may be also implemented as all the components mounted in the apparatus or an apparatus configuring the system such as a processor as a system LSI (Large Scale Integration) or the like, a module using a plurality of processors and the like, a unit using a plurality of modules and the like, and a set acquired by adding another function to the unit (in other words, apart of the configuration of the apparatus).

[Video Set]

Figure 46:
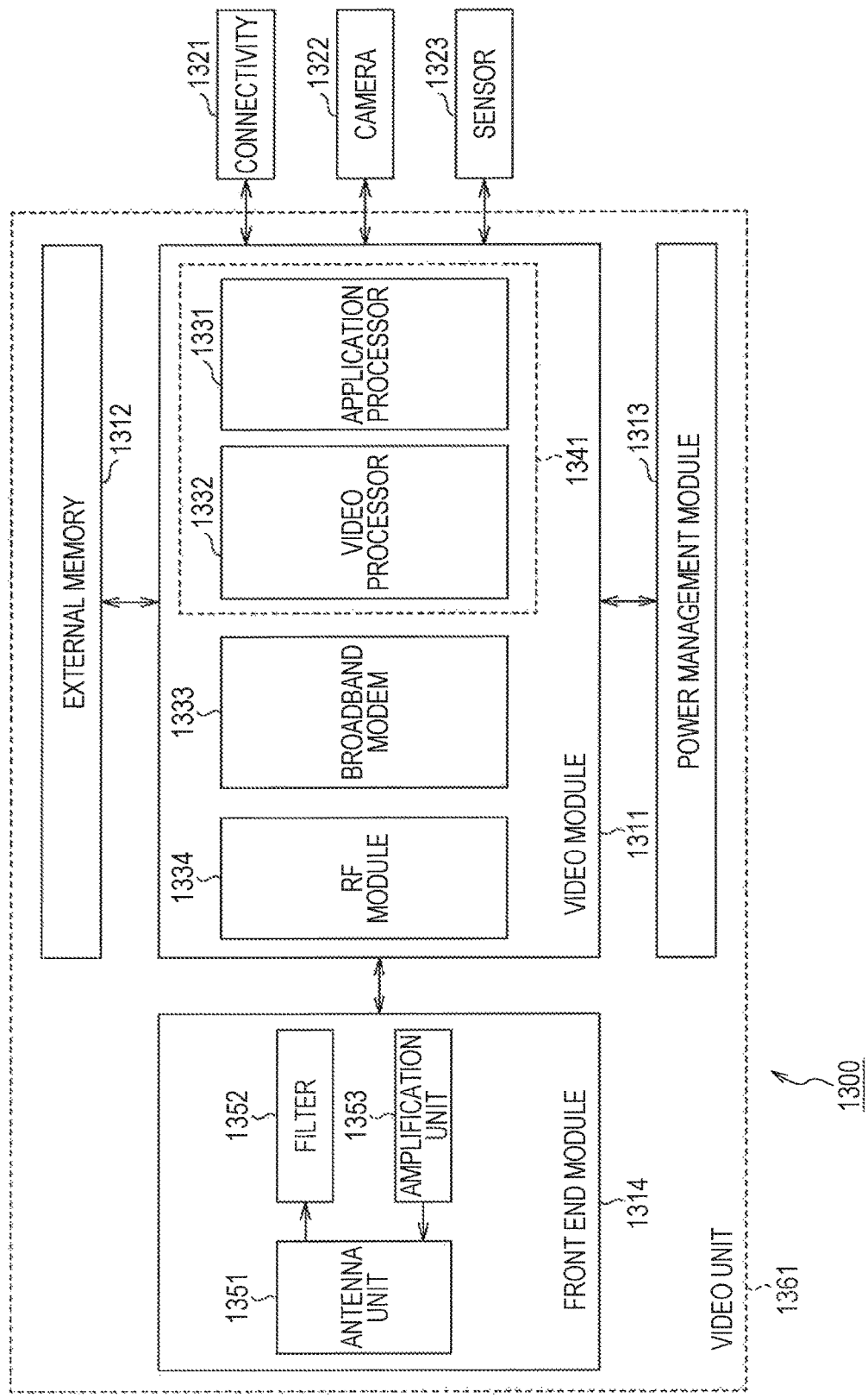
FIG. 46 is a block diagram that illustrates an example of the schematic configuration of a video set.

An example of a case where the present technology is implemented as a set will be described with reference to FIG. 46. FIG. 46 illustrates an example of the schematic configuration of a video set to which the present technology is applied.

Recently, implementation of multiple functions in electronic apparatuses has been progressed, and, in the development or the manufacture of each electronic apparatus, in a case where a part of the configuration is executed in sales, provision, or the like, frequently, there is not only a case where the part is executed as a configuration having one function but also a case where the part is executed as one set having multiple functions by combining a plurality of configurations having related functions.

The video set 1300 illustrated in FIG. 46 has such a configuration that has multiple functions and is acquired by combining a device having a function relating to coding/decoding (one of coding and decoding or both thereof) of an image with devices having other functions relating to the function.

As illustrated in FIG. 46, the video set 1300 includes: a module group such as a video module 1311, an external memory 1312, a power management module 1313, and a front end module 1314 and devices having related functions such as connectivity 1321, a camera 1322, and a sensor 1323.

A module is a component that has functions having coherence acquired by gathering several component functions relating to each other. A specific physical configuration is arbitrary, and, for example, a configuration may be considered in which a plurality of processors having respective functions, electronic circuit components such as a resistor and a capacitor, and other devices are arranged to be integrated in a wiring board or the like. In addition, it may be considered to form a new module by combining a module with other modules, a processor, or the like.

In the case of the example illustrated in FIG. 46, the video module 1311 is formed by combining configurations having functions relating to image processing and includes: an application processor, a video processor, a broadband modem 1333, and an RF module 1334.

A processor is formed by integrating a configuration having a predetermined function on a semiconductor chip through an SoC (System On a Chip) and, for example, there is a processor called an LSI (Large Scale Integration) or the like. The configuration having a predetermined function may be a logical circuit (hardware configuration), a configuration including a CPU, a ROM, a RAM, and the like and a program (software configuration) executed using the components, or a configuration acquired by combining both. For example, it may be configured such that a processor includes logic circuits, a CPU, a ROM, a RAM, and the like, some functions thereof are realized by logic circuits (hardware configuration), and the other functions are realized by a program (software configuration) executed by the CPU.

An application processor 1331 illustrated in FIG. 46 is a processor that executes an application relating to image processing. In order to realize a predetermined function, the application executed by this application processor 1331 not only executes a calculation process but also may control configurations of the inside/outside of the video module 1311 such as a video processor 1332 and the like as is necessary.

A video processor 1332 is a processor that has a function relating to coding/decoding (one of coding and decoding or both coding and decoding) of an image.

The broadband modem 1333 is a processor (or a module) that performs a process relating to wired or wireless (or wired and wireless) broadband communication that is performed through broadband communication lines such as the Internet or a public telephone switched network. For example, the broadband modem 1333 converts data (digital signal) to be transmitted into an analog signal through a digital modulation process or the like or converts a received analog signal into data (digital signal) through a demodulation process. For example, the broadband modem 1333 can perform digital modulation/demodulation of arbitrary information such as image data processed by the video processor 1332, a stream in which the image data is coded, an application program, and setting data.

The RF module 1334 is a module that performs frequency conversion, modulation/demodulation, amplification, a filter process, and the like for an RF (Radio Frequency) signal that is transmitted or received through an antenna. For example, the RF module 1334 performs the frequency conversion and the like for a baseband signal generated by the broadband modem 1333, thereby generating an RF signal. In addition, for example, the RF module 1334 performs the frequency conversion and the like for an RF signal received through the front end module 1314, thereby generating a baseband signal.

As denoted by a dotted line 1341 in FIG. 46, the application processor 1331 and the video processor 1332 may be integrated so as to be configured as one processor.

The external, memory 1312 is a module that is arranged outside the video module 1311 and has a memory device used by the video module 1311. While the memory device of the external memory 1312 may be realized by a certain physical configuration, generally, the memory device is frequently used for storing data of a large volume such as image data configured in units of frames. Accordingly, it is preferable that memory device is realized by a semiconductor memory of a large capacity such as a DRAM (Dynamic Random Access Memory) at a relatively low cost.

The power management module 1313 manages and controls supply of power to the video module 1311 (each configuration arranged inside the video module 1311).

The front end module 1314 is a module that provides a front end function (a circuit at the transmission/reception end on the antenna side) for the RF module 1334. As illustrated in FIG. 46, the front end module 1314, for example, includes an antenna unit 1351, a filter 1352, and an amplification unit 1353.

The antenna unit 1351 includes an antenna that transmits and receives wireless signals and peripheral configurations. The antenna unit 1351 transmits a signal supplied from the amplification unit 1353 as a wireless signal and supplies the received wireless signal to the filter 1352 as an electrical signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection with the outside. The physical configuration of the connectivity 1321 is arbitrary. For example, the connectivity 1321 includes a configuration having a communication function according to a communication standard other than a communication standard with which the broadband modem 1333 is compliant, an external input/output terminal, and the like.

For example, the connectivity 1321 may be configured to include a module that has a communication function compliant with a radio communication standard such as Bluetooth (registered trademark), IEEE 802.11 (for example, Wi-Fi (Wireless Fidelity; registered trademark)), NFC (Near Field Communication), or IrDA (Infrared Data Association), an antenna that transmits and receives signals compliant with the standard, and the like. In addition, for example, the connectivity 1321 may be configured to include a module that has a communication function compliant with a wired communication standard such as USB (Universal Serial Bus) or HDMI (registered trademark) (High-Definition Multimedia Interface) and terminals compliant with the standard. Furthermore, for example, the connectivity 1321 may be configured to have another data (signal)transmission function of an analog input/output terminal or the like.

In addition, the connectivity 1321 may be configured to include a device of the transmission destination of data (signal). For example, the connectivity 1321 may be configured to include a drive (including not only a drive of a removable medium but also a hard disk, an SSD (Solid State Drive), a NAS (Network Attached Storage), and the like) that reads/writes data from/into a recording medium such as a magnetic disk, an optical disc, a magneto-optical disk, or a semiconductor memory. In addition, the connectivity 1321 may be configured to include an output device (a monitor, a speaker, or the like) of an image or a voice.

The camera 1322 is a module that has a function for acquiring image data of a subject by imaging the subject. The image data acquired by the imaging process performed by the camera 1322, for example, is supplied to the video processor 1332 and is coded.

The sensor 1323 is a module that has the function of an arbitrary sensor such a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, a tilt sensor, a magnetic identification sensor, an impact sensor, or a temperature sensor. Data detected by the sensor 1323, for example, is supplied to the application processor 1331 and is used by the application sensor and the like.

The configuration described above as the module may be realized as the processor. To the contrary, the configuration described above as the processor may be realized as the module.

In the video set 1300 having the above-described configuration, as will be described later, the present technology may be applied to the video processor 1332. Accordingly, the video set 1300 may be executed as a set to which the present technology is applied.

[Example of Configuration of Video Processor]

Figure 47:
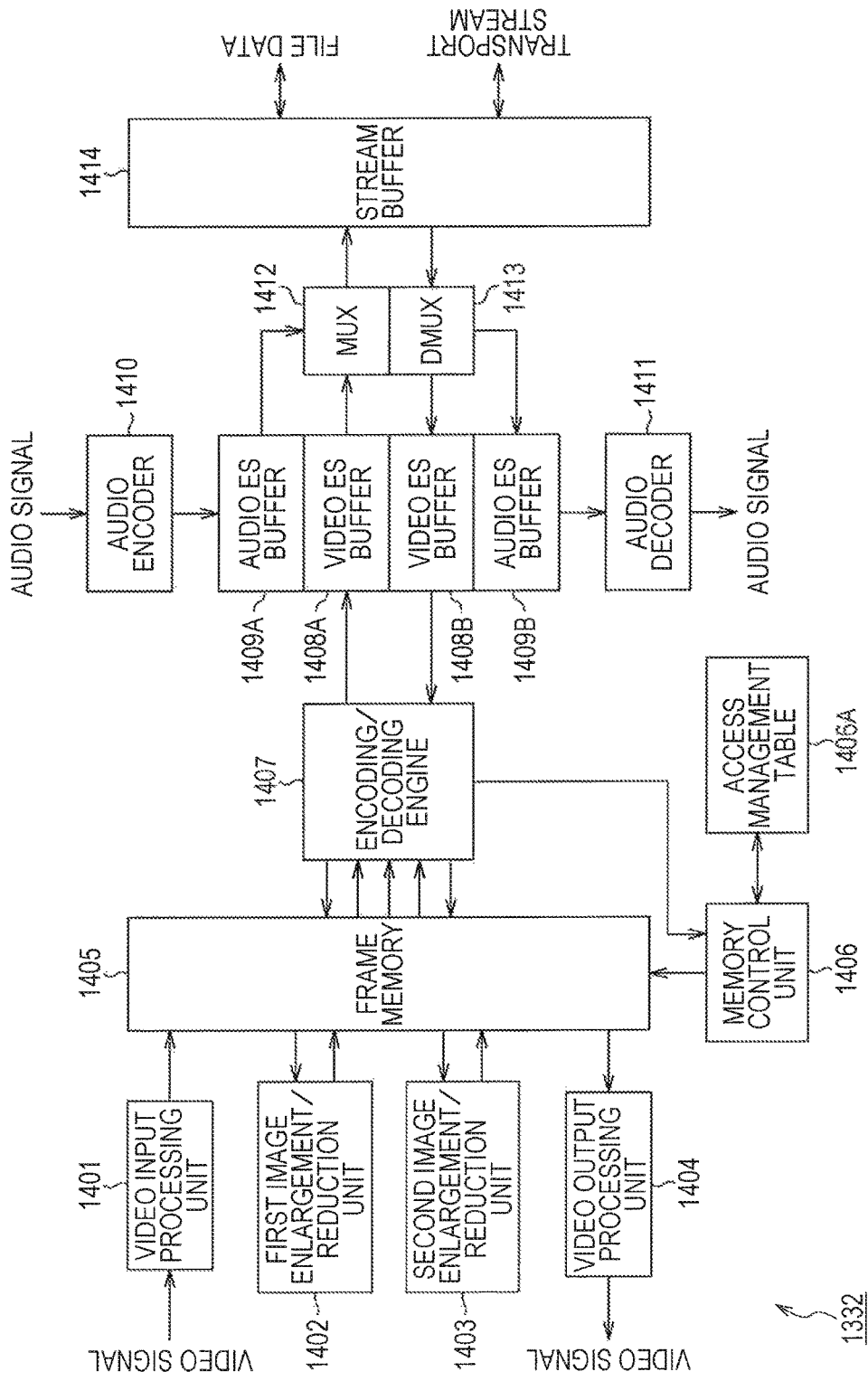
FIG. 47 is a block diagram that illustrates an example of the schematic configuration of a video processor.

FIG. 47 illustrates an example of the schematic configuration of the video processor 1332 (FIG. 46) to which the present technology is applied.

In the case of the example illustrated in FIG. 47, the video processor 1332 has a function for receiving inputs of a video signal and an audio signal and coding the video signal and the audio signal according to a predetermined system and a function for decoding coded video data and coded audio data and reproducing and outputting a video signal and audio signal.

As illustrated in FIG. 47, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video ES (Elementary Stream) buffers 1408A and 1408B; and audio ES buffers 1409A and 1409B. Furthermore, the video processor 1332 includes: an audio encoder 1410; an audio decoder 1411; a multiplexer (MUX (Multiplexer)) 1412; a demultiplexer (DMUX (Demultiplexer)) 1413; and a stream buffer 1414.

The video input processing unit 1401, for example, acquires a video signal input from the connectivity 1321 (FIG. 46) or the like and converts the video signal into digital image data. The first image enlargement/reduction unit 1402 performs a format conversion, an image enlargement/reduction process, and the like for the image data. The second image enlargement/reduction unit 1403 performs an image enlargement/reduction process according to a format of the output destination through the video output processing unit 1404, the same format conversion as that of the first image enlargement/reduction unit 1402, an image enlargement/reduction process, and the like for the image data. The video output processing unit 1404 performs a format conversion, a conversion into an analog signal, and the like for the image data and outputs a resultant signal, for example, to the connectivity 1321 (FIG. 46) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405, for example, is realized by a semiconductor memory such as a DRAM.

The memory control unit 1406 receives a synchronization signal from the encoding/decoding engine 1407 and controls accesses to the frame memory 1405 for writing/reading according to an access schedule for accessing the frame memory 1405 that is written in an access management table 1406A. The access management table 1406A is updated by the memory control unit 1406 in accordance with the processes performed by the encoding/decoding engine 1407, the first image enlargement/reduction unit 1402, the second image enlargement/reduction unit 1403, and the like.

The encoding/decoding engine 1407 performs an encoding process of image data and a decoding process of a video stream that is data acquired by coding the image data. For example, the encoding/decoding engine 1407 codes the image data read from the frame memory 1405 and sequentially writes the image data into the video ES buffer 1408A as a video stream. In addition, for example, the encoding/decoding engine 1407 sequentially reads and decodes video streams supplied from the video ES buffer 1408B and sequentially writes the decoded video streams into the frame memory 1405 as image data. The encoding/decoding engine 1407 uses the frame memory 1405 as a work area in such coding and decoding processes. In addition, the encoding/decoding engine 1407 outputs a synchronization signal to the memory control unit 1406, for example, at timing when a process for each macroblock is started.

The video ES buffer 1408A buffers a video stream generated by the encoding/decoding engine 1407 and supplies the buffered video stream to the multiplexer (MUX) 1412. The video ES buffer 1408B buffers a video stream supplied from the demultiplexer (DMUX) 141.3 and supplies the buffered video stream to the encoding/decoding engine 1407.

The audio ES buffer 1409A buffers an audio stream generated by the audio encoder 1410 and supplies the buffered audio stream to the multiplexer (MUX) 1412. The audio ES buffer 1409B buffers an audio stream supplied from the demultiplexer (DMUX) 1413 and supplies the buffered audio stream to the audio decoder 1411.

The audio encoder 1410, for example, converts an audio signal, for example, input from the connectivity 1321 (FIG. 46) or the like into a digital signal and codes the converted digital signal according to a predetermined system such as an MPEG audio system or an AC3 (AudioCode number 3) system. The audio encoder 1410 sequentially writes audio streams each being data acquired by coding an audio signal into the audio ES buffer 1409A. The audio decoder 1411 decodes the audio stream supplied from the audio ES buffer 1409B and, for example, performs a conversion into an analog signal, and the like for the decoded audio stream and supplies a resultant signal, for example, to the connectivity 1321 (FIG. 46) or the like as a reproduced audio signal.

The multiplexer (MUX) 1412 multiplexes a video stream and an audio stream. A method of this multiplexing process (in other words, the format of a bitstream generated by the multiplexing process) is arbitrary. In addition, in the multiplexing process, the multiplexer (MUX) 1412 may add predetermined header information and the like to the bitstream. In other words, the multiplexer (MUX) 1412 can convert the format of a stream through the multiplexing process. For example, by multiplexing a video stream and an audio stream, the multiplexer (MUX) 1412 converts the streams into a transport stream that is a bitstream of a transmission format. In addition, for example, by multiplexing the video stream and the audio stream, the multiplexer (MUX) 1412 converts the streams into data (file data) of a recording file format.

The demultiplexer (DMUX) 1413 demultiplexes a bitstream in which a video stream and an audio stream are multiplexed using a method corresponding to the multiplexing process performed by the multiplexer (MUX) 1412. In other words, the demultiplexer (DMUX) 141.3 extracts a video stream and an audio stream from the bitstream read from the stream buffer 1414 (separates the video stream and the audio stream from each other). In other words, the demultiplexer (DMUX) 1413 can convert the format of a stream through the demultiplexing process (an inverse conversion of the conversion performed by the multiplexer (MUX) 1412). For example, the demultiplexer (DMUX) 1413 acquires a transport stream supplied, for example, from the connectivity 1321 (FIG. 46), the broadband modem 1333 (FIG. 46), or the like through the stream buffer 1414 and demultiplexes the supplied transport stream, thereby converting the transport stream into a video stream and an audio stream. In addition, for example, the demultiplexer (DMUX) 1413 acquires file data, for example, read from various recording media by the connectivity 1321 (FIG. 46) through the stream buffer 1414 and demultiplexes the acquired file data, thereby converting the file data into a video stream and an audio stream.

The stream buffer 1414 buffers the bitstream. For example, the stream buffer 1414 buffers the transport stream supplied from the multiplexer (MUX) 1412 and supplies the buffered transport stream, for example, to the connectivity 1321 (FIG. 46), the broadband modem 1333 (FIG. 46), or the like at predetermined timing or based on a request from the outside, or the like.

In addition, for example, the stream buffer 1414 buffers the file data supplied from the multiplexer (MUX) 1412 and supplies the buffered file data, for example, to the connectivity 1321 (FIG. 46) or the like at predetermined timing, a request from the outside, or the like so as to be recorded on various recording media.

Furthermore, the stream buffer 1414 buffers a transport stream, for example, acquired through the connectivity 1321 (FIG. 46), the broadband modem 1333 (FIG. 46), or the like and supplies the buffered transport stream to the demultiplexer (DMUX) 1413 at predetermined timing or based on a request from the outside or the like.

In addition, the stream buffer 1414 buffers file data read from various recording media by the connectivity 1321 (FIG. 46) or the like and supplies the buffered file data to the demultiplexer (DMUX) 1413 at predetermined timing or a request from the outside or the like.

Next, an example of the operation of the video processor 1332 having such a configuration will be described. For example, a video signal input from the connectivity 1321 (FIG. 46) or the like to the video processor 1332 is converted into digital image data of a predetermined system such as a 4:2:2 Y/Cb/Cr system in the video input processing unit 1401 and is sequentially written into the frame memory 1405. This digital image data is read by the first image enlargement/reduction unit 1402 or the second image enlargement/reduction unit 1403, a format conversion into a predetermined system such as a 4:2:0 Y/Cb/Cr system and an enlargement/reduction process are performed for the read digital image data, and resultant digital image data is rewritten Into the frame memory 1405. This image data is coded by the encoding/decoding engine 1407 and is written into the video ES buffer 1408A as a video stream.

In addition, an audio signal input from the connectivity 1321 (FIG. 46) or the like to the video processor 1332 is coded by the audio encoder 1410 and is written into the audio ES buffer 1409A as an audio stream.

A video stream buffered in the video ES buffer 1408A and an audio stream buffered in the audio ES buffer 1409A are read and multiplexed by the multiplexer (MUX) 1412 and is converted into a transport stream, file data, or the like. The transport stream generated by the multiplexer (MUX) 1412 is buffered in the stream buffer 1414 and then, is output to an external network, for example, through the connectivity 1321 (FIG. 46), the broadband modem 1333 (FIG. 46), or the like. In addition, the file data generated by the multiplexer (MUX) 1412 is buffered in the stream buffer 1414 and then, is output, for example, to the connectivity 1321 (FIG. 46) or the like and is recorded on various recording media.

In addition, the transport stream input to the video processor 1332 from an external network, for example, through the connectivity 1321 (FIG. 46), the broadband modem 1333 (FIG. 46), or the like is buffered in the stream buffer 1414 and then, is demultiplexed by the demultiplexer (DMUX) 1413. In addition, the file data that is read from various recording media and is input to the video processor 1332, for example, by the connectivity 1321 (FIG. 46) or the like is buffered in the stream buffer 1414 and then, is demultiplexed by the demultiplexer (DMUX) 1413. In other words, the transport stream or the file data input to the video processor 1332 is separated into a video stream and an audio stream by the demultiplexer (DMUX) 1413.

The audio stream is supplied to the audio decoder 1411 through the audio ES buffer 1409B and is decoded, and an audio signal is reproduced. In addition, the video stream is written into the video ES buffer 1408B and then is sequentially read and decoded by the encoding/decoding engine 1407 and is written into the frame memory 1405. The decoded image data is processed to be enlarged or reduced by the second image enlargement/reduction unit 1403 and is written into the frame memory 1405. Then, the decoded image data is read by the video output processing unit 1404, is converted into another format according to a predetermined system such as the 4:2:2 Y/Cb/Cr system or the like, and is further converted into an analog signal, and a video signal is reproduced and output.

In a case where the present technology is applied to the video processor 1332 configured as such, the present technology relating to each embodiment described above may be applied to the encoding/decoding engine 1407. In other words, for example, the encoding/decoding engine 1407 may be configured to have the functions of the image coding apparatus (FIG. 1) configured by the encoder 1 and the file generating unit 2 according to the first embodiment and the image decoding apparatus (FIG. 8) configured by the file reading unit 51 and the decoder 52. By configuring as such, the video processor 1332 can have the same advantages as those described above with reference to FIGS. 1 to 36.

In addition, in the encoding/decoding engine 1407, the present technology (in other words, the functions of the image coding apparatus and the image decoding apparatus according to each embodiment described above) may be realized by hardware such as logic circuits or software such as an embedded program or may be realized by both the hardware and the software.

[Another Example of Configuration of Video Processor]

Figure 48:
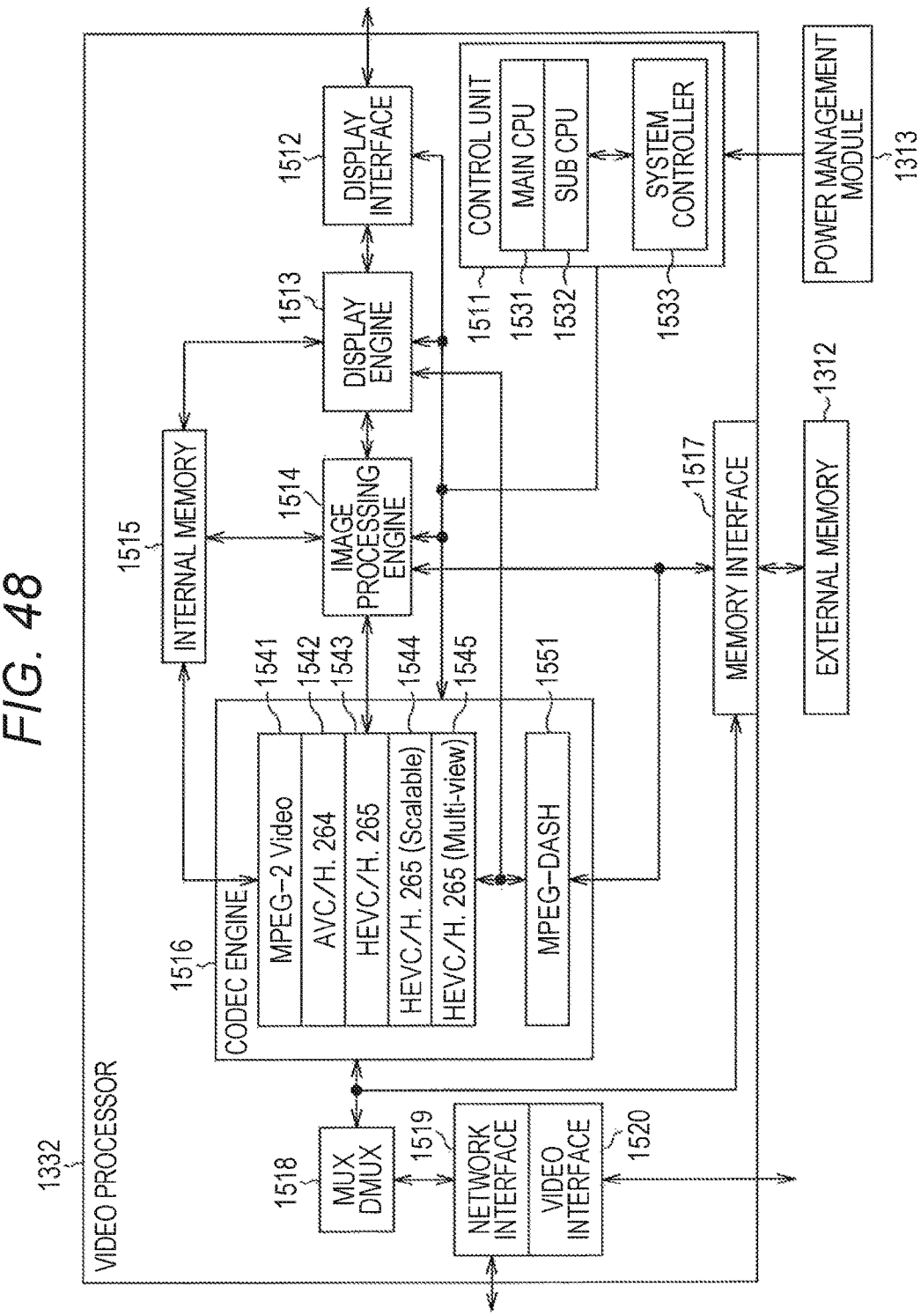
FIG. 48 is a block diagram that illustrates another example of the schematic configuration of a video processor.

FIG. 48 illustrates another example of the schematic configuration of a video processor 1332 (FIG. 46) to which the present technology is applied. In the case of the example illustrated in FIG. 48, the video processor 1332 has a function for coding and decoding video data according to a predetermined system.

More, specifically, as illustrated in FIG. 48, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexer/demultiplexer (MUX DMUX) 1518; a network interface 1519; and a video interface 1520.

The control unit 1511 controls the operations of the processing units arranged inside the video processor 1332 such as the display interface 1512, the display engine 1513, the image processing engine 1514, and the codec engine 1516.

As illustrated in FIG. 48, the control unit 1511, for example, includes a main CPU 1531, a sub CPU 1532, and a system controller 1533. The main CPU 1531 executes a program used for controlling the operation of each processing unit arranged inside the video processor 1332 and the like. The main CPU 1531 generates a control signal according to the program or the like and supplies the control signal to each processing unit (in other words, controls the operation of each processing unit). The sub CPU 1532 achieves an auxiliary role of the main CPU 1531. For example, the sub CPU 1532 executes a child process, a subroutine, or the like of a program executed by the main CPU 1531. The system controller 1533 controls the operations of the main CPU 1531 and the sub CPU 1532 by performing designation of programs to be executed by the main CPU 1531 and the sub CPU 1532 and the like.

The display interface 1512 outputs image data, for example, to the connectivity 1321 (FIG. 46) and the like under the control of the control unit 1511. For example, the display interface 1512 converts image data that is digital data into an analog signal and outputs the analog signal as a reproduced video signal or the image data that is the digital data to a monitor device of the connectivity 1321 (FIG. 46) or the like.

The display engine 1513, under the control of the control unit 1511, performs various conversion processes such as a format conversion, a size conversion, and a color gamut conversion for the image data so as to match the hardware specification of a monitor device displaying the image and the like.

The image processing engine 1514 performs predetermined image processing such as a filter process used for improving the image quality and the like for the image data under the control of the control unit 1511.

The internal memory 1515 is a memory that is shared by the display engine 1513, the image processing engine 1514, and the codec engine 1516 and is disposed inside the video processor 1332. The internal memory 1515, for example, is used for data transfer among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, according to a request). This internal memory 1515 may be realized by using any kind of memory device. However, generally, the internal memory is frequently used for storing data having a small, volume such as image data in units of blocks and parameters, and accordingly, it is preferable to realize the internal memory using a semiconductor memory having a relatively small capacity (compared to the external memory 1312) and having high response speed such as an SRAM (Static Random Access Memory).

The codec engine 1516 performs processes relating to coding and decoding of image data. The coding/decoding system with which the codec engine 1516 is compliant is arbitrary, and the number of coding/decoding systems may be one or more.

For example, it may be configured such that the codec engine 1516 may have a codec function for a plurality of coding/decoding systems and be configured to perform coding of image data or decoding of coded data by using the selected one of the coding/decoding systems.

In the example illustrated in FIG. 48, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks for the process relating to the codec.

The MPEG-2 Video 1541 is a functional block that codes or decodes image data according to the MPEG-2 system. The AVC/H.264 1542 is a functional block that codes or decodes image data according to the AVC system. The HEVC/H.265 1543 is a functional block that codes or decodes image data according to the HEVC system. The HEVC/H.265 (Scalable) 1544 is a functional block that performs scalable coding or scalable decoding of image data according to the HEVC system. The HEVC/H. 265 (Multi-view) 1545 is a functional block that performs multi-view coding or multi-view decoding of image data according to the HEVC system.

The MPEG-DASH 1551 is a functional block that transmits and receives image data according to an MPEG-DASH (MPEG-Dynamic Adaptive Streaming over HTTP) system. MPEG-DASH is a technology for performing video streaming using an HTTP (HyperText Transfer Protocol), and one of features thereof is that appropriate coded data among a plurality of pieces of coded data having mutually-different resolutions and the like, which are prepared in advance, is selected and transmitted in units of segments. The MPEG-DASH 1551 performs generation of a stream that is compliant with the standard, transmission control of the stream, and the like and uses the MPEG-2 Video 1541 to HEVC/H.265 (Multi-view) 1545 described above for coding and decoding image data.

The memory interface 1517 is an interface used for the external memory 1312. The data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexer/demultiplexer (MUX DMUX) 1518 performs multiplexing and demultiplexing of various kinds of data relating to an image such as a bitstream of coded data, image data, and a video signal. A method of the multiplexing/demultiplexing is arbitrary. For example, at the time of performing the multiplexing, the multiplexer/demultiplexer (MUX DMUX) 1518 may not only arrange a plurality of pieces of data into one but also add predetermined header information or the like to the data. In addition, at the time of performing the demultiplexing, the multiplexer/demultiplexer (MUX DMUX) 1518 may not only divide one piece of data into multiple parts but also add predetermined header information or the like to each divided data part. In other words, the multiplexer/demultiplexer (MUX DMUX) 1518 can convert the format of data through the multiplexing/demultiplexing process. For example, the multiplexer/demultiplexer (MUX DMUX) 1518 can convert a bitstream into a transport stream that is a bitstream of the transmission format or data (file data) of the recording file format by multiplexing the bitstream. It is apparent that an inverse conversion thereof can be performed by the demultiplexing process.

The network interface 1519 is an interface, for example, dedicated for the broadband modem 1333 (FIG. 46), the connectivity 1321 (FIG. 46), or the like. The video interface 1520 is an interface, for example, dedicated for the connectivity 1321 (FIG. 46), the camera 1322 (FIG. 46), or the like.

Next, an example of the operation of such a video processor 1332 will be described. For example, when a transport stream is received from an external network, for example, through the connectivity 1321 (FIG. 46), the broadband modem 1333 (FIG. 46), or the like, the transport stream is supplied to the multiplexer/demultiplexer (MUX DMUX) 1518 through the network interface 1519, is demultiplexed, and is decoded by the codec engine 1516. For the image data acquired by the decoding process performed by the codec engine 1516, predetermined image processing is performed, for example, by the image processing engine 1514, and a predetermined conversion is performed by the display engine 1513. Then, resultant image data is supplied, for example, to the connectivity 1321 (FIG. 46) or the like through the display interface 1512, and an image thereof is displayed on a monitor. In addition, the image data, for example, acquired by the decoding process performed by the codec engine 1516 is recoded by the codec engine 1516, is multiplexed by the multiplexer/demultiplexer (MUX DMUX) 1518, is converted into file data, is output, for example, to the connectivity 1321 (FIG. 46) or the like through the video interface 1520, and is recorded on various recording media.

In addition, the file data of the coded data acquired by coding the image data, which is read from a recording medium not illustrated in the figure, for example, by the connectivity 1321 (FIG. 46) or the like is supplied to the multiplexer/demultiplexer (MUX DMUX) 1518 through the video interface 1520, is demultiplexed, and is decoded by the codec engine 1516. For the image data acquired by the decoding process performed by the codec engine 1516, predetermined image processing is performed by the image processing engine 1514 and a predetermined conversion is performed by the display engine 1513. Then, resultant image data is supplied, for example, to the connectivity 1321 (FIG. 46) or the like through the display interface 1512, and an image thereof is displayed on the monitor. In addition, the image data, for example, acquired by the decoding process performed by the codec engine 1516 is recoded by the codec engine 1516, is multiplexed by the multiplexer/demultiplexer (MUX DMUX) 1518, is converted into a transport stream, is supplied, for example, to the connectivity 1321 (FIG. 46), the broadband modem 1333 (FIG. 46), or the like through the network interface 1519, and is transmitted to another apparatus not illustrated in the figure.

Here, the transmission/reception of the image data and the other data between the processing units arranged inside the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may be configured to include the functional blocks realizing the image coding apparatus (FIG. 1) configured by the encoder 1 and the file generating unit 2 according to the first embodiment and the image decoding apparatus (FIG. 8) configured by the file reading unit 51 and the decoder 52. By configuring as such, the video processor 1332 can have the same advantages as those described above with reference to FIGS. 1 to 36.

In addition, in the codec engine 1516, the present technology (in other words, the functions of the image coding apparatus and the image decoding apparatus according to each embodiment described above) may be realized by hardware such as logic circuits or software such as an embedded program or may be realized by both the hardware and the software.

While two examples of the configuration of the video processor 1332 have been described as above, the configuration of the video processor 1332 is arbitrary and may be a configuration other than the two examples described above. Here, the video processor 1332 may be configured as either one semiconductor chip or a plurality of semiconductor chips. For example, the video processor may be configured as a three-dimensional stacked LSI. In addition, the video processor may be realized by a plurality of LSIs.

[Example of Application to Apparatus]

The video set 1300 may be built in various apparatuses that process image data. For example, the video set 1300 may be built in the television apparatus 900 (FIG. 42), the mobile phone 920 (FIG. 43), the recording/reproducing apparatus 940 (FIG. 44), the imaging apparatus 960 (FIG. 45), and the like. By building the video set 1300 therein, the apparatus can acquire advantages similar to those described above with reference to FIGS. 1 to 36.

In addition, although a configuration is a part of the configurations of the video set 1300 described above, in a case where the configuration includes the video processor 1332, the configuration may be executed as a configuration to which the present technology is applied. For example, only the video processor 1332 may be executed as a video processor to which the present technology is applied. In addition, for example, as described above, the processor denoted by the dotted line 1341, the video module 1311, and the like may be executed as a processor, a module, and the like to which the present technology is applied. Furthermore, for example, the video module 1311, the external memory 1312, the power management module 1313, and the front end module 1314 may be combined so as to be executed as a video unit 1361 to which the present technology is applied. According to any of the configurations, advantages similar to those described above with reference to FIGS. 1 to 36 can be acquired.

In other words, any configuration may be built in various apparatuses that process image data, similarly to the case of the video set 1300, as long as the configuration includes the video processor 1332. For example, the video processor 1332, the processor denoted by the dotted line 1341, the video module 1311, or the video unit 1361 may be built in the television apparatus 900 (FIG. 42), the mobile phone 920 (FIG. 43), the recording/reproducing apparatus 940 (FIG. 44), the imaging apparatus 960 (FIG. 45), and the like. By building any one configuration to which the present technology is desired to be applied into an apparatus, similarly to the case of the video set 1300, the apparatus can acquire advantages similar to those described above with reference to FIGS. 1 to 36.

In this specification, an example has been described in which various kinds of information such as the startcode, the filler data, the parameter managing the decoder buffer, the identification parameter, and the FixedStartCodeSizeFlag are multiplexed in a coded stream and is transmitted from the coding side to the decoding side. However, a technique for transmitting such information is not limited to such a technique. For example, such information may be transmitted or recorded as individual data associated with a coded bitstream without being multiplexed in the coded stream. Here, the term "associated" represents that an image (it may be a part of an image such as a slice, block, or the like) included in a bitstream and information corresponding to the image are acquired with being linked to each other at the time of decoding the image and the information. In other words, the information may be transmitted in a transmission line other than that for the image (or the bitstream). In addition, the information may be recorded on a recoding medium other than that for the image (or the bitstream) (or a different recording region of the same recording medium). Furthermore, the information and the image (or the bitstream), for example, may be associated with each other in units of arbitrary parts such as multiple frames, one frame, or a part of the frame.

While preferred embodiments of the present disclosure have been described in detail with reference to the accompanying drawings, the present disclosure is not limited to such examples. It is apparent that a person having ordinary knowledge in the technical field of the present disclosure can devise various changes or modifications within the scope of the technical idea described in the claims, and, naturally, it is understood that such changes and modifications belong to the technical scope of the present disclosure.

REFERENCE SIGNS LIST

1 Encoder
2 File generating unit
31 Control unit
32 Setting unit
33 File writing unit
51 File reading unit
52 Decoder
71 File reception unit
72 Parameter acquiring unit
73 Decoding control unit 74 Data reading unit
201 Image coding apparatus
251 Image decoding apparatus
300 File converting apparatus
311 Video stream analyzing unit
401 Encoder
451 Decoder

The invention claimed is:

1. An image processing device comprising:
a setting unit configured to
set whether or not to remove filler data from a bitstream for media data of a file including the bitstream generated by coding an image, and
set an identification parameter used for identifying whether or not the filler data is removed; and
a file generating unit configured to generate the file without changing characteristics of Hypothetical Reference Decoder (HRD) parameters by retaining the filler data for the media data,
wherein the setting unit and the file generating unit are each implemented via at least one processor.

2. The image processing device according to claim 1, wherein a parameter managing a decoder buffer is a parameter included in VUI (Video Usability Information), a parameter included in buffering period SEI (Supplemental Enhancement Information), or a parameter included in picture timing SEI.

3. The image processing device according to claim 1, wherein the setting unit is further configured to set the filler data as VCL data.

4. An image processing method using an image processing device, the image processing method comprising:
setting whether or not to remove filler data from a bitstream for media data of a file including the bitstream generated by coding an image;
setting an identification parameter used for identifying whether or not the filler data is removed; and
generating the file without changing characteristics of Hypothetical Reference Decoded (HRD) parameters by retaining the filler data for the media data.

5. An image processing device comprising:
a reception unit configured to receive media data of a file including a bitstream acquired by coding an image; and
a decoding unit configured to read an identification parameter for identifying whether or not filler data is removed from the file received by the reception unit and to decode the bitstream by using a parameter managing a decoder buffer,
wherein the file is generated without changing characteristics of Hypothetical Reference Decoder (HRD) parameters by retaining the filler data for the media data,
wherein the reception unit and the decoding unit are each implemented via at least one processor.

6. The image processing device according to claim 5, wherein the parameter managing the decoder buffer is a parameter included in VUI (Video Usability Information), a parameter included in buffering period SEI (Supplemental Enhancement Information), or a parameter included in picture timing SEI.

7. The image processing device according to claim 5, wherein the filler data is set as VCL data.

8. An image processing method using an image processing device, the image processing method comprising:
receiving media data of a file including a bitstream acquired by coding an image; and
reading an identification parameter for identifying whether or not filler data is removed from the received file and decoding the bitstream by using a parameter managing a decoder buffer,
wherein the file is generated without changing characteristics of Hypothetical Reference Decoder (HRD) parameters by retaining the filler data for the media data.

9. An image processing device comprising:
a setting unit configured to set whether or not to remove filler data from a bitstream for media data of a file including the bitstream generated by coding an image; and
a generation unit configured to generate the file without changing characteristics of Hypothetical Reference Decoder (HRD) parameters by retaining the filler data for the media data,
wherein the setting unit and the generation unit are each implemented via at least one processor.

10. The image processing device according to claim 9, wherein the setting unit is further configured to set an identification parameter identifying that the characteristic of the parameter managing the decoder buffer is changed.

11. The image processing device according to claim 10, wherein the setting unit is further configured to set the identification parameter as an optional box in a sample entry of the file.

12. An image processing method using an image processing device, the image processing method comprising:
setting whether or not to remove filler data from a bitstream for media data of a file including the bitstream generated by coding an image; and
generating the file without changing characteristics of Hypothetical Reference Decoder (HRD) parameters by retaining the filler data for the media data.

13. An image processing device comprising:
a reception unit configured to receive a file generated using a setting whether or not filler data is removed from a bitstream for media data of a file including the bitstream generated by coding an image; and
a decoding unit configured to read an identification parameter used for identifying whether or not the filler data is removed and to decode the bitstream by using the read parameter,
wherein the file is configured so that characteristics of Hypothetical Reference Decoder (HRD) parameters do not change in the case that the filler data is removed from the bitstream by retaining the filler data for the media data, and
wherein the reception unit and the decoding unit are each implemented via at least one processor.

14. The image processing device according to claim 13, wherein an identification parameter identifying that the characteristic of the parameter managing the decoder buffer is changed is set in the file.

15. An image processing method using an image processing device, the image processing method comprising:
receiving a file generated using a setting whether or not filler data is removed from a bitstream for media data of a file including the bitstream generated by coding an image; and
reading an identification parameter used for identifying whether or not the filler data is removed and decoding the bitstream by using the read parameter,
wherein the file is configured so that characteristics of Hypothetical Reference Decoder (HRD) parameters do not change in the case that the filler data is removed from the bitstream by retaining the filler data for the media data.

16. The image processing device according to claim 1, wherein the control unit performs control of the setting unit so as to configure the file in order to maintain the characteristics of the Hypothetical Reference Decoder (HRD) parameters when the filler data is removed from the file.

* * * * *